United States Patent

Pare, Jr. et al.

[19]

[11] Patent Number: 5,870,723
[45] Date of Patent: Feb. 9, 1999

[54] TOKENLESS BIOMETRIC TRANSACTION AUTHORIZATION METHOD AND SYSTEM

[76] Inventors: David Ferrin Pare, Jr., 1430 Josephine St. Apt. R7, Berkeley, Calif. 94703; Ned Hoffman, 1252A Pleasant Hill Ave., Sebastopol, Calif. 94721; Jonathan Alexander Lee, 1430 Josephine St. Apt. R7, Berkeley, Calif. 94703

[21] Appl. No.: 705,399

[22] Filed: Aug. 29, 1996

Related U.S. Application Data

[63] Continuation-in-part of Ser. No. 442,895, May 17, 1995, Pat. No. 5,613,012, which is a continuation-in-part of Ser. No. 345,523, Nov. 28, 1994, Pat. No. 5,615,217.

[51] Int. Cl.⁶ .................................................. G06F 17/60
[52] U.S. Cl. .......................................................... 705/39
[58] Field of Search ................................ 705/26, 35, 39; 380/24, 25, 23, 49

[56] References Cited

U.S. PATENT DOCUMENTS

| | | | |
|---|---|---|---|
| 4,821,118 | 4/1989 | Lafreniere | 358/108 |
| 4,837,422 | 6/1989 | Dethloff et al. | 364/408 |
| 4,961,142 | 10/1990 | Elliott et al. | 364/408 |
| 4,993,068 | 2/1991 | Piosenka et al. | 380/23 |
| 4,995,086 | 2/1991 | Lilley et al. | 382/4 |
| 4,998,279 | 3/1991 | Weiss | 340/825 |
| 5,036,461 | 7/1991 | Elliot et al. | 364/408 |
| 5,054,089 | 10/1991 | Uchida et al. | 382/4 |
| 5,095,194 | 3/1992 | Barbanell | 235/379 |
| 5,109,427 | 4/1992 | Yang | 382/4 |
| 5,109,428 | 4/1992 | Igaki et al. | 382/5 |
| 5,144,680 | 9/1992 | Kobayashi et al. | 382/4 |
| 5,146,102 | 9/1992 | Higuchi et al. | 250/556 |
| 5,168,520 | 12/1992 | Weiss | 380/23 |
| 5,180,901 | 1/1993 | Hiramatsu | 235/380 |
| 5,191,611 | 3/1993 | Lang | 380/25 |
| 5,210,588 | 5/1993 | Lee | 356/71 |
| 5,210,797 | 5/1993 | Usui et al. | 382/4 |
| 5,222,152 | 6/1993 | Fishbine et al. | 382/2 |
| 5,229,764 | 7/1993 | Matchett et al. | 340/825.34 |
| 5,230,025 | 7/1993 | Fisfbine et al. | 382/4 |
| 5,239,583 | 8/1993 | Parrillo | 380/23 |
| 5,241,606 | 8/1993 | Horie | 382/4 |
| 5,251,259 | 10/1993 | Mosley | 380/23 |
| 5,265,162 | 11/1993 | Bush et al. | 380/24 |
| 5,276,314 | 1/1994 | Martino et al. | 235/380 |
| 5,280,527 | 1/1994 | Gullman et al. | 380/23 |
| 5,321,242 | 6/1994 | Heath, Jr. | 235/382 |
| 5,325,442 | 6/1994 | Knapp | 382/4 |
| 5,335,288 | 8/1994 | Faulkner | 381/2 |
| 5,343,529 | 8/1994 | Goldfine et al. | 380/23 |
| 5,351,303 | 9/1994 | Willmore | 382/4 |
| 5,359,669 | 10/1994 | Shanley et al. | 382/117 |
| 5,745,555 | 4/1998 | Mark | 379/95 |

*Primary Examiner*—Edward R. Cosimano
*Assistant Examiner*—Barton L. Bainbridge
*Attorney, Agent, or Firm*—Ali Kamarei

[57] ABSTRACT

A method and system for tokenless authorization of commercial transactions between a buyer and a seller using a computer system. A transaction is proposed by a seller, and the buyer signals his acceptance by entering his personal authentication information comprising a PIN and at least one biometric sample, forming a commercial transaction message. The commercial transaction message is forwarded to the computer system, where the computer system compares the personal authentication information in the commercial transaction message with previously registered buyer biometric samples. If the computer system successfully identifies the buyer, a financial account of the buyer is debited and a financial account of the seller is credited, and the results of the transaction are presented to both buyer and seller. As a result of the invention, a buyer can conduct commercial transactions without having to use any tokens such as portable man-made memory devices such as smartcards or swipe cards. The invention allows buyers to quickly select one of a group of different financial accounts from which to transfer funds. The invention further indicates to the user that the authentic computer system was accessed by the use of a private code that is returned to the buyer after the identification is complete. The invention additionally permits an authorized buyer to alert authorities in the event of an emergency, such as when a transaction is coerced.

66 Claims, 16 Drawing Sheets

5,870,723

TOKENLESS BIOMETRIC TRANSACTION AUTHORIZATION METHOD AND SYSTEM

The present application is a continuation-in-part of U.S. patent application Ser. No. 08/442,895, filed May 17, 1995, now U.S. Pat. No. 5,613,012, which is a continuation-in-part of U.S. patent application Ser. No. 08/345,523, filed Nov. 28, 1994, now U.S. Pat. No. 5,615,217, which are incorporated herein by reference.

BACKGROUND OF THE INVENTION

The use of a token, an inanimate object which confers a capability to the buyer presenting it, is pervasive in today's financial world. Whether a consumer is buying groceries with a debit card or shopping in a department store with a credit card, at the heart of that transaction is a money transfer enabled by a token, which acts to identify both the consumer as well as the financial account being accessed.

From their inception in the late 1950s, token-based financial transactions have grown increasingly more prevalent at the point of sale. However, as token-based transfers have become more popular with consumers, they have also become more popular with criminals intent on fraud. Currently, fraud losses in the industry stem from many different areas, but they are mainly either lost, stolen, or counterfeit cards.

Credit cards operate without the use of a personal identification number (PIN). This means that a lost credit card can easily be turned into cash if the card falls into the wrong hands. While theft of a token constitutes the majority of fraud in the system, fraud from counterfeit credit cards is rising rapidly. Counterfeit credit cards are manufactured by a more technically sophisticated criminal who acquires a cardholder's valid account number, produces a valid-looking counterfeit card, encodes the magnetic strip, and embosses the counterfeit plastic card with the account number. The card is then repeatedly presented to merchants until the account's credit limit is reached. Another form of loss is caused by a criminal seller or his employees who surreptitiously obtains the cardholder's account number and enter fictitious transactions against the card and then take cash out of the till. It is estimated that losses due to all types of fraud exceeds one billion dollars annually.

Generally, debit cards are used in conjunction with a personal identification number (PIN). Lost debit cards do not generally result in fraud, unless the owner of the card wrote his PIN on the card. Furthermore, successfully counterfeiting a debit card is more difficult than with a credit card, since the criminal must acquire not only the account number, but also the PIN, and then manufacture the card as in the credit card example. However, various strategies have been used to obtain PINs from unwary cardholders; these range from Trojan horse automated teller machines (ATMs) in shopping malls that dispense cash but record the PIN, to fraudulent seller point of sale devices that also record the PIN, to criminals with binoculars that watch cardholders enter PINs at ATMs. The subsequently manufactured counterfeit debit cards are then used in various ATM machines until the unlucky account is emptied.

Customer fraud, for both credit and debit cards, is also on the rise. Customers intent on this sort of fraud will claim that they lost their card, say that their PIN was written on the card, and then withdraw money from their account using card, and then refuse to be responsible for the loss. The financial industry is well aware of the trends in fraud, and is constantly taking steps to improve the security of the card. However, the linkage between the buyer and his token is tenuous, and that is the fundamental reason behind card fraud today One possible solution to stolen-card fraud involves placing PIN protection for magnetic stripe credit cards, much as debit cards have PINs today. This will raise the administrative costs for each card, since cardholders will undoubtedly wish to select their own PIN for each of their 3.4 cards. In addition, this solution still doesn't address the problem of counterfeit cards.

Another solution that solves both stolen-card fraud and greatly reduces counterfeit-card fraud involves using a smartcard that includes either a biometric or a PIN. In this approach, authenticated biometrics are recorded from a user of known identity and stored for future reference on a token. In every subsequent access attempt, the user is required to physically enter the requested biometric, which is then compared to the authenticated biometric on the token to determine if the two match in order to verify user identity.

Various biometrics have been suggested, such as fingerprints, hand prints, voice prints, retinal images, handwriting samples and the like. However, because the biometrics are generally stored in electronic (and thus reproducible) form on a token and because the comparison and verification process is not isolated from the hardware and software directly used by the buyer attempting access, a significant risk of fraud still exists. Examples of this approach to system security are described in U.S. Pat. Nos. 4,821,118 to Lafreniere; 4,993,068 to Piosenka et al.; 4,995,086 to Lilley et al.; 5,054,089 to Uchida et al.; 5,095,194 to Barbanell; 5,109, 427 to Yang; 5,109,428 to Igaki et al.; 5,144,680 to Kobayashi et al.; 5,146,102 to Higuchi et al.; 5,180,901 to Hiramatsu; 5,210,588 to Lee; 5,210,797 to Usui et al.; 5,222,152 to Fishbine et al.; 5,230,025 to Fishbine et al.; 5,241,606 to Horie; 5,265,162 to Bush et al.; 5,321,242 to Heath, Jr.; 5,325,442 to Knapp; 5,351,303 to Willmore, all of which are incorporated herein by reference.

An example of another token-based biometric smartcard system can be found in U.S. Pat. No. 5,280,527 to Gullman et al. In Gullman's system, the user must carry and present a credit card sized token (referred to as a biometric security apparatus) containing a microchip in which is recorded characteristics of the authorized user's voice. In order to initiate the access procedure, the user must insert the token into a terminal such as an ATM, and then speak into the terminal to provide a biometric sample for comparison with an authenticated sample stored in the microchip of the presented token. If a match is found, the remote terminal signals the host computer that the transaction should be permitted, or may prompt the user for an additional code, such as a PIN which is also stored on the token, before authorizing the transaction.

Although Gullman's reliance of comparison biometrics reduces the risk of unauthorized access as compared to PIN codes, Gullman's use of the token as the repository for the authenticating data combined with Gullman's failure to isolate the identity verification process from the possibility of tampering greatly diminishes any improvement to fraud resistance resulting from the replacement of a numeric code with a biometric. Further, the system remains inconvenient to the consumer because it too requires the presentation of a token in order to authorize a transaction.

Uniformly, the above patents that disclose commercial transaction systems teach away from biometric recognition without the use of tokens. Reasons cited for such teachings range from storage requirements for biometric recognition systems to significant time lapses in identification of a large number of individuals, even for the most powerful computers.

Unfortunately, any smartcard-based system will cost significantly more than the current magnetic stripe card systems currently in place. A PIN smartcard costs perhaps $3, and a biometric smartcard will cost $5. In addition, each point of sale station would need a smartcard reader, and if biometrics are required, a biometric scanner will also have to be attached to the reader as well. With 120 million cardholders and 5 million stations, the initial conversion cost is from two to five times greater than the current annual fraud losses.

This large price tag has forced the industry to look for new ways of using the power in the smartcard in addition to simple commercial transaction. It is envisioned that in addition to storing credit and debit account numbers and biometric or PIN authentication information, smart cards may also store phone numbers, frequent flyer miles, coupons obtained from stores, a transaction history, electronic cash usable at tollbooths and on public transit systems, as well as the buyer's name, vital statistics, and perhaps even medical records.

The net result of "smartening" the token is centralization of function. This looks good during design, but in actual use results in increased vulnerability for the consumer. Given the number of functions that the smartcard will be performing, the loss or damage of this monster card will be excruciatingly inconvenient for the cardholder. Being without such a card will financially incapacitate the cardholder until it is replaced. Additionally, losing a card full of electronic cash will also result in a real financial loss as well.

Thus, after spending vast sums of money, the resulting system will definitely be more secure, but will result in heavier and heavier penalties on the consumer for destruction or loss of the card.

To date, the consumer financial transaction industry has had a simple equation to balance: in order to reduce fraud, the cost of the card must increase. As a result, there has long been a need for a commercial transaction system that is highly fraud-resistant, practical, convenient for the consumer, and yet cost-effective to deploy.

There is also a need for a commercial transaction system that uses a strong link to the person being identified, as opposed to merely verifying a buyer's possession of any physical objects that can be freely transferred. This will result in a dramatic decrease in fraud, as only the buyer can authorize a transaction.

A further need in a commercial transaction system is ensuring consumer convenience by providing authorization without forcing the consumer to possess, carry, and present one or more proprietary objects in order to authorize a transaction. All parties intent on fighting fraud recognize that any system that solves the fraud problem must take the issue of convenience into account, however the fundamental yet unrecognized truth of the situation is, the card itself can be very inconvenient for the consumer. This may not be initially obvious, but anyone who has lost, left at home, or had a card stolen knows well the keenly and immediately-felt inconvenience during the card's absence.

Yet another need in the industry is for a transaction system that greatly reduces or eliminates the need to memorize multiple or cumbersome codes. Such a system must allow a user to access all of his accounts, procure all services to which he is entitled, and carry out transactions in and between all financial accounts, make point of purchase payments, etc.

There is further a need for a commercial transaction system that affords a consumer the ability to alert authorities that a third party is coercing the transaction without the third party being aware that an alert has been generated. There is also a need for a system that is nevertheless able to effect, unknown to the coercing third party, temporary restrictions on the types and amounts of transactions that can be undertaken.

Lastly, such a system must be affordable and flexible enough to be operatively compatible with existing networks having a variety of electronic transaction devices and system configurations.

SUMMARY OF THE INVENTION

The present invention satisfies these needs by providing an improved commercial transaction method between a buyer and a seller using a computer system that comprises the following steps.

First, there is a buyer registration step where a buyer registers a PIN, at least one biometric sample, and at least one buyer financial account. Each financial account has an associated account index code that is assigned by the buyer during registration. The biometric samples, the PIN, the financial accounts, and the index codes are stored in the computer system Then, the seller is registered in a seller registration step. The seller registers at least one financial account with the computer system, and is given a seller identification code.

Once both buyer and seller are registered, transactions can take place. A seller offers a proposed commercial transaction to a buyer in a proposal step, describing the product or service being sold, the price, and the seller's identification code.

The buyer can then accept the proposed transaction in an acceptance step by adding his buyer's personal authentication information to the commercial transaction proposed by the seller. The authentication information includes the buyer's biometric sample and a PIN. In addition, the buyer must submit his account index code, which specifies which of the buyer's financial accounts to debit. This accepted transaction is called a commercial transaction, which is forwarded to the computer system in a transmission step.

After receiving the commercial transaction, the computer system attempts to identify the buyer. The computer system compares the biometric samples and the PIN added by the buyer to the commercial transaction with previously registered biometric samples and PINs in a buyer identification step. If a match is found, the buyer is identified successfully, otherwise the buyer is not identified and the transaction fails.

Once the buyer is identified, the computer system in a payment step determines the financial account of the buyer using the buyer's account index code as well as the financial account of the seller using the seller identification code, both of which are provided by the commercial transaction. Once both accounts are identified, the computer system debits the account of the buyer and credits the account of the seller. If there are insufficient resources in the buyer's financial account, the transaction fails.

In an alternate embodiment, the computer system constructs a transaction given the buyer and seller financial accounts, the transaction amount, and the associated transaction information, and forwards the transaction to an external computer system, such as one operated by VISA International, where the money transfer occurs and any status of success or failure returned by the external computer system is forwarded by the computer system to the buyer and seller.

When the computer system completes an operation, such as a registration of a buyer or a seller, or a particular transaction succeeds or fails, a presentation step provides the results of the operation to the buyer and/or the seller.

In this manner, commercial transactions are conducted without the buyer having to use any portable man-made memory tokens such as smartcards or magnetic stripe cards.

In a preferred embodiment of the invention, the identification step occurs in less than two seconds, which is a commercially acceptable timeframe.

For situations where the buyer is coerced into making a transaction, an embodiment of the invention provides a mechanism for a buyer to signal that the transaction is being performed under duress. Multiple emergency methods are provided. One method is an emergency account index code which, when employed by the buyer during the acceptance step, allows the transaction to proceed, but in addition sends a silent alarm to the authorities during the payment step. The other method allows the buyer to select an emergency PIN which, when entered during the acceptance step and detected by the computer system during the buyer identification step, results in a successful transaction while at the same time sending a silent alarm.

In both emergency methods, the buyer can specify the steps that the computer system will take or cause to be taken when a silent alarm occurs, including placing artificial financial resource limits on the buyer's accounts, the presentation of false information or financial data, the presentation of a different private code at the end of the transaction, the rejection of the transaction, the notification of the alarm to the authorities, or the notification of the alarm to the seller.

In some situations, it may be possible for people intent on fraud to substitute fake transaction stations for actual transaction stations in order to capture an unsuspecting buyer's biometric and PIN. To counter this, another embodiment of the invention provides a way for the buyer to authenticate the system. During registration, the buyer selects a private code in addition to biometric, PIN, financial accounts, and account index codes. The private code is unrelated to the PIN, and is not used to gain access to the system. The private code is displayed to the buyer at the end of each transaction. Only the computer system and the buyer know the private code, which is never entered by the buyer during the transaction. Since a fake station cannot display the private code to the buyer, any attempt to steal biometric and PIN information is immediately obvious to a buyer.

For some transactions, it is not appropriate to conduct an immediate debit/credit of accounts. These cases include transactions where the exact amount to be transferred is not known at the time of authorization, or when a deposit is reserved by the seller for security reasons that will probably never be collected. As a result, in an alternate embodiment of the invention, the computer system causes a credit authorization draft to be constructed up to the limit supplied in the commercial transaction, instead of executing an immediate debit/credit transaction.

In yet another embodiment of the invention, the computer system communicates with one or more external computer systems in order to perform various functions, including determining if the buyer has sufficient resources, the debiting of a buyer's financial account, the crediting of the seller's financial account, or the construction of a credit authorization draft.

In another embodiment of the invention, the buyer is remote from the seller, and transaction proposals and other information is transmitted from seller to buyer and vice versa using a computer network such as the Internet.

In yet another embodiment of the invention, the seller identification code is identical to the seller's financial account.

In another embodiment of the invention, each account index code has associated with it a name assigned by the account owner during registration. This account name can be displayed during authorization in the event the owner forgets which accounts are available for use.

In most instances, the buyer being identified and the computer system are remote and physically separate from each other.

All electronic communications to and from the computer system are encrypted using industry standard encryption technology, preferably the DES (Data Encryption Standard) with 112-bit encryption keys. Each identification station has its own set of encryption keys that are known only to that particular station and the computer system.

It is preferred that the invention include a method for comparing the biometric samples during registration with a collection of biometric samples from buyers who have been designated as having previously attempted to perpetrate fraud or who have actually perpetrated fraud upon the system, thus eliminating registration of repeat offenders.

Yet another embodiment of the invention creates increased assurance of accurate identification by comparing a buyer's biometric from among a basket of other biometrics, the basket being a subset of all stored biometrics in the system. This is done by first comparing the buyer's biometric with all others in the basket and storing his in that basket only when it is deemed to be sufficiently dissimilar from the other biometrics therein.

In another embodiment of the invention, the buyers choose their own PIN from a group of PINs provided by the computer system. Once the buyer's biometric is gathered, the data processing center selects several PINs at random which may be conducive to being memorized. The computer system then conducts a comparison of the biometric gathered with those already in those PIN baskets. In the event the new registrant's biometric is too similar to any of the registered biometrics currently in the particular PIN basket, that PIN is rejected and an alternative PIN is selected for another such biometric comparison. Once the computer system has generated several PIN options without a confusingly similar biometric, these PINs are presented to the new registrant from which the buyer may select one PIN.

In another embodiment of the invention, in the unlikely event of the theft of biometric information, the situation can be remedied by simply changing the PIN basket in which the person's biometric samples reside. After this is done, the criminal can no longer use the biometric sample to authorize transactions.

The present invention is clearly advantageous over the prior art in a number of ways.

First, it is extremely easy and efficient for the consumer to use because it eliminates the need to carry and present any tokens in order to access one's accounts. The present invention eliminates all the inconveniences associated with carrying, safeguarding, and locating tokens. Further, because tokens are often specific to a particular computer system that further requires remembering a secret PIN code assigned to the particular token, this invention eliminates all such tokens and thereby significantly reduces the amount of memorization and diligence increasingly required of consumers by providing protection and access to all financial accounts using only one personal identification number. The consumer is now uniquely empowered, by means of this invention, to conveniently conduct his personal and/or professional electronic transactions at any time without dependence upon tokens which may be stolen, lost or damaged.

The invention is clearly advantageous from a convenience standpoint to retailers and financial institutions by making purchases and other financial transactions less cumbersome and more spontaneous. The paperwork of financial transactions is significantly reduced as compared to credit card purchases wherein separate receipts are generated and must be retained by the seller and the consumer.

Because the system of the invention is designed to provide a consumer with simultaneous direct access to all of his financial accounts, the need for transactions involving money, checks, credit drafts and the like will be greatly reduced, thereby reducing the cost of equipment and staff required to collect, account, and process such transactions.

Further, the substantial manufacturing and distributing costs of issuing and reissuing all tokens such as credit cards, debit cards, telephone calling cards and the like will be eliminated, thereby providing further economic savings to issuing banks, and ultimately to consumers.

Moreover, the invention is markedly advantageous and superior to existing systems in being highly fraud resistant. As discussed above, present authorization systems are inherently unreliable because they base determination of a user's identity on the physical presentation of a manufactured object along with, in some cases, information that the user knows. Unfortunately, both the token and information can be transferred to another, through loss, theft or by voluntary action of the authorized user. Thus, unless the loss or unintended transfer of these items is realized and reported by the authorized user, anyone possessing such items will be recognized by existing authorization systems as the consumer to whom that token and its corresponding financial accounts are assigned.

By contrast, the present invention virtually eliminates the risk of granting access to unauthorized users by determining identity from an analysis of a user's unique characteristics. Even in the very rare circumstance of coercion, where an authorized buyer is coerced by a coercing party to access his accounts, the system anticipates an emergency account index code, whereby the authorized user can alert authorities of the transgression without the knowledge of the coercing party.

The invention further prevents fraud by storing authentication information and carrying out identity verification operations at a location that is operationally isolated from the user requesting authorization, thereby preventing the user from acquiring copies of the authentication information or from tampering with the verification process. Such a system is clearly superior to existing token-based systems wherein the biometric authentication information are stored on and can be recovered from the token, and wherein the actual identity determination is performed at the same location as the user during the authorization process.

It is an object of the invention therefore to provide a commercial transaction system that eliminates the need for a user to possess and present a physical object, such as a token, in order to authorize a transaction.

It is another object of the invention to provide a commercial transaction system that is capable of verifying a user's identity based on one or more unique characteristics physically personal to the user, as opposed to verifying mere possession of proprietary objects and information.

Yet another object of the invention is to provide a commercial transaction system that is practical, convenient, and easy to use, where buyers no longer need to remember multiple PINs to protect multiple accounts.

Another object of the invention is to provide increased security in a very cost-effective manner, by completely eliminating the need for ever more complicated and expensive tokens.

Still another object of the invention is to provide a commercial transaction system that is highly resistant to fraudulent access attempts by non-authorized users.

Yet another object of the invention is to provide a commercial transaction system that enables a consumer to notify authorities that a particular transaction is being coerced by a third party without giving notice to said third party of the notification.

Another object of the invention is to provide a commercial transaction system that automatically restricts a consumer's transaction capabilities according a desired configuration provided by the user when a transaction is being coerced.

Still another object of the invention is to authenticate the system to the user once the commercial transaction is complete, so the user can detect any attempt by criminals to steal their authentication information.

Another object of the invention is to be added in a simple and cost-effective manner to existing online credit and debit terminals currently installed at points of sale around the world. These and other advantages of the invention will become more fully apparent when the following detailed description of the invention is read in conjunction with the accompanying drawings.

DETAILED DESCRIPTION OF THE INVENTION

The objective of this invention is to provide a tokenless, secure, reliable, safe, and consistent, method for identifying buyers for the purpose of authorizing financial transactions for large numbers of consumers. It is the essence of this invention that consumers have the ability to conduct these transactions without the use of any tokens, credit cards, badges or identification cards including drivers licenses. In order to be functional it is important that the system operate at speeds similar to those currently in operation for completing financial transactions such as credit card purchases and ATM services. The system must be secure, such that buyers' records and their biometric information remain confidential and safe, both within the computer system that identifies the buyer and authorizes transactions, as well as during collection and transfer of authentication information between the computer system and the remote sites with which the computer system communicates.

Furthermore, the system must be reliable in that errors in identification and authorization must be infrequent and not hamper or make use of the system cumbersome. Since only the use of biometrics are contemplated for identification of buyers, the system must also have security measures during emergency cases to either reduce access, even to the authorized user, as well as notify authorities. It is appreciated that the system must be able to handle a large number of users, and accommodate storage and transfer of large amounts of data, such as biometric information, commensurate with speeds at which financial transactions are carried on today.

Figure 1:
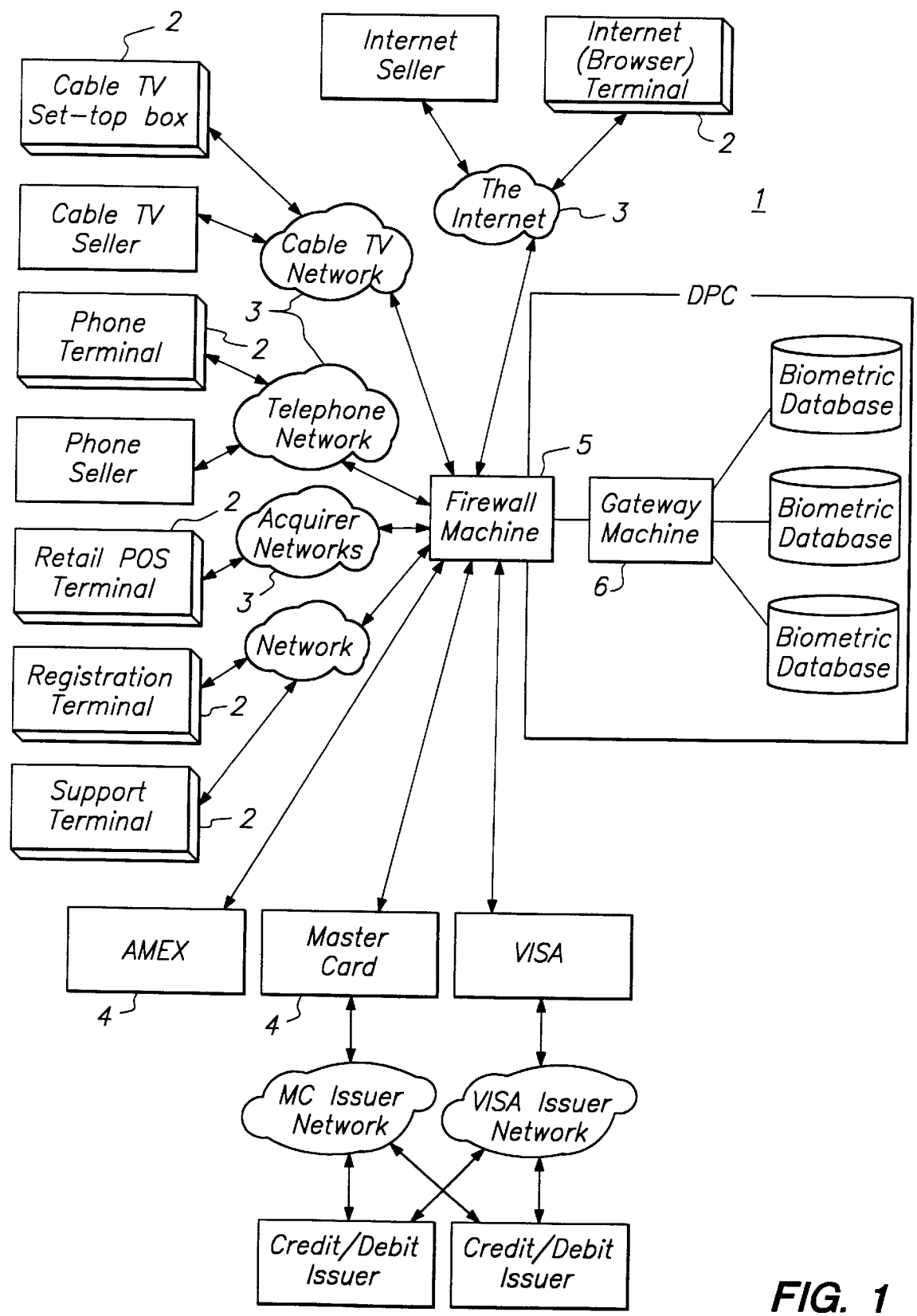
FIG. 1 is a diagram of the system of the present invention.
Figure 2:
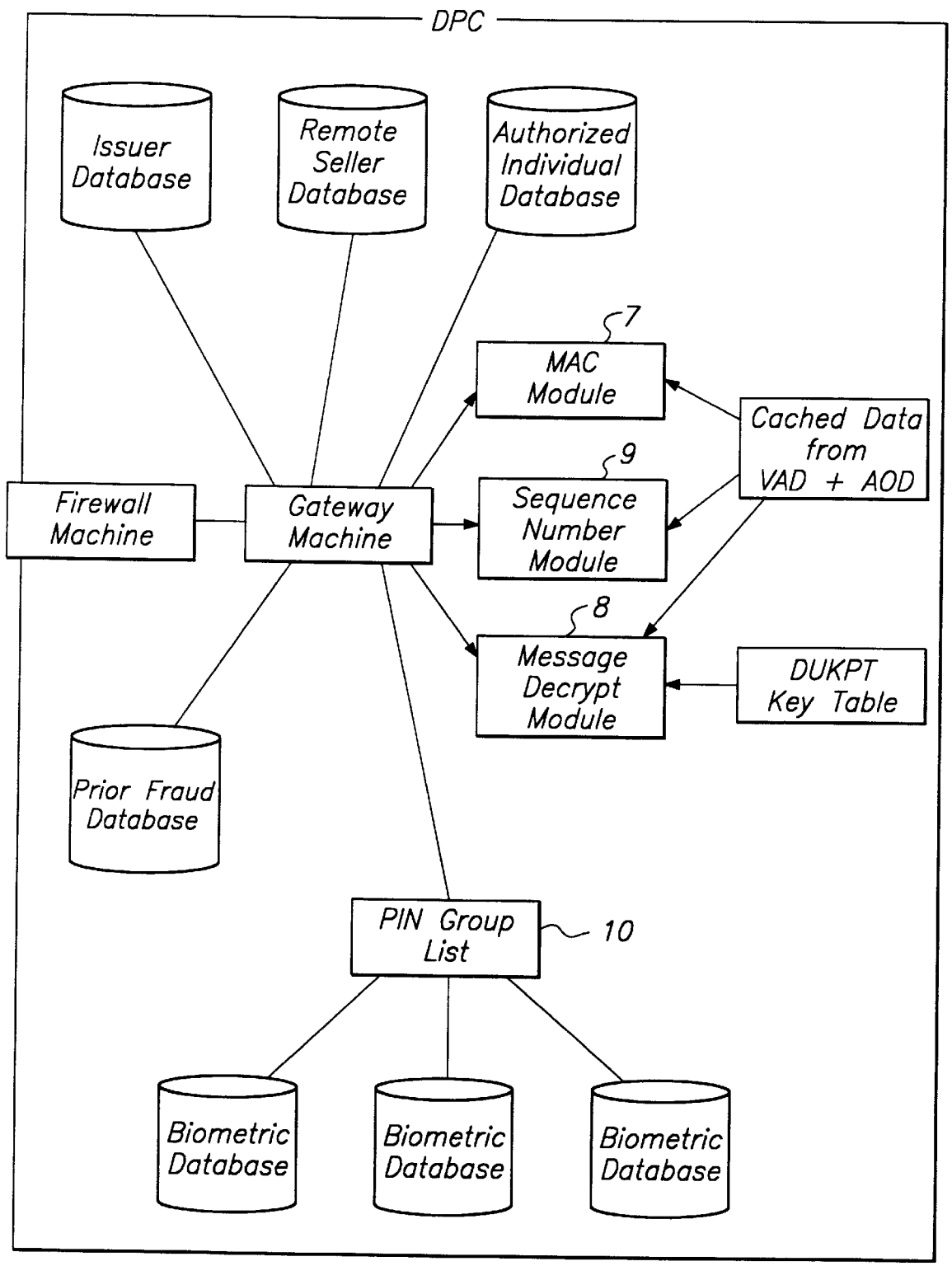
FIG. 2 is a diagram of the Data Processing Center (DPC) and its internal databases and execution modules.
Figure 3:
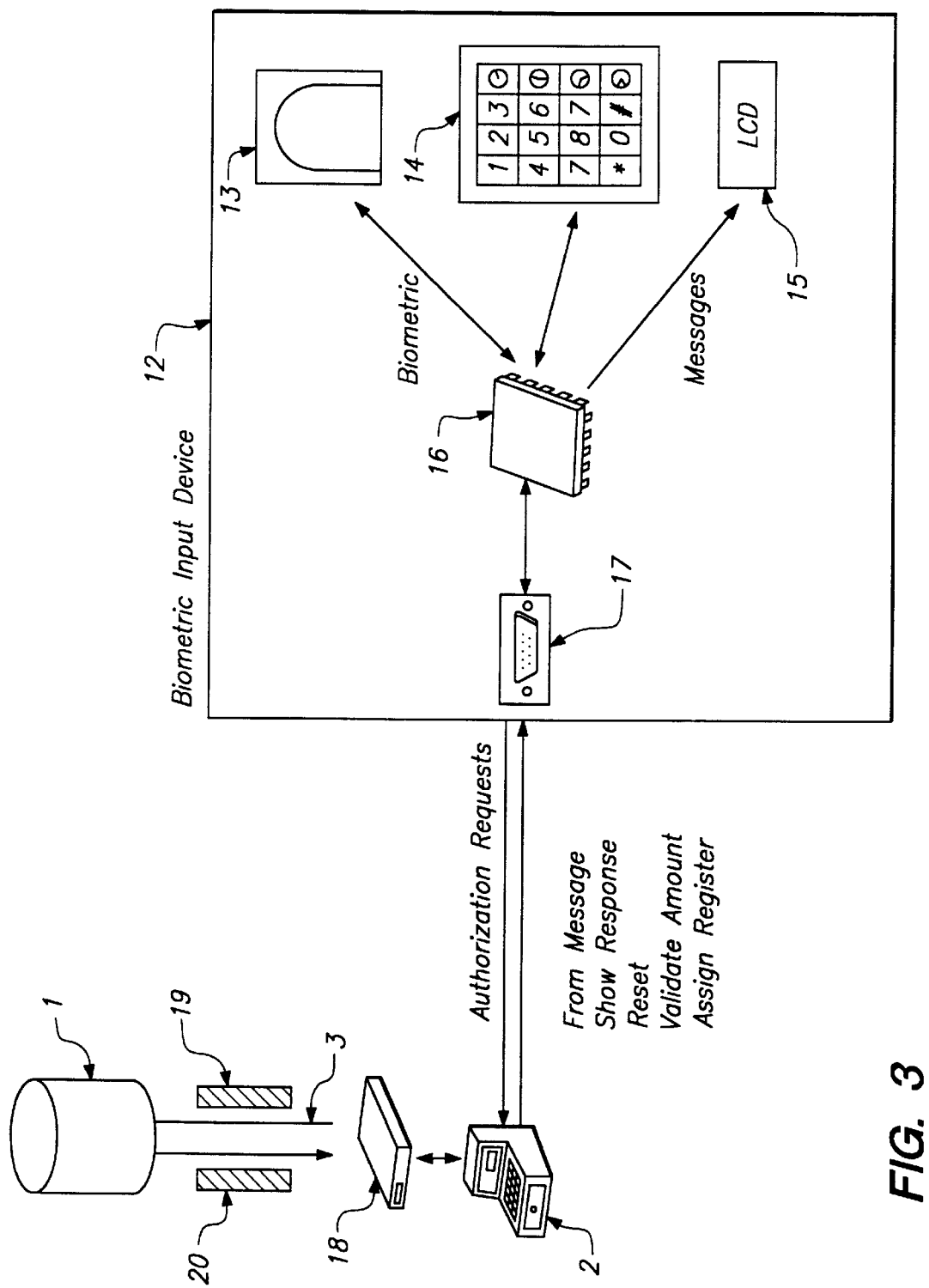
FIG. 3 is a diagram of the retail point of sale terminal, the biometric input apparatus and its components, and the interconnections between them.
Figure 4:
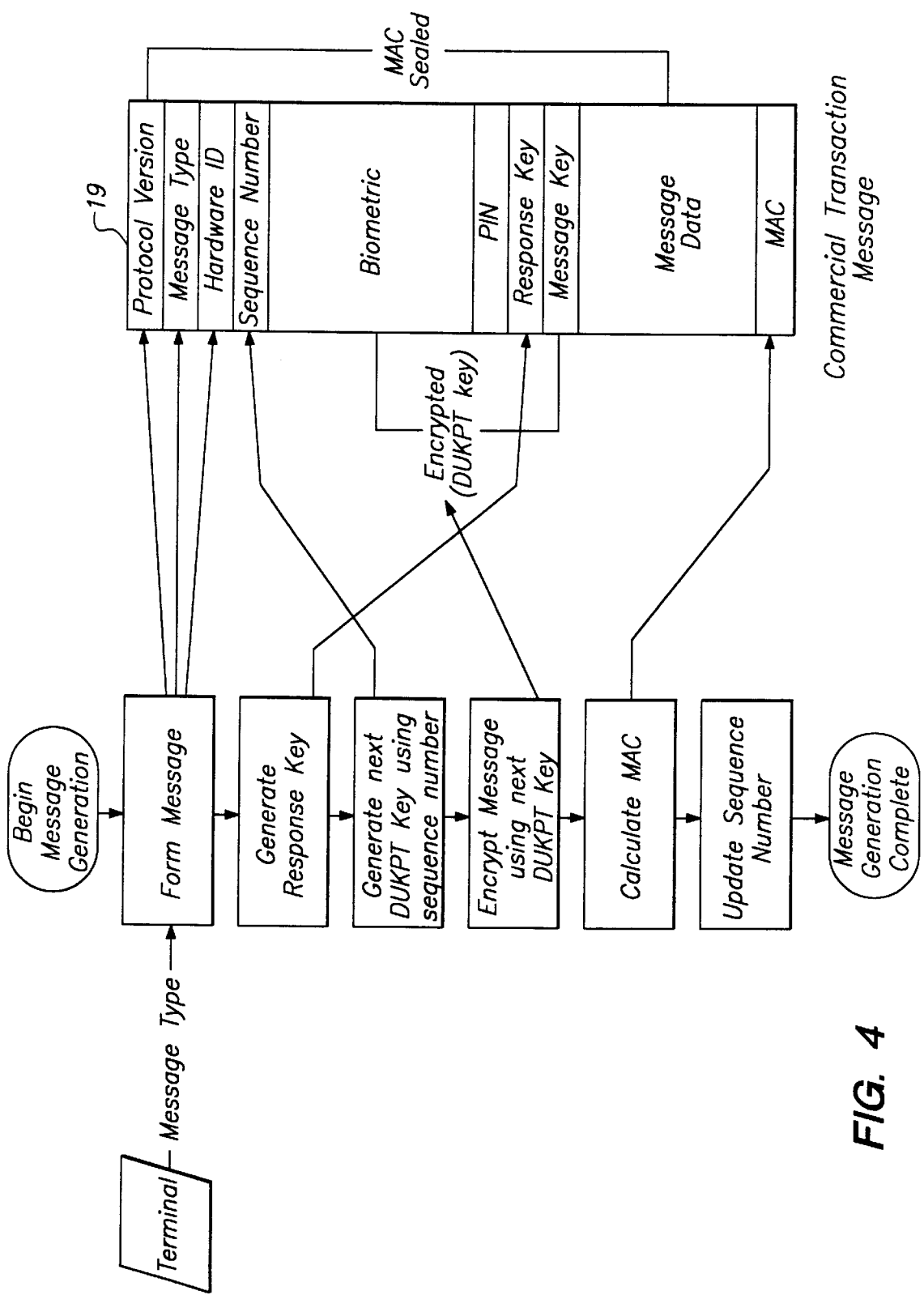
FIG. 4 is a flow chart of the operation of the biometric input apparatus and the terminal for generating a commercial transaction message.
Figure 6:
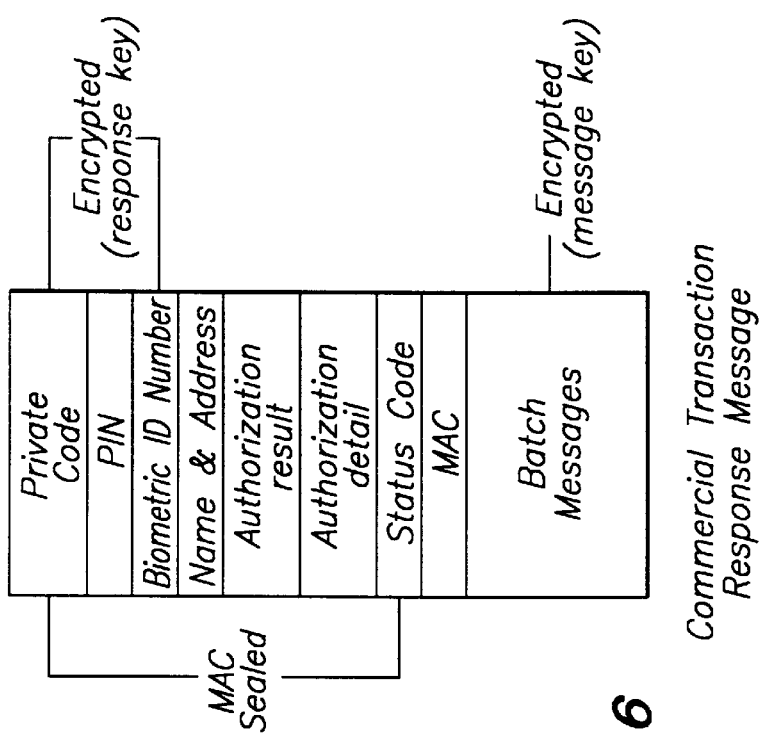
FIG. 6 is a representational diagram of a sample commercial transaction response message.
Figure 5:
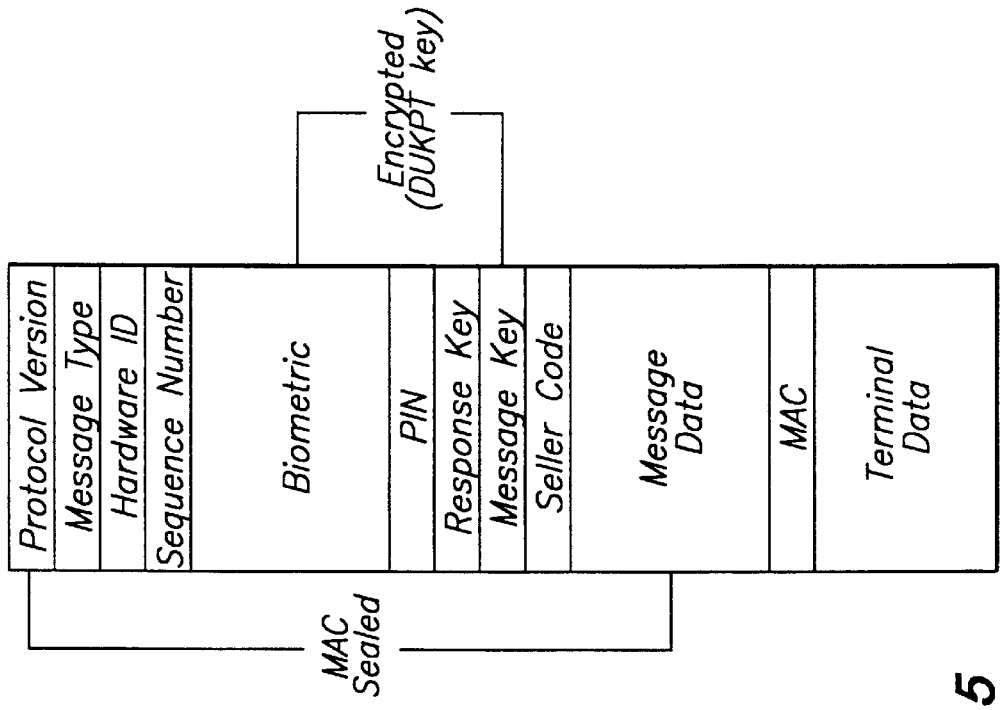
FIG. 5 is a representational diagram of a sample commercial transaction message.
Figure 7:
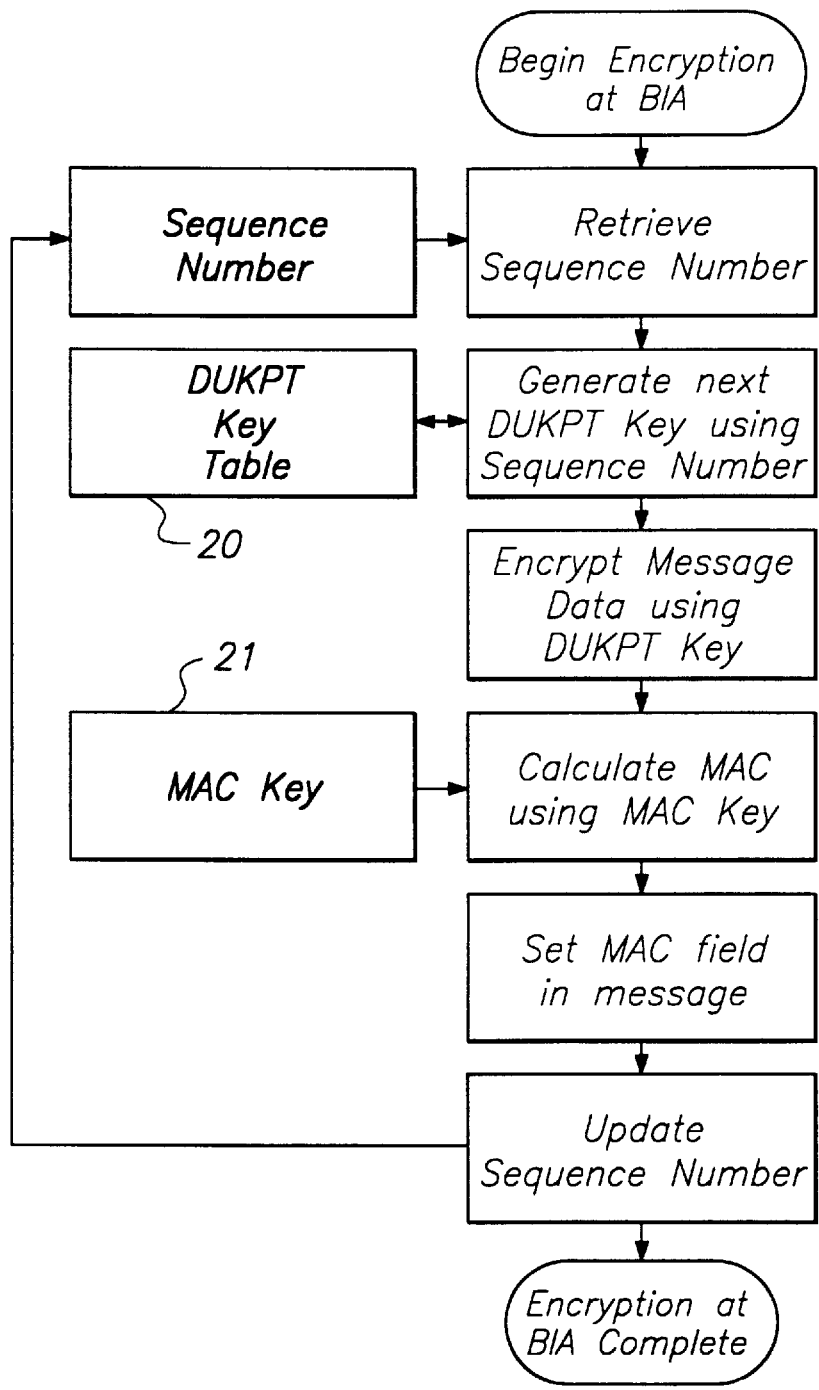
FIG. 7 is a flow chart depicting the data encryption and sealing process at the biometric input device.
Figure 8:
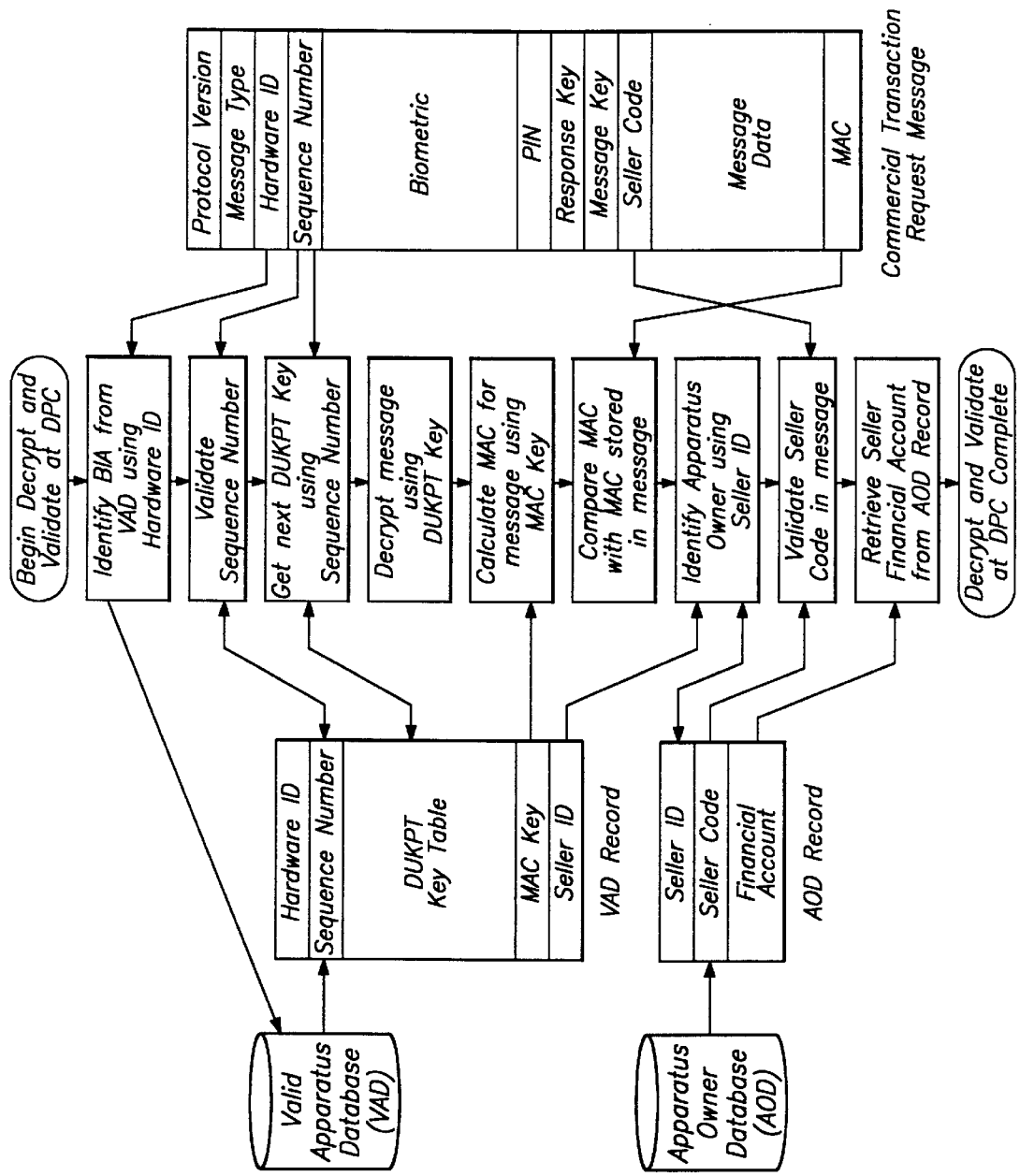
FIG. 8 is a flow chart depicting the message decryption and seller identification validation at the DPC.
Figure 9:
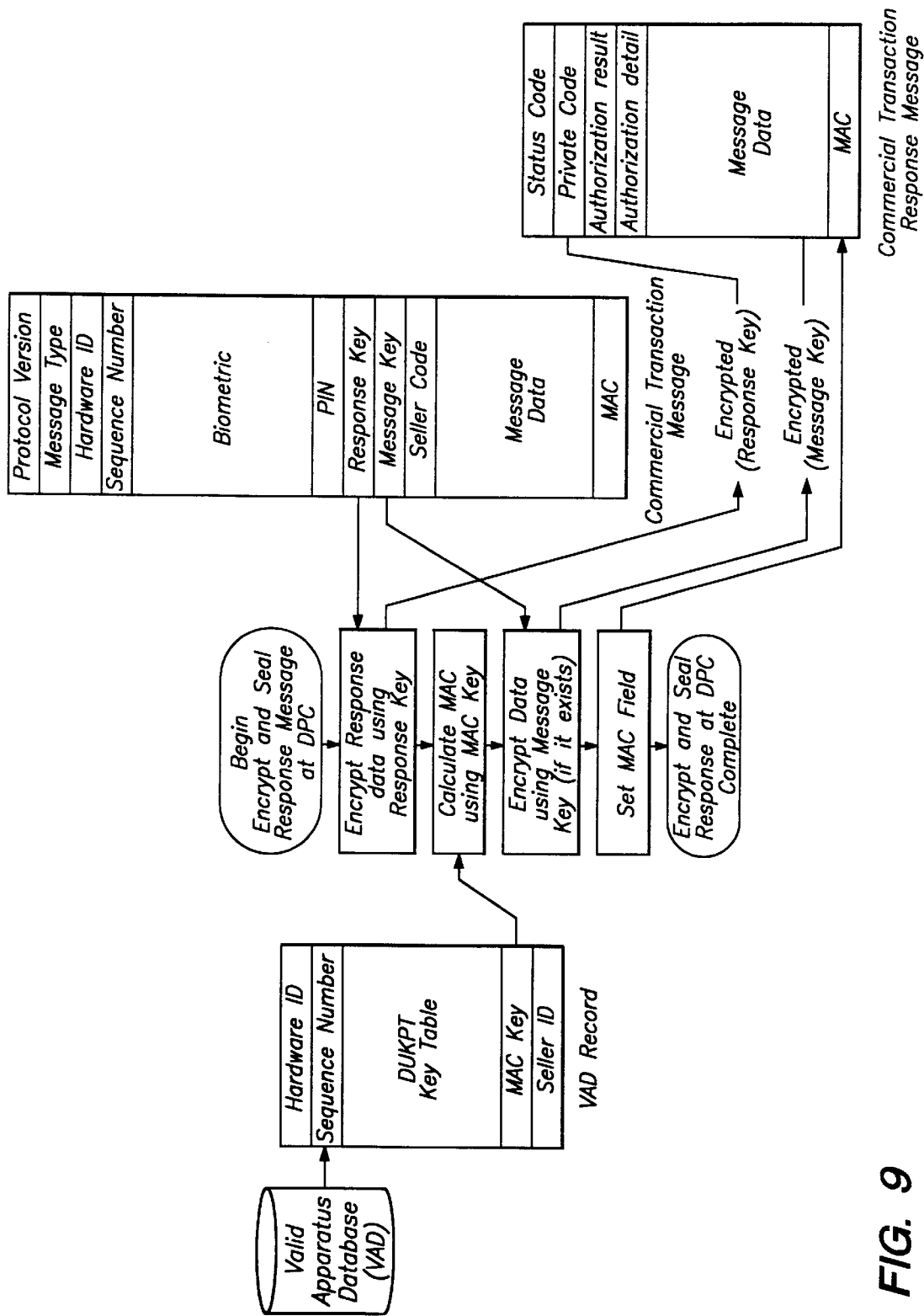
FIG. 9 is a flow chart depicting the data encryption and sealing process at the DPC.
Figure 10:
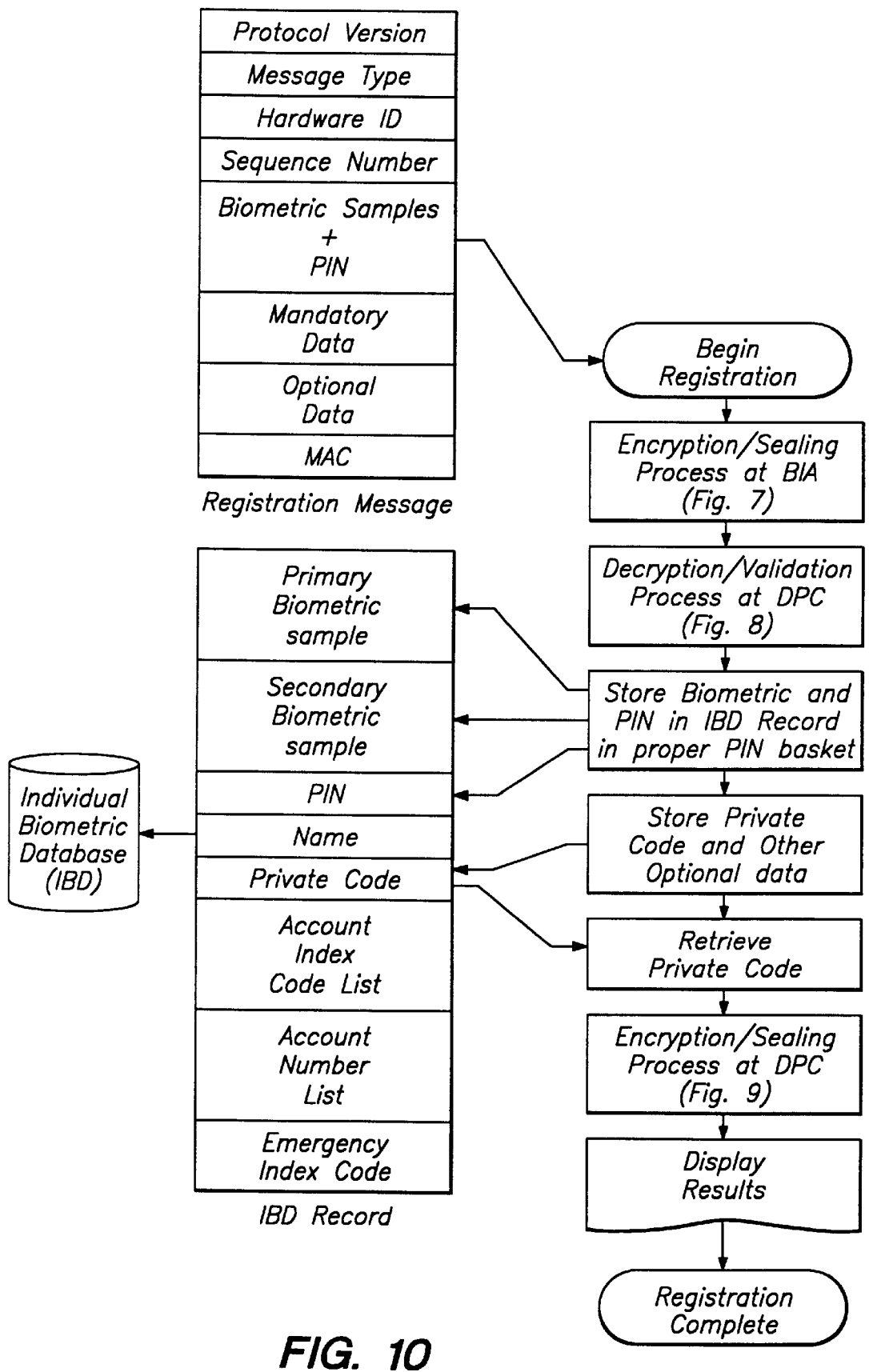
FIG. 10 is a flow chart representing the registration of a buyer during the registration process.
Figure 11:
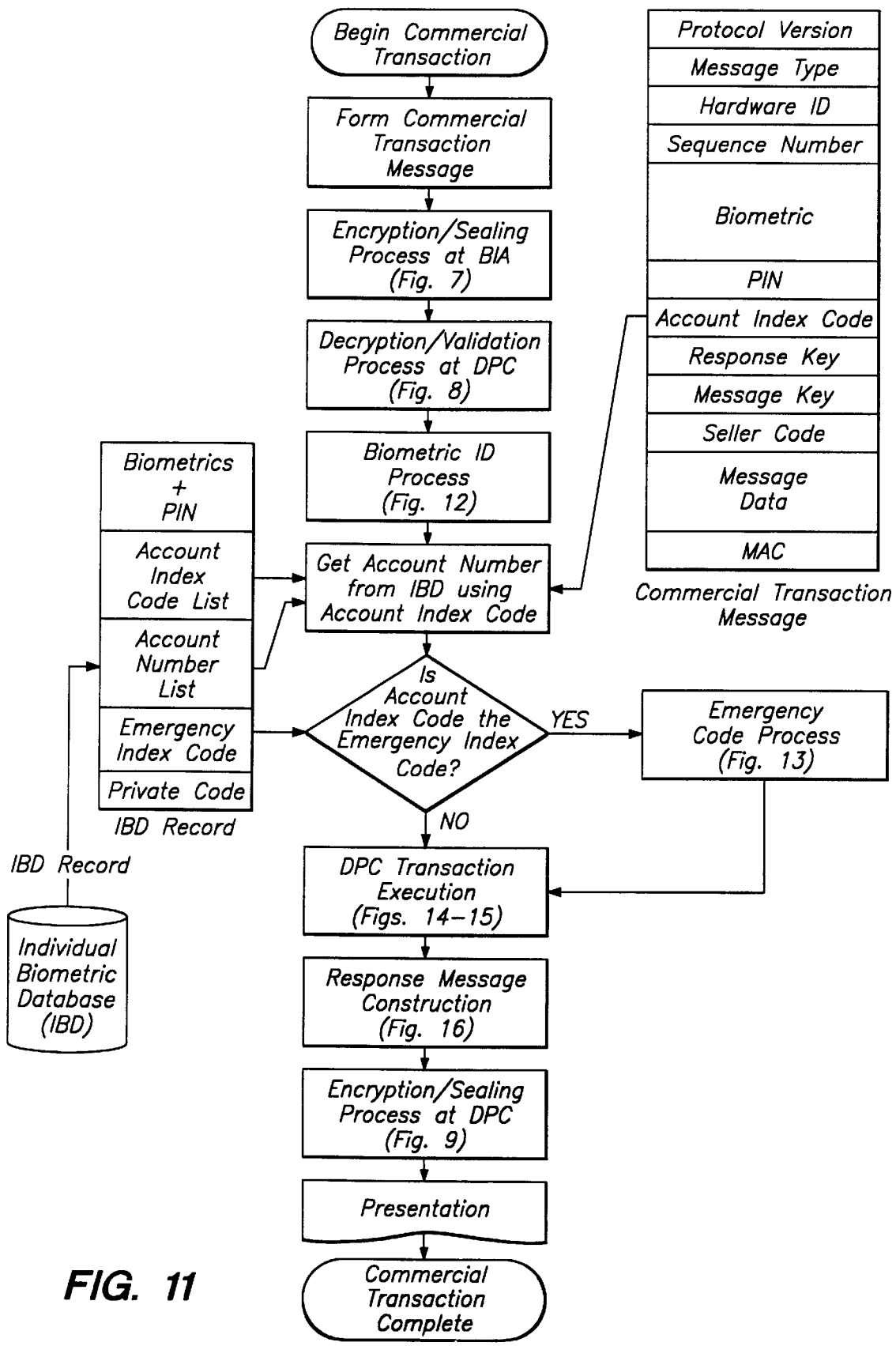
FIG. 11 is a flow chart of the operations performed in order to transmit, execute, and present the results of a commercial transaction message.
Figure 12:
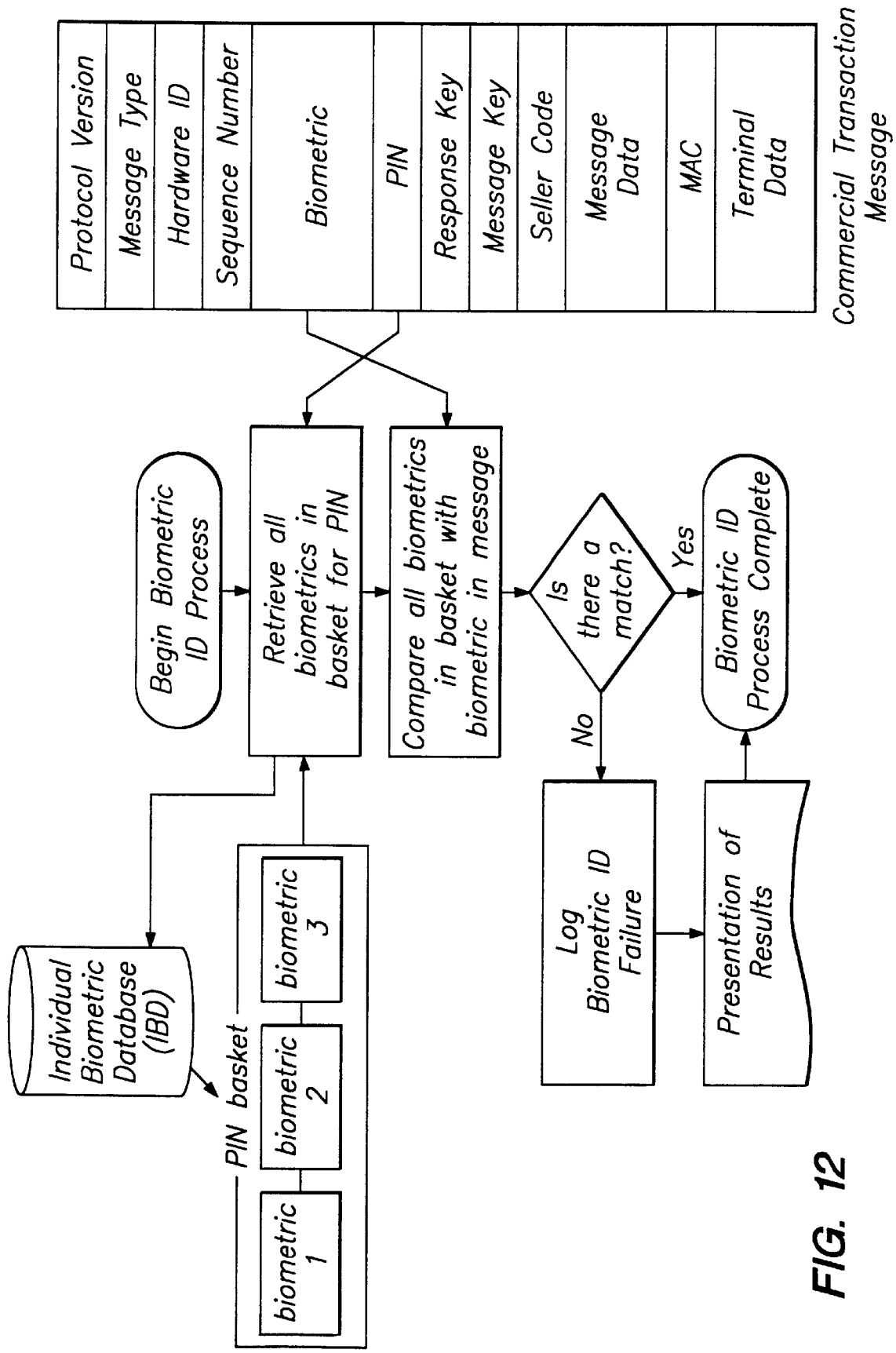
FIG. 12 is a flow chart of the biometric identification process at the DPC.
Figure 14:
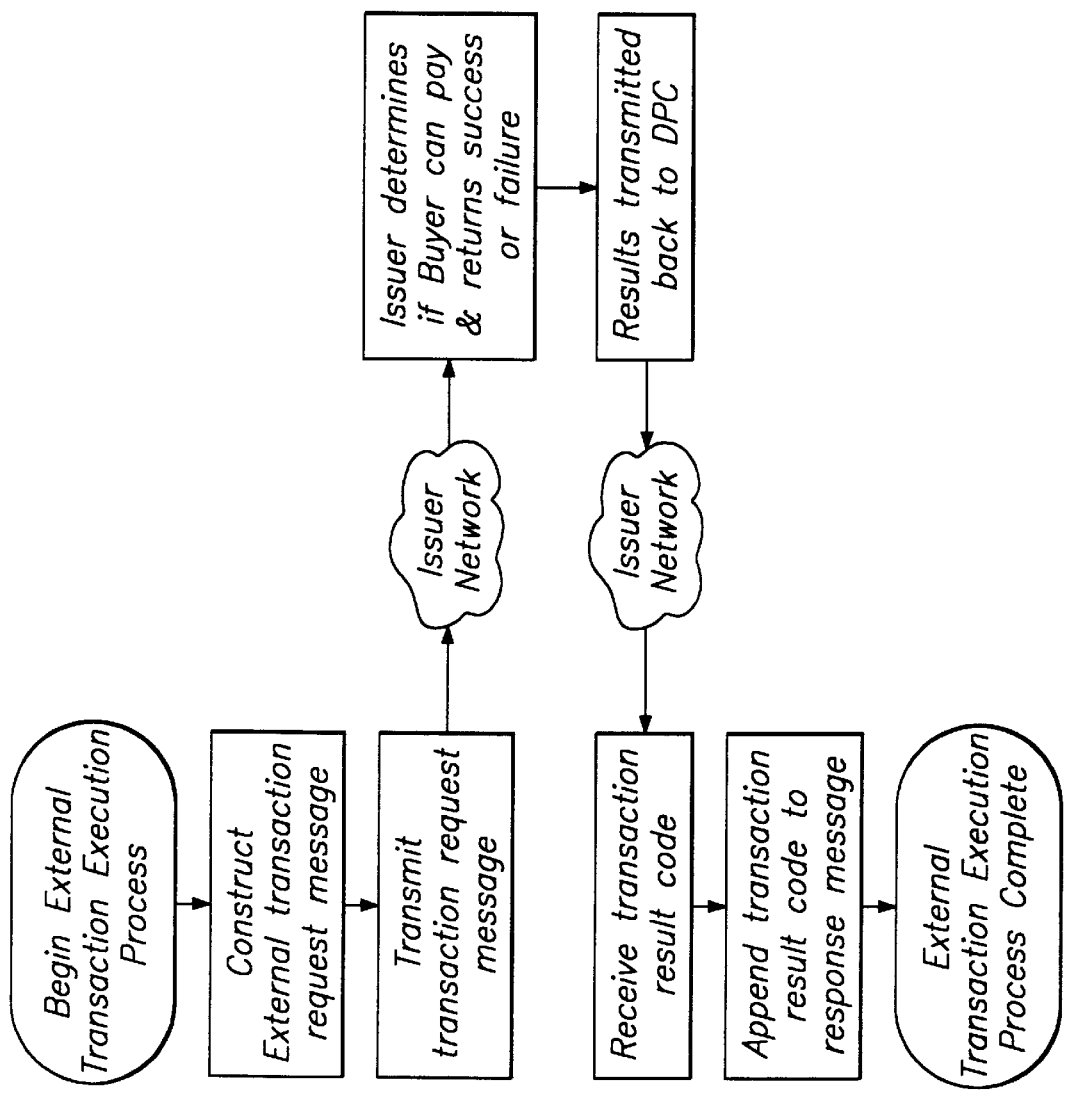
FIG. 14 is a flow chart of the execution of a transaction by an external computer system.
Figure 13:
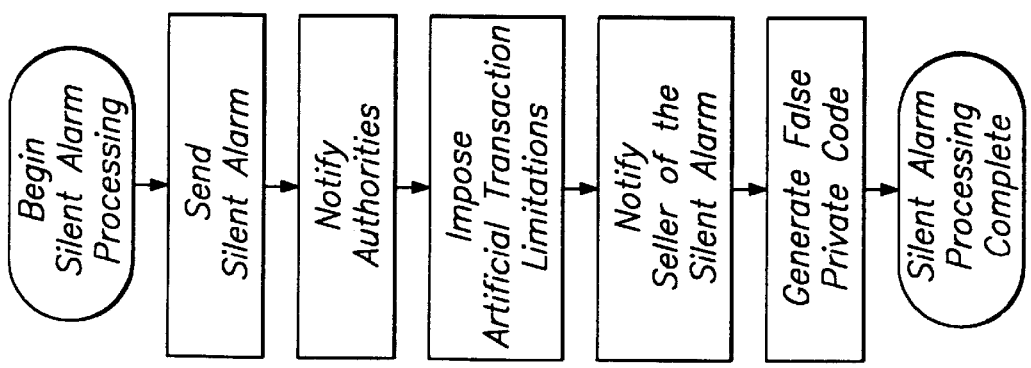
FIG. 13 is a flow chart of the silent alarm process at the DPC.
Figure 15:
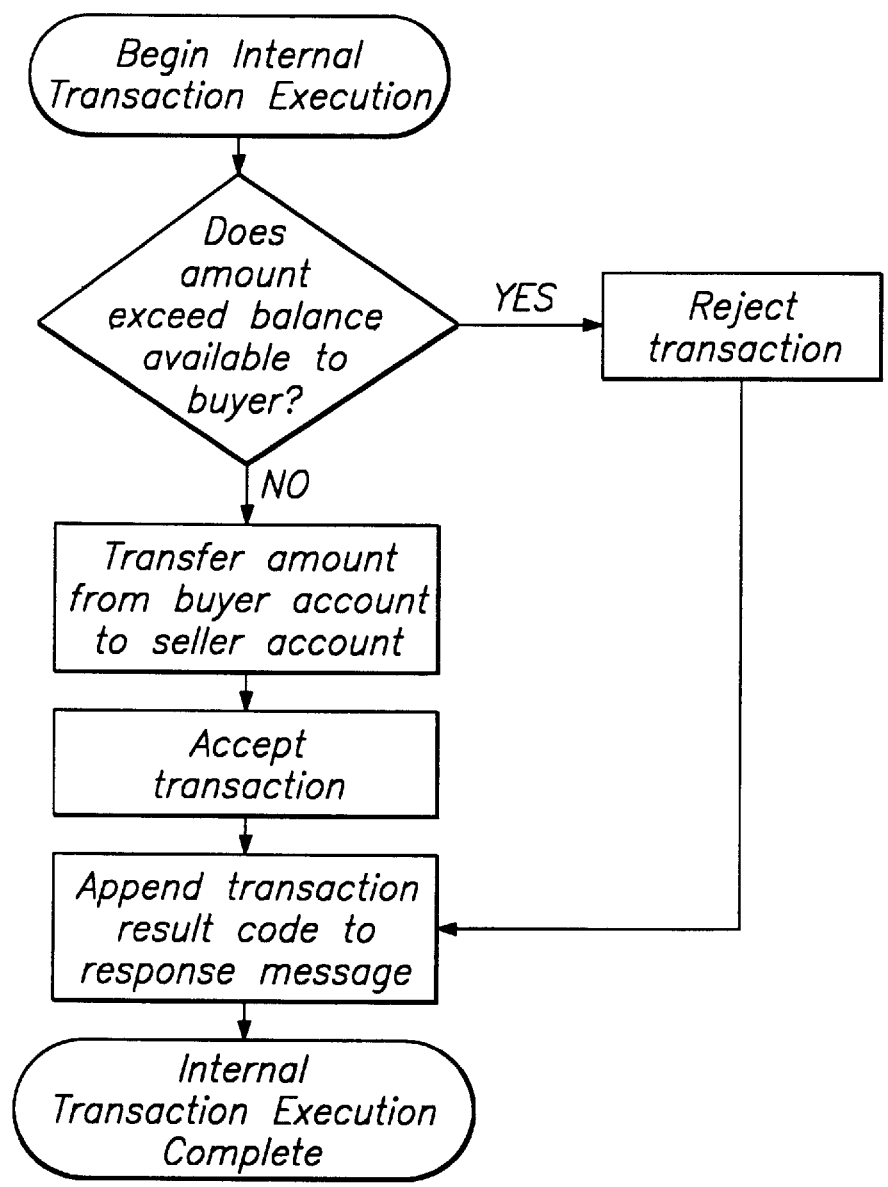
FIG. 15 is a flow chart of the execution of a transaction by the DPC.
Figure 16:
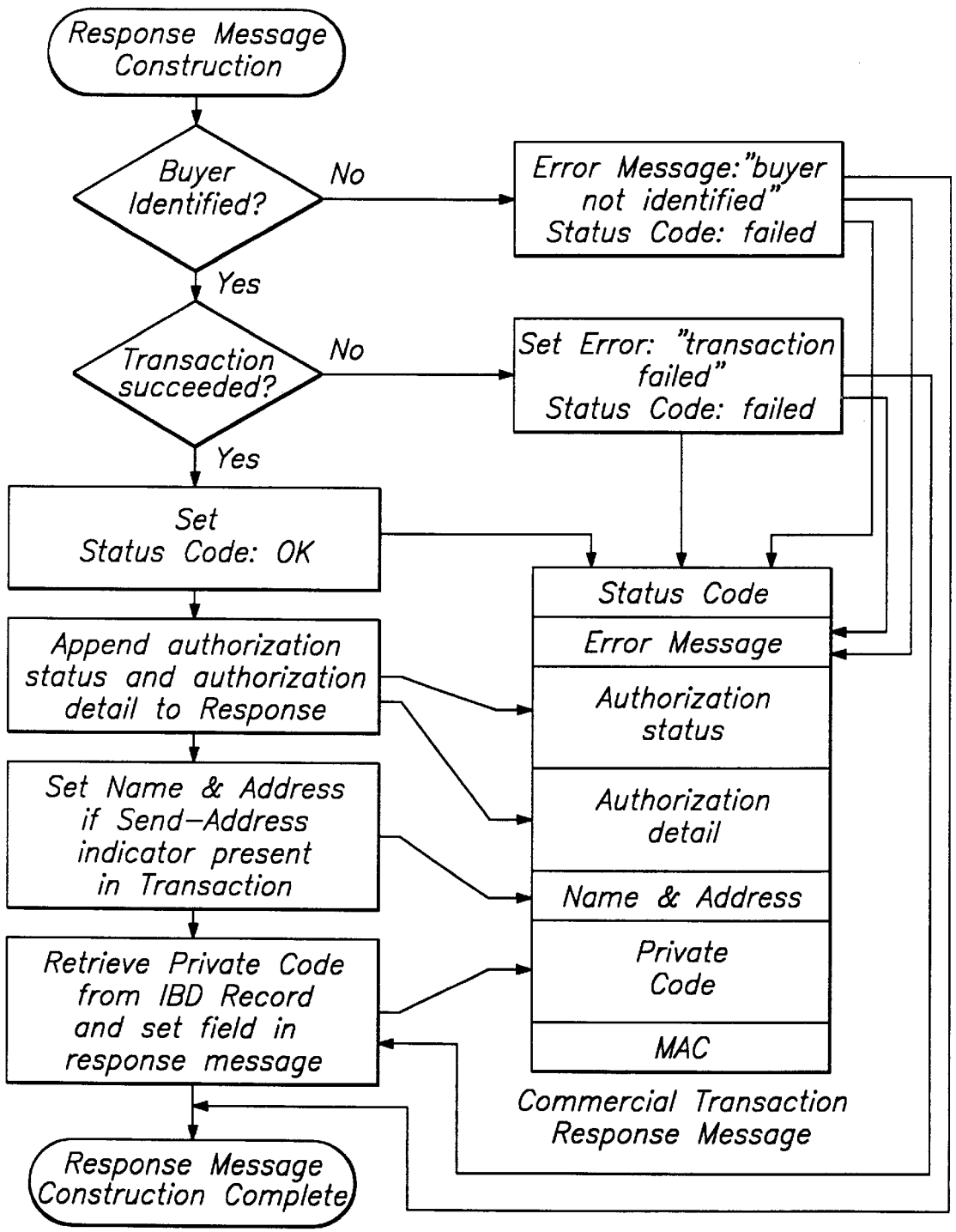
FIG. 16 is a flow chart of the construction of a response message for a given commercial transaction message.
Figure 17:
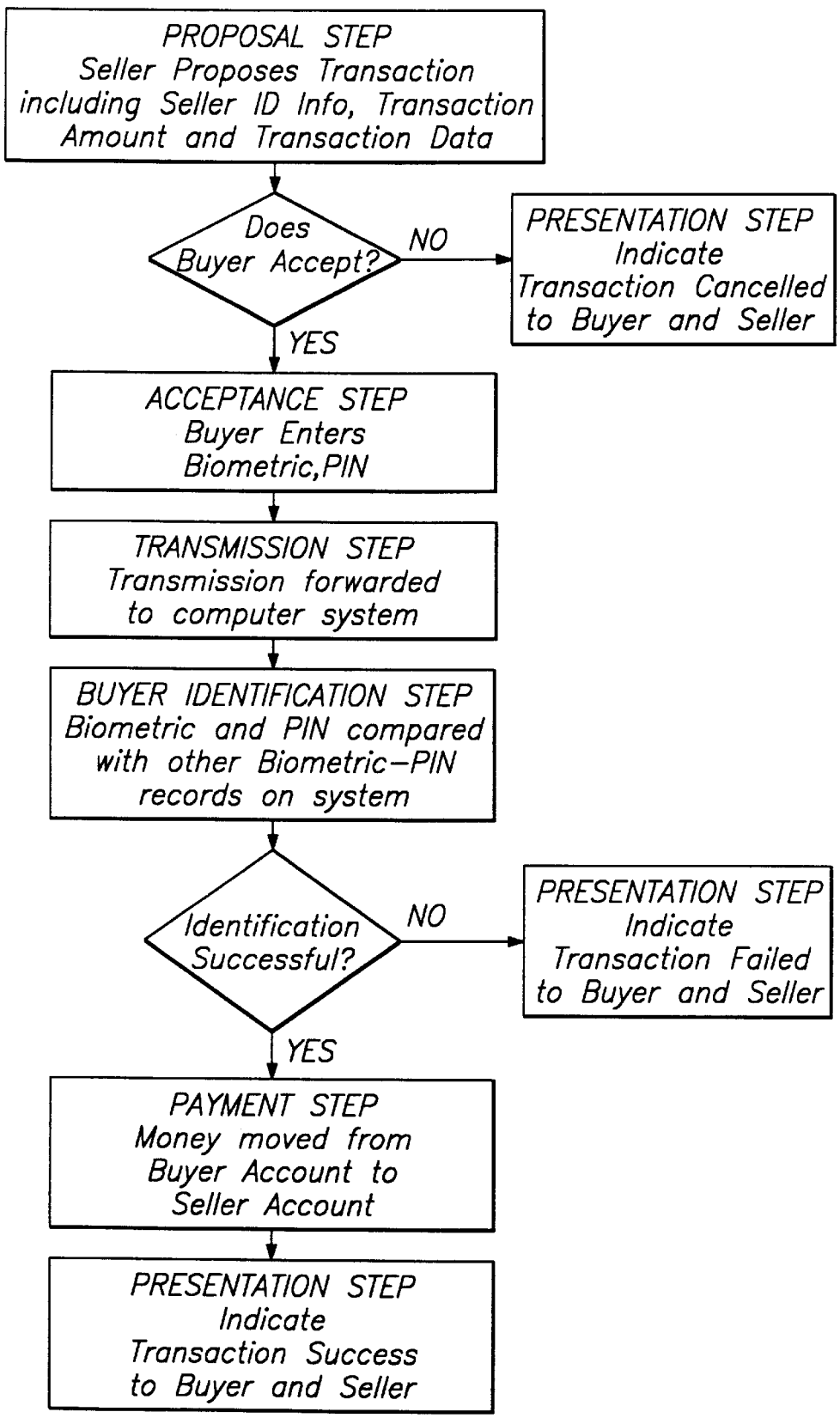
FIG. 17 is a flow chart of the general steps taken during the authorization of a commercial transaction.
Figure 18:
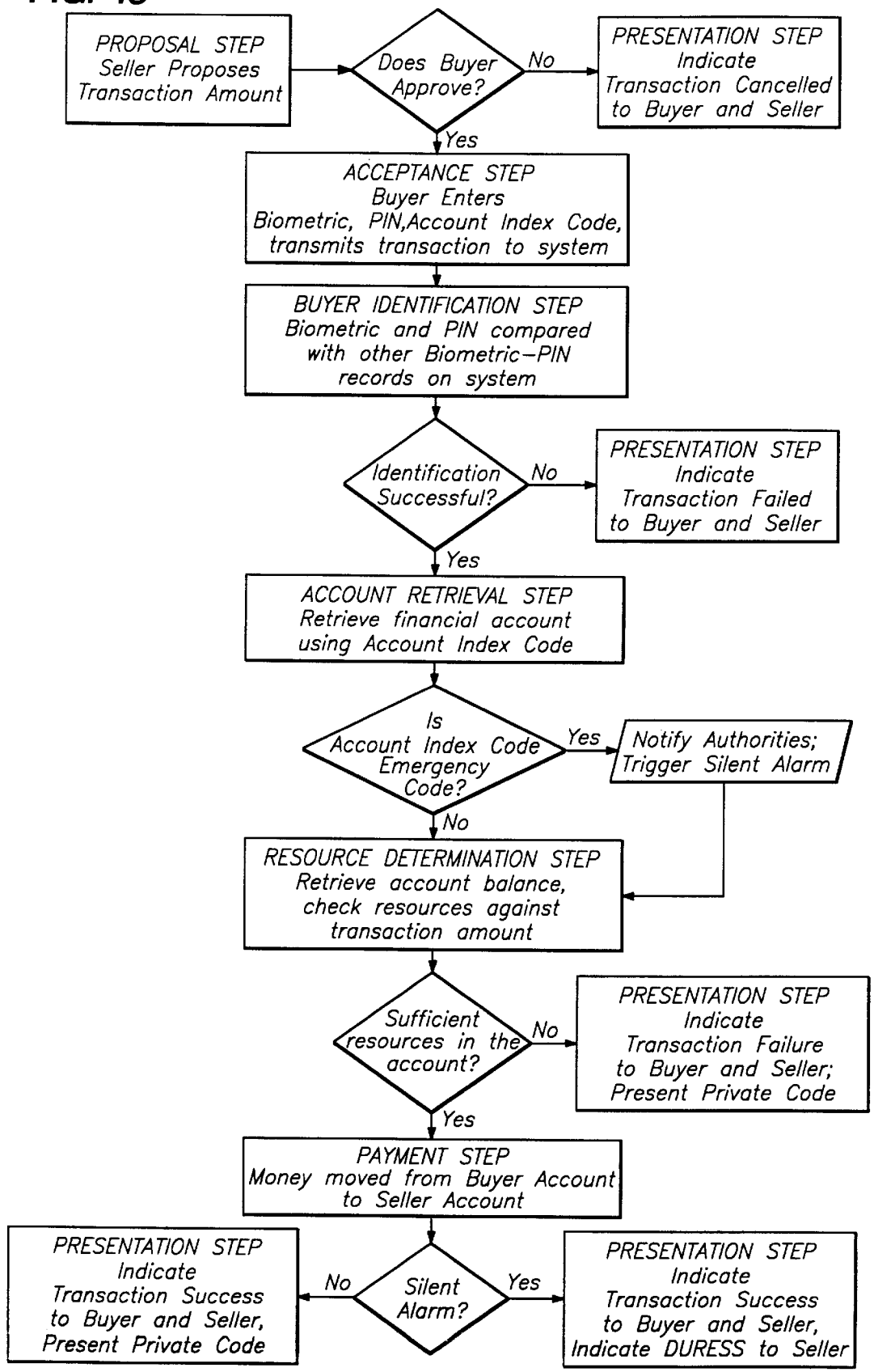
FIG. 18 is a flow chart of the general steps taken during the authorization of a commercial transaction in another embodiment.

Turning now to the figures, the overall configuration of the invention and its components are shown in FIG. 1. Essentially a Data Processing Center (DPC) 1 is connected to various terminals 2 through various types of communication means 3. The DPC is also connected and communicates with independent computer networks 4. The DPC contains several databases and software execution modules as shown in FIG. 2. In a preferred embodiment of the invention, the databases are backed up or "mirrored" in distinct physical locations for safety reasons. The Firewall Machine 5 is responsible for prevention of electronic intrusion of the system while the Gateway Machine 6 is responsible for routing all requests from the user, including adding, deleting and otherwise modifying all databases. The Gateway Machine is also responsible for decryption and de-packaging of data that has arrived from the terminals using the MACM module 7, MDM module 8, and the SNM module 9. The PGL module 10, and the IML module 11 are used to locate the proper PIN code and biometric basket. FIG. 3 depicts an example of a terminal 2 and the biometric input device 12, which has a biometric scanner 13, data entry means such as a key pad or PIN pad 14, and a display panel 15. The biometric scanner can be any one of fingerprint scanner, voice input device (microphone), palm print scanner, retinal scanner or the like, although the fingerprint scanner will be used as an example. The biometric input device is further equipped with computing modules 16, device drivers, and erasable and non-erasable memory modules. The biometric input device communicates with the terminal through preferably a serial port 17. The terminal 2 communicates through a modem 18 with the DPC 1 through messages 19 and responses 20 using one of the interconnecting means in FIG. 1 such as a cable TV network, cellular telephone network, telephone network, the Internet, or an X.25 network. FIG. 4 shows a representational diagram of the commercial transaction message 19 and its method of generation by the biometric input device software. FIG. 5 and FIG. 6 show a representational diagram of the commercial transaction message and response message. Furthermore, it is shown which parts of the messages are encrypted and which ones are sealed. FIG. 7 is a block diagram of the overall process for data encryption and sealing showing the use of DUKPT key data 20 for encryption of data before appending additional data before sealing the message with a Message Authentication Code (MAC) 21. FIG. 8 and FIG. 9 show the encryption and decryption process at the DPC. FIG. 10 shows the steps taken during the registration of a new buyer. FIG. 11 describes the steps involved in processing a commercial transaction message, starting from its formation at the BIA, all processing by the DPC, and then finally the presentation of results by the BIA. FIG. 12 describes the biometric ID process at the DPC. FIG. 13 describes the processing of silent alarms at the DPC. FIG. 14 and 15 describe the processing required to determine resources of a buyer and execute payment from a buyer to a seller, both internally to the DPC as well as externally via an external computer system. FIG. 16 describes how the DPC constructs a response to a particular commercial transaction. FIG. 17 and FIG. 18 are a description on the steps taken to process a commercial transaction, from proposal through presentation of results.

Description of the drawings, diagrams, flow charts and the description of the invention, including hardware components, software components, execution modules, databases, connection means, the data transferred between them, and the method of the invention is described in detail as follows.

1.1. Biometric Input Apparatus (BIA)

1.1.1. Introduction

The BIA is a combination of hardware and software whose job is to gather, encode, and encrypt biometric input for use in commercial transaction. All actions of the BIA are directed by an outside controlling entity called a terminal, which issues commands and receives results over the BIA's serial line.

BIA hardware comes in four basic versions: standard, wireless, and integrated phone/cable television (or "CATV"). Each BIA hardware variant addresses a particular need in the marketplace. Based on the differences in construction, BIAs vary in their abilities to resist fraud, and so each BIA has a device security assessment value which is set for each BIA of that model type.

BIA software comes in seven basic versions: personal computer (or "PC"), retail, registration, internal, issuer, and integrated remote. Each software load provides a different, use-specific command set. For instance, the registration software load does not accept requests to form retail transaction messages. Likewise, the retail software command set cannot send buyer registration messages. To provide another layer of security, the DPC knows what software package is loaded into each BIA; any attempts by a BIA to send a message that it is normally not able to send is rejected by the DPC and the event is treated as a major security violation.

The ability of the invention to detect and combat seller-based fraud relies on the fact that the BIA's external interface is strictly limited, that the construction of the BIA makes it extremely difficult to tamper with the contents, that each BIA has its unique encryption codes that are known only to the DPC, and that each BIA is only allowed to perform operations limited to its designated function. Each biometric input means has a hardware identification code previously registered with the DPC, which makes the biometric input means uniquely identifiable to the DPC in each subsequent transmission from that biometric input device.

The BIA is constructed with the assumption that the controlling terminal is a source for fraud and deception. Terminals range from software applications running on personal computers to dedicated hardware/software systems developed for a particular use such as a retail point of sale. Regardless of the particular model, no BIA reveals unencrypted biometric information. BIA models without display means (such as LCD or LED screens) must reveal selected information (such as private codes) to the terminal for display, and as a result those particular terminal-BIA combinations are considered to be less secure.

Depending on the task at hand, BIA models are either partially or fully integrated with the terminal. Partially integrated devices are physically separate from the terminal, and they include wireless and standard retail point of sale BIAs. Fully integrated devices are contained within the physical enclosure of the terminal itself, for instance a telephone.

No BIA ever discloses any secret encryption codes to any external source.

1.1.2. BIA Models

Particular BIA hardware models have different configurations. They are introduced in brief here:

BIA
  Standard model has computing module, biometric scanner, display means, communications port, data entry means encased in tamper-resistant case, and electronic detection means.
BIA/Wireless
  Standard model, but serial line replaced with a wireless communications module using external antenna. Used in restaurant point of sale.
BIA/Catv
  Has a light-duty scanner and serial port, along with a multichip module. The fact that the display is part of the terminal and not the BIA means lower security because it must reveal the private code to the terminal. Used in telephones and CATV remotes. Weakest security, both because the display and PIN pad are part of the terminal not the BIA, and because of the low-cost nature of the market.

1.1.3. BIA Command Set Messages

Each BIA software command set provides a different set of operations. They are introduced briefly here:
BIA/Catv
  Remote Commercial Transaction
  List Accounts
BIA/Internal
  Buyer Identification
BIA/Issuer
  Issuer Batch
BIA/PC
  Remote Commercial Transaction
  List Accounts
BIA/Registration
  Buyer Identification
  Buyer Registration
  List Accounts
BIA/Retail
  Commercial Transaction
  List Accounts

1.1.4. BIA Hardware: Standard Model

The Standard BIA hardware is a multichip module combined with a single-print scanner, a display screen, a serial port, and a PIN pad encased in a hard tamper-resistant case that makes attempts to penetrate obvious while also providing RF shielding for the contents. The following components are amalgamated into a multichip module, called the BIA Multichip Module (a process for encapsulating several processors in one physical shell, well known in the industry), constructed to protect the communications pathways between the devices from easy wiretapping.
  Serial processor
  PIN pad processor
  LCD screen processor
  CCD scanner
  A/D processor
  High-speed DSP processor containing both flash and mask ROM
  General-purpose microprocessor
  Standard RAM
  EEPROM The following software packages and data are stored in mask ROM. Mask ROM is cheaper than other types of read only memory, but it is easily reverse engineered, and is not electronically erasable. As such only the noncritical commonly available code are placed here.
  MAC calculation library
  DUKPT Key Management library
  DES (with CBC) Encryption library
  Base-64 (8-bit to printable ASCII) converter library
  Public Key Encryption library
  Embedded Operating System
  Serial line device driver
  LCD device driver
  PIN pad device driver
  Scanner device driver
  Unique hardware identification code
  Multi-Language profiles The following standard data and software packages are stored in flash ROM. Flash ROM is more expensive, but it is much more difficult to reverse engineer, and most importantly, it is electronically erasable. All of the more critical information is stored here. Flash ROM is used in an attempt to increase the difficulty of duplicating a BIA.
  Unique DUKPT Future Key Table
  Unique 112-bit MAC Key
  DSP biometric quality determination algorithm
  DSP biometric encoding algorithm
  Random number generator algorithm
  Command function table The message sequence number, incremented each time a message is sent from the BIA, is stored in the EEPROM. EEPROM can be erased many times, but is also nonvolatile—its contents remain valid across power interruptions The following data is stored in RAM. RAM is temporary in nature, and its contents are lost whenever power is lost.

Encoded Biometric Register

PIN Register

Account Index Code Register

Amount Register

PIN-Block Key

Message Key

Response Key

8 General Registers stack and heap space Each multichip module contains a "write-once" memory location that is irreversibly set following the initialization of the flash ROM. Whenever an attempt is made to download software to the flash ROM, this memory location is checked; if it is already been set, then the BIA refuses to load. This way, critical software and data keys may only be downloaded once into the device, at the time of manufacture.

All registers and keys are explicitly cleared when a transaction is canceled. Once a transaction is completed, registers are cleared as well. Once a "form message" command is executed, biometric, PIN, and account index code registers are also cleared, along with any encryption keys that aren't required for subsequent use.

It is important that the software not keep copies of registers or keys in stack variables.

the following associated hardware components comprise the standard BIA hardware module.

BIA Multichip module

CCD single-print scanner capacitance detector plate (known in the industry)

lighted PIN keypad with auxiliary buttons 2-line 40-column LCD screen

RF shielding tamper-resistant case serial connection (up to 57.6 kb)

breech detection hardware (known in the industry)

optional thermite charge attached to Multichip module (known in the industry)

All temporary storage and internal hardware and software used to calculate these values are secured, which means they resist any attempt to determine their current values, or their means of functioning. This feature is essential for the security of the invention, just as it is critical that the "wiretapping" of a BIA and specifically the gathering of a Biometric-PIN Block for fraudulent means is made as difficult as possible.

The multichip module and the components are physically connected to each other without exposed wiring.

The enclosure protecting the electronic components of the BIA is welded shut during manufacture; it cannot be opened under any circumstances without significant damage to the case. Upon detecting any opening (or damage) of the enclosure, the BIA performs an emergency electronic zero of any and all keys residing in flash ROM, followed by all of the software libraries. Specific breech detection methods are kept confidential and proprietary.

In addition to protecting the contents, the case also shields the internal operations from RF signal detectors.

Supersecure versions of the BIA exist whereby breech detection methods are connected to a mechanism that physically destroys the multichip module as well as the detection methods themselves.

Auxiliary buttons are used to specify particular operations, such as the list accounts operation, or the help operation, to display information that is not generally associated with a transaction.

1.1.5. BIA Hardware: Wireless Model

The Wireless version of BIA hardware is identical to the Standard model in construction, except that it communicates with the terminal using a spread-spectrum wireless communications module instead of a standard serial port.

This version is designed to be used in locations such as restaurants, where transactions are authorized at the buyer's convenience.

This device contains no Serial Port, however it does have an external antenna, and a spread-spectrum wireless serial transmission unit for communicating with the remote cash register Terminal.

1.1.6. BIA Hardware: Phone/CATV Model

The Phone/CATV version of BIA hardware is a multichip module combined with a single-print scanner and a serial port. The module is physically attached to the scanner, and the whole is encased in plastic in order to make tampering more difficult. Some amount of RF shielding is provided for the components.

This version is designed to be integrated with telephones and television remote controls. As a result, it makes use of the existing keypads and LCD or television screens to enter or display values, rather than having its own display and keypad entry device. It also uses the communication facilities of the host terminal. For example, the television remote uses the CATV cable network to send its signals to the DPC.

This hardware model is (in comparison with other models) relatively insecure, as it is intended that these devices cost as little as possible, be lightweight, and integrate easily with existing low-cost devices.

Of course, higher-security versions with more complete enclosures are possible and encouraged.

1.2. BIA Software

1.2.1. BIA Software Command Interface

The external interface to the BIA is much like a standard modem; commands are sent to it from a controlling terminal using the external serial line. When a command completes, a response code is sent from the BIA to the terminal. The particulars of the BIA software command interface detailed below illustrate one particular embodiment; other embodiments may mimic popular PIN pad interfaces, such as those manufactured by Verifone, Inc.

Each BIA software load supports a different set of operations. For instance, a retail load supports only commercial transactions, while a registration load supports buyer identification and buyer registration.

All BIA data fields are in printable ASCII, with fields separated by field separator control characters, and records separated by newlines. Encrypted fields are binary converted to 64-bit ASCII using the base-64 conversion library (all known in the industry).

Both the personal ID code and the account index code can be one or more alphanumeric characters, which includes numbers, letters, and other characters. For foreign languages, this includes multiple-character combinations which are used to represent specific words or concepts in that language, such as kanji characters. For BIAs that just have a ten-digit keypad, the codes will simply be numbers as in a standard PIN code, though people may choose to use the standard telephone keypad alphabetic-to-keypad-number translations (e.g. ABC=1, DEF=2, etc.) to help them remember their codes.

1.2.1.1 Response Codes:

Out of time:

The time allotted for the command has expired. A message to that effect will be displayed on the LCD screen, if available. When time expires for a given command, the BIA acts as if the cancel button was pushed.

Canceled:

The "cancel" button has been pushed, and the entire operation has been canceled. This has the side effect of clearing all information which was gathered. A message to that effect will be displayed on the LCD screen, if available.

OK:

The command was successful.

Other:

Each command may have specific other response codes which are valid only for it. These response codes will generally have text accompanying the code, which will be displayed on the LCD screen if it is available.

Message:

This indicates that the command is ongoing, but that the BIA wants to send a message to the terminal with an interim result message. The result is also displayed on the LCD, if available. This facility is used for prompts, as well as status messages.

1.2.1.2 Commands

In the argument list of the commands below, the <> characters surround individual arguments, [] characters surround optional arguments, and the | character indicates that a given argument may be comprised of one of the choices presented.

Set Language <language-name>

This command selects from one of a number of different languages encoded within the BIA for prompting for user input.

Get Biometric <time> [primary|secondary]

This command requests the BIA to activate its scanner to get biometric input from the buyer, storing it into the Encoded Biometric Register.

First, the message "Please place finger on lighted panel" is displayed on the LCD panel and returned to the terminal. The scanner pad is illuminated, prompting the buyer to enter his biometric.

A <time> value of zero means that there is no limit to the time for biometric scan input.

When in scanning mode, a fingerprint scan is taken and given a preliminary analysis by the print quality algorithm. If the scan is not good enough, the BIA continues to take new scans until <time> seconds pass. As time passes and snapshots of the print are taken and analyzed, messages are posted to the LCD screen and sent to the terminal based on the problems detected by the print quality software. If no print of appropriate quality is forthcoming, the BIA returns an error code of time expired, displaying a message to that effect on the LCD.

Once the print quality algorithm affirms the quality of the print scan, the print's minutiae are then extracted by the print encoding algorithm. Only a subset of the minutiae are selected at random, with care taken to retain enough sufficient for identification. These minutiae are then ordered randomly, and are placed in the Encoded Biometric Register, producing a bid biometric sample. Then the BIA responds with the success result code.

If the [primary|secondary] is specified (only available in the buyer registration command set) then the entire minutiae set is selected, not just the smaller subset, producing a registration biometric sample. Likewise, primary/secondary biometric selection ends up placing the encoded biometric into the appropriate register.

Whether or not the operation succeeds, as soon as scanning has terminated, the light indicating that scanning is in progress is turned off.

It is important that the same biometric input yields different encodings, so as to complicate the task of anyone attempting to discover the encryption codes of a captured BIA. This is accomplished by the selection of a random subset or random ordering of the encoded biometric, although other methods are possible.

Get PIN <time>

This command requests the BIA to fill the PIN Register by reading from the keypad.

First, the message "Please enter your PIN, then press <enter>" is displayed on the LCD display and sent to the terminal, the appropriate keypad lights are turned on, and then keypad scanning begins.

Scanning terminates when either <time> number of seconds runs out, or when the buyer hits the "enter" key.

Note that the digits of the PIN are not displayed on the LCD panel, but for each digit the buyer types, a star "*" appears to give the buyer feedback. When the "correction" key is pressed, the last digit entered is erased, allowing the buyer to fix input mistakes.

When PIN input terminates, the keypad lights turns off.

If successful, the command returns OK.

Get Account Index Code <time>

First, the message "Now enter your account index code, then press <enter>" is displayed on the LCD and sent to the terminal. This prompts the buyer to enter his account index code. When each key is pressed, that value appears on the LCD panel. The correction button can be pressed to erase one of the values. When the "enter" button is pressed, the Account index code register is set.

During input, the appropriate keypad keys are lit, and when input is concluded, the keypad lights are turned off.

If successful, the command returns OK.

Validate Amount <amount> <time>

The Validate Amount command sends the message "Amount <amount> OK?" to the terminal, and displays it on the LCD screen. If the buyer confirms the amount by hitting the "yes" (or enter) button, the Amount Register is set to <amount>. The <amount> value must be a valid number, with no control characters or spaces, etc. During prompting, the yes, no, and cancel buttons are lit. Once prompting is complete, all the lights are turned off. This amount, along with the currency, forms the price information on a commercial transaction.

If the buyer enters "no", then the transaction is canceled.

Enter Amount <time>

The Enter Amount command sends the message "Enter amount" to the terminal, and also displays it on the LCD screen as well. The buyer must then enter the dollar amount himself. Each character entered is displayed on the LCD screen. All appropriate buttons are lit. If the enter button is hit, the Amount Register is set to be the value entered on the keyboard. Once entry is complete, all the lights are turned off.

This can be used for transactions where the buyer wishes to enter the total amount he will pay, perhaps as a result of a combination of a purchase with cash-back.

Assign Register <register> <text>

The assign register command sets the designated General <register> to have the value <text>. This is used to set information such as the seller identification code, the product information, and so on.

Get Message Key

The Get Message Key command causes the BIA to generate a 112-bit random key to be used by the controlling hardware to encrypt any message body that the controlling device wishes to add to the message. That generated key is returned by the BIA in hexadecimal format (known in the industry). The message key are then added to the biometric-PIN block.

Form Message <(type=buyer identification|commercial transaction . . . >

The form message command instructs the BIA to output a message containing all the information it has gathered. It also checks to make sure that all the registers appropriate to that specific message <type> have been set. If all required registers are not set, the BIA returns with an error. The specific command set software will determine which messages can be formed by that BIA model; all others will be rejected.

Each message includes a transmission code consisting of the BIA's unique hardware identification code and an incrementing sequence number. The transmission code allows the DPC to identify the sending BIA and to detect resubmission attacks.

The BIA uses the DUKPT key management system to select the biometric-PIN block encryption 112-bit DES key from the Future Key Table. This key is then used to encrypt the Biometric-PIN Block using cipher block chaining (CBC). In addition, a response DES key is also generated randomly, and is used by the DPC to encrypt the portions of the response that need to be encrypted.

Splitting the response key from the biometric-PIN block key is very important, since each encryption key must be used only within the context of its own responsibilities. That way, if someone were to break the key encoding the private code, it would not result in the disclosure of the biometric-PIN. All personal authentication information (the biometric and PIN) is stored within the biometric-PIN block.

The Biometric-PIN block consists of the following fields:

300-byte authorization biometric

4–12 digit PIN 112-bit response key

[optional 112-bit message key]

Note that the message key is only present if the controlling terminal has requested a message key for this message. It is up to the controlling terminal to encrypt any message body attached to the commercial transaction message using the message key.

Once all encryption is complete, the BIA outputs the body of the appropriate request message (such as a Commercial Transaction message), terminated by and protected with the Message Authentication Code (MAC).

The MAC field is calculated using the BIA's secret 112-bit DES MAC key, and covers all message fields from first to last. The MAC assures the DPC that nothing in the message has changed effectively sealing the message, while still allowing the plaintext fields to be inspected by the controlling terminal.

When the Form Message command is done, the BIA sends the message "I'm talking to DPC Central" to the terminal as well as displaying it on the LCD screen, indicating that work is proceeding on the request.

The command returns OK in addition to returning the entire formed message upon completion of the command.

Show Response <encrypted response> <time>

The Show Response command instructs the BIA to use its current Response Key to decrypt the response from the system.

After decryption, a chime sounds or the PIN pad light flashes, and the private code is displayed on the LCD screen for <time> seconds. At no time does this command transmit the decrypted private code to the controlling terminal.

Any other information located in the response message is returned to the terminal, such as an authorization code that is returned from a credit authorization. Thus, existing systems that require two-step transactions can be accommodated.

Reset

The Reset command instructs the BIA to clear all temporary registers, the LCD screen, all temporary Key registers, and to turn off all keypad lights that may be on.

Set PIN <value>

This command assigns the BIA's PIN Register to be <value>.

Note that allowing a non-secured device to provide the PIN is a potential security problem, because non-secured devices are much more vulnerable to wiretapping or replacement.

Set Account index code <value>

This command assigns the BIA's Account index code Register to be <value>.

Note that allowing a non-secured device to provide the account index code is a potential security problem, because non-secured devices are much more vulnerable to wiretapping or replacement.

Set Amount <value>

This command assigns the BIA's Amount Register to be <value>.

Decrypt Response <encrypted response message>

The Decrypt Response command instructs the BIA to use its current Response Key to decrypt the encrypted portion of the response message. Once decrypted, the response is returned to the controlling device, presumably for display on the terminal's LED screen.

Note that providing this decryption ability is a security problem, as once the plaintext leaves the BIA, the terminal has the ability to do with it what it will.

1.2.2. BIA Software: Support Libraries

The BIA software is supported by several different software libraries. Some of them are standard, generally available libraries, but some have special requirements in the context of the BIA.

1.2.2.1. Random Number Generator

Since the BIA is constantly selecting random DES keys for use in the message body and message response encryption, it is important that the keys selected be unpredictable keys. If the random number generator is based on time of day, or on some other externally-predictable mechanism, then the encryption keys will be much more easily guessed by an adversary that happens to know the algorithm. The security of the encryption techniques used in the BIA assumes that both the random number generator algorithm as well as the encryption algorithms are both publicly known.

One such random number algorithm for generating DES keys is defined in ANSI X9.17, appendix C.

1.2.2.2. DSP Biometric Encoding Algorithms

The biometric encoding algorithm is a proprietary algorithm for locating the minutiae that are formed by ridge endings and bifurcations on human fingertips. A complete list of minutiae is stored in the DPC as a reference, while only a partial list is required by the algorithm when performing a comparison between an identification candidate and a registered buyer.

During both registration as well as identification, the encoding algorithm must find a reasonable number of minutiae points. Otherwise, the BIA will ask for the biometric to be re-entered.

1.2.2.3. Operating System and Device Drivers

The BIA is a real-time computing environment, and as such requires a real-time embedded operating system to run it. The operating system is responsible for taking interrupts from devices and scheduling tasks.

Each device driver is responsible for the interface between the operating system and the specific hardware, such as the PIN pad device driver, or the CCD Scanner device driver. Hardware is the source for events such as "PIN pad key pressed," or "CCD Scanner scan complete". The device driver handles such interrupts, interprets the events, and then takes action on the events.

1.2.2.4. DES Encryption Library

There are any number of DES implementations publicly available. DES implementations provide a secret key-based encryption from plaintext to ciphertext, and decryption from ciphertext to plaintext, using 112-bit secret keys.

1.2.2.5. Public Key Encryption Library

Public Key encryption support libraries are available from Public Key Partners, holders of the RSA public key patent (known in the industry). Public Key cryptosystems are asymmetric encryption systems that allow communication to take place without requiring a costly exchange of secret keys. To use a public key encryption system, a public key is used to encrypt a DES key, and then the DES key is used to encrypt a message. The BIA uses public key cryptosystems to provide for the secure exchange of secret keys.

1.2.2.6. DUKPT Key Management Library

The derived unique key per transaction key (DUKPT) management library is used to create future DES keys given an initial key and a message sequence number. Future keys are stored in a Future Key Table. Once used, a given key is cleared from the table. Initial keys are only used to generate the initial future key table. Therefore the initial key is not stored by the BIA The use of DUKPT is designed to create a key management mechanism that provided a different DES key for each transaction, without leaving behind the trace of the initial key. The implications of this are that even successful capture and dissection of a given future key table does not reveal messages that were previously sent, a very important goal when the effective lifetime of the information transmitted is decades. DUKPT is fully specified in ANSI X9.24.

DUKPT was originally developed to support PIN encryption mechanisms for debit card transactions. In this environment, it was critical to protect all transactions. An assumption is made that a criminal records encrypted transactions for a six month period, and then captures and successfully extracts the encryption code from the PIN pad. The criminal could then manufacture one new counterfeit debit card for each card used during that six month period.

Under DUKPT, however, the criminal's theft and reverse engineering would not allow him to decrypt previous messages, although new messages would still be decryptable if the criminal were to replace the PIN pad subsequent to reverse engineering.

In the biometric-PIN situation, the criminal has an even harder time, as even if messages are decrypted, turning a digital biometric-PIN into a physical fingerprint is much harder than turning an account number-PIN into a plastic card, which is one of the significant benefits of the tokenless system.

Still, if a criminal can decrypt, he can encrypt, which might allow him to electronically submit a biometric-PIN to the system to authorize a fraudulent transaction. While this is quite difficult, it is still best to restrict the options available to the criminal as much as possible, hence the use of DUKPT.

1.3. BIA Software Command Sets

1.3.1. BIA Software: Retail Command Set

The BIA/Retail software interface exports an interface that allows specific retail point of sale terminals to interact with the system.

The BIA/Retail interface is designed to allow the terminal to perform the following operation:

Commercial Transaction

List Accounts

In order to implement those operations, the BIA/Retail provides the following command set:

Set Language <language-name>

Get Biometric <time>

Get PIN <time>

Assign Register <register> <value>

Get Account index code <time>

Validate Amount <amount> <time>

Enter Amount <time>

Form Message <type>

Show Response <encrypted response> <time>

Reset

1.3.2. BIA Software: CATV (Integrated Remote) Command Set

The BIA/CATV software interface exports a command set that allows terminals integrated with a Phone/CATV BIAs to interact with the system. The following operation is supported:

Remote Commercial Transaction

List Accounts

In order to implement that operation, the BIA/CATV provides the following command set:

Get Biometric <time>

Set PIN <text>

Assign Register <register> <text>

Set Account index code <text>

Form Message <type>

Decrypt Response <encrypted response message>

Reset

1.3.3. BIA Software: Registration Command Set

The BIA/Reg software interface exports an interface that allows general-purpose computers to interact with the system to identify and register buyers. The following operations are supported:

Buyer Identification
Buyer Registration
List Accounts
In order to support those operations, the BIA/Reg provides the following command set:
Set Language <language-name>
Get Biometric <time> [primary|secondary]
Get PIN <time>
Assign Register <register> <text>
Get Message Key
Form Message <type>
Show Response <encrypted response> <time>
Reset

1.3.4. BIA Software: PC Command Set

The BIA/PC software interface exports a command set that allows general-purpose computers to conduct transactions across the network. The following operations are supported:
Remote Commercial Transaction
List Accounts
In order to support those operations, the BIA/PC provides the following command set:
Set Language <language-name>
Get Biometric <time>
Get PIN <time>
Get Account index code <time>
Validate Amount <amount> <time>
Enter Amount <time>
Assign Register <register> <text>
Get Message Key
Form Message <type>
Show Response <encrypted response> <time>
Reset

1.3.5. BIA Software: Issuer Command Set

The BIA/Iss software interface exports an interface that allows general-purpose computers to interact with the system to authenticate and submit batch change requests. The following operation is supported:
Issuer Batch
In order to implement this operation, the BIA/Iss provides the following command set:
Set Language <language-name>
Get Biometric <time> [primary|secondary]
Get PIN <time>
Assign Register <register> <value>
Get Message Key
Form Message <type>
Show Response <encrypted response> <time>
Reset

1.3.7. BIA Software: internal Command Set

The BIA/Int exports a command set that allows general-purpose computers to interact with the system to identify people for purposes of customer support terminals. The following operation is supported:
Buyer Identification
In order to implement this operation, the BIA/Int provides the following command set:
Set Language <language-name>
Get Biometric <time>
Get PIN <time>
Assign Register <register> <value>
Get Message Key
Form Message <type>
Show Response <encrypted response> <time>
Reset

1.4. Terminals

1.4.1. Introduction

The terminal is the device that controls the BIA and connects to the DPC via modem, X.25 packet network, telephone network, the Internet, a private intranet, or even a Cable TV network, or some other mechanism for digital networking that is well-known in the industry. Terminals come in different shapes and sizes, and require different versions of the BIA to perform their tasks. Any electronic device that can issue commands to and receive results from the biometric input device is considered to be a terminal.

Some terminals are application programs that run on a general-purpose microcomputer, while other terminals are combinations of special-purpose hardware and software as show in FIG. 1.

While the terminal is critical for the functioning of the system as a whole, the system itself places no trust in the terminal whatsoever. Whenever a terminal provides information to the system, the system always validates it in some manner, either through presentation to the buyer for confirmation, or by cross-checking through other previously registered information.

While terminals are able to read some parts of BIA messages in order to validate that the data was processed properly by the BIA, terminals cannot read biometric identification information including the biometric, the PIN, encryption keys, or account index codes.

Specific BIAs export some security functionality to the terminal, such as PIN entry, and private code display. As a result, such devices are regarded as somewhat less secure than their entirely self-contained counterparts, and as such have consequently lower security ratings.

There are many different terminal types; each is connected to a specific model BIA. Each terminal is described in brief below:

BRT (Buyer Registration Terminal)
Standard BIA with Registration software load attached to a microcomputer provides issuers with the ability to register new buyers with the system along with their financial accounts and other personal information.

CPT (Cable-TV Point of Sale Terminal)
BIA/catv with CATV software load attached to the CATV broadband provides buyers with biometric-television (or "TV") remotes with the ability to authorize television shopping purchases.

CST (Customer Service Terminal)
Standard BIA with Internal software load attached to a microcomputer system authorizes employees to construct database requests for the purposes of customer service.

IPT (Internet Point of Sale Terminal)
Standard BIA with personal computer software load attached to a microcomputer provides buyers with Internet connections the ability to purchase products from a seller that is connected to the Internet.

IT (Issuer Terminal)

Standard BIA with Issuer software load attached to a microcomputer provides issuerss with the ability to send batched changes of financial accounts to the DPC.

PPT (Phone Point of Sale Terminal)

BIA/catv with CATV software load integrated with a telephone provides buyers with the ability to authorize transactions over the telephone.

RPT (Retail Point of Sale Terminal)

Standard BIA with Retail software load attached to an X.25 network or using a modem allows a buyer to purchase items using commercial transactions in a store.

1.4.2. Terminal: Retail Point of Sale Terminal

1.4.2.1. Purpose

The purpose of the RPT is to allow buyers to purchase items at a store without having to use either cash, check, or a debit or credit card.

The RPT uses a BIA/Retail to authorize financial transactions from a buyer to a seller. In addition to being used to accept biometric-PIN authorizations, the RPT provides standard debit and credit card scanning functions as well.

Note that only the biometric-related transactions are described in detail here. It is assumed that the RPT may also consist of standard credit and debit magnetic stripe card readers, as well as optional smart card readers too. An example of a RPT is a Verifone Tranz/330.

1.4.2.2. Construction

Each RPT is connected to the DPC by a modem, an X.25 network connection, an ISDN connection, or similar mechanism. The RPT may also be connected to other devices, such as an electronic cash register, from which it obtains the amount of the transaction and the seller identification code.

The RPT consists of:

a BIA/Retail an inexpensive microprocessor modem or network interface hardware seller identification code number in non-volatile RAM a serial port for connecting to the BIA magnetic stripe card reader (known in the industry)

ECR (electronic cash register) connection port optional smart card reader (known in the industry)

1.4.2.3. Identification

Two entities need to be identified for the DPC to respond positively to a BIA commercial transaction message: the buyer and the seller.

The buyer is identified by the biometric-PIN, and the seller is identified by the DPC, which cross-checks the seller identification code contained in the BIA's VAD record with the seller identification code added to the transaction request by the RPT.

1.4.2.4. Operation

First, the seller enters the value of the transaction into his electronic cash register. This information is communicated to the BIA, along with the list of goods or services, date and time, any invoice numbers, the location, and the seller identification code. This represents the proposed commercial transaction. If the buyer approves, he either enters the amount or validates the amount, possibly asking for cash back, and then enters his biometric-PIN as well as his account index code. When the buyer completes his approval, the RPT instructs the BIA to construct the commercial transaction, and then sends the commercial transaction to the DPC through its network connection (modem, X.25, etc.).

When the DPC receives the transaction, it validates the biometric-PIN, obtains the account number using the index code, and cross-checks the seller identification code in the message with the registered owner of the BIA. If everything checks out, the DPC forms and sends a credit/debit transaction to execute the exchange, assuming the commercial transaction is to happen immediately. The response from the credit/debit network is added to the private code to form the transaction response message, which the DPC then sends back to the RPT. The RPT examines the response to see whether or not the transaction succeeded, and then forwards the response to the BIA, which then displays the buyer's private code, concluding the transaction.

1.4.2.5. Security

Messages between the RPT and the DPC are secured by encryption and MAC calculation from the BIA. The MAC allows the RPT to review the unencrypted parts of the message, but the RPT cannot change them. Encryption prevents the encrypted part of the message from being disclosed to the RPT.

Each retail BIA must be registered to a seller. This helps to discourage BIA theft. Furthermore, because the RPT adds the seller identification code onto each message, replacing a seller's BIA with a different BIA is detected by the cross-check performed at the DPC.

1.4.3. Terminal: Internet Point of Sale Terminal

1.4.3.1. Purpose

The purpose of an Internet Point of sale Terminal (IPT) is to authorize credit and debit financial transactions from a buyer at a computer to a seller, both of whom are on the Internet.

Note that the Internet simply represents a general-purpose network where a seller, the DPC, and the IPT can all connect to each other in real time. As a result, this mechanism would work exactly the same on any other general-purpose network or collection of interconnected general-purpose networks.

1.4.3.2. Construction

The IPT consists of:

a BIA/PC a microcomputer an Internet Shopper software application an Internet (or other network) connection

1.4.3.3. Identification

In addition to identifying the buyer, the IPT must also identify the remote seller who is the counterparty to the transaction. The seller must also identify both the DPC and the IPT.

The Internet Shopper program stores the hostname (or other form of net name) of the seller from which the purchase is taking place so that the DPC can verify the seller's identity. This is called the seller's identification channel. Since the seller registers all of his legitimate Internet hosts with the DPC, this allows the DPC to cross-check the seller identification code with the seller identification code stored under that hostname to verify the seller's identity.

1.4.3.4. Operation

First, the IPT connects to the seller using the Internet. Once a connection is established, the IPT secures it by generating and then sending a Session Key to the seller. In order to assure that the session key is protected from disclosure, it is encrypted with the seller's Public Key using Public Key Encryption. When the seller receives this encrypted Session Key, he decrypts it using his Private Key. This process is called securing a connection through a Public Key Encrypted secret key exchange.

Once connected, the IPT downloads the seller identification code, and both price and product information from the seller. Once the buyer is ready to make a purchase, he selects the merchandise he wishes to buy. Then, the buyer enters the biometric-PIN using the BIA/PC, the IPT sends the seller identification code, the product identification information, and the amount to the BIA, and instructs it to construct a Remote Commercial Transaction message. Then the IPT sends the request to the seller via the secure channel.

The seller is connected to the DPC via the same sort of secure connection that the IPT has with the seller, namely, using Public Key Encryption to send a secure session key. Unlike the IPT-seller connection, however, seller-DPC session keys are good for an entire day, not for just one connection.

The seller connects to the DPC, securing the connection using the session key, forwarding the transaction to the DPC for validation. The DPC validates the biometric-PIN, cross-checks the seller identification code contained in the request with the seller identification code stored under the hostname that was sent in the request, and then sends a transaction to the credit/debit network. Once the credit/debit network responds, the DPC constructs a response message including the credit/debit authorization, an encrypted private code, and the address of the buyer, and sends that message back to the seller.

Once the seller receives the response, it copies the buyer's mailing address out of the response, makes note of the authorization code, and forwards the response message to the IPT.

The IPT hands the response to the BIA, which decrypts the private code and displays it on the LCD screen, indicating that the DPC recognized the buyer. The IPT also shows the result of the transaction as well, be it success or failure.

1.4.3.5. Security

Since the system in general assumes that an adversary inhabiting the network can hijack network connections at any point, all parties must have secure communications during their real-time interactions. The main concern isn't disclosure of information, but rather insertion or redirection of messages.

The whole system of Public Key Encryption relies on having a trusted source for the Public Keys. These trusted sources are called Certifying Authorities, one of which is the company VeriSign, Inc.

1.4.4. Terminal: Buyer Registration Terminal

1.4.4.1. Purpose

The purpose of the Buyer Registration Terminal (BRT) is to register new buyers including their biometric-PIN, mailing address, private code, and a list of financial accounts and account index codes that they can access, all using their biometric-PIN.

The objective of the enrollment process is to obtain personal information from a buyer at the location of a responsible institution where that information can be validated. This includes, but is not limited to retail banking outlets and credit card issuers. Each participating responsible institution has one or more BRTs that are used by employees who have been authorized to perform registrations. Each employee is accountable for each buyer registered.

1.4.4.2. Construction

The BRT consists of:

an microcomputer and screen, keyboard, mouse a BIA/Reg a modem or network connection a buyer registration software application The BRT uses an attached BIA/Reg for biometric entry, and is connected to the system by a modem or a network connection. Buyer Registration Terminals are located in places that are physically secure such as retail banking outlets.

1.4.4.3. Identification

Three entities need to be identified for the DPC to respond positively to a BIA/Reg registration message: the registering employee, the institution, and the BIA/Reg. The employee must have been authorized to register buyers for that institution.

The institution and the BIA are identified by cross-checking the owner of the BIA with the institution code set by the BRT. The employee identifies himself to the system by entering his biometric-PIN upon starting the registration application.

The institution uses its standard customer identification procedure (signature cards, employee records, personal information, etc.) before registering the buyer on the system. It is important for the institution to verify buyer identity as assiduously as possible, since the registering buyer will be empowered to make purchases and transfer money from those financial accounts at will.

1.4.4.4. Operation

During registration, the buyer enters both a primary and secondary registration biometric sample. The buyer must use both index fingers; if the buyer is missing index fingers, the next inner-most finger may be used. Requiring specific fingers to be used (such as the index finger) allows the prior fraud check to work.

The buyer is encouraged to select a primary and a secondary finger; the primary finger is given preference during the DPC identity check, so the buyer should present the most-often used finger as the primary. Of course, the DPC could choose to alter the designation of primary and secondary biometrics based on operations if it turns out to be important to do so.

As a part of the biometric encoding process, the BIA/R determines if the buyer has entered "a good print." If a good print is not present, the BIA/R asks the buyer to re-enter the biometric which was determined to be of poor quality.

The buyer selects a PIN of from four to twelve digits from a series of PIN options provided by the system's central database. However, the PIN must be validated by the system. This involves two checks: one, that the number of other buyers using the same PIN aren't too great (since the PIN is used to reduce the number of buyers checked by the biometric comparison algorithm), and that the buyer's registration biometric sample being registered isn't too similar to other buyer's biometrics stored within the same PIN group. If either happens, the enrollment is rejected, an error message is returned to the BRT, and the buyer is instructed to request a different PIN. The system may optionally return with an "identical match" error condition, which indicates that the buyer already has a record in the system under that PIN.

A PIN of 0 allows the system to assign a PIN to the buyer.

The buyer constructs a confidential private code consisting of a word or phrase. If the buyer does not wish to construct one, a private code will be constructed randomly by the terminal.

The buyer may also arrange their financial account code list. This list describes which account index code points at which account (e.g. 1 for debit, 2 for credit, 3 for emergency account index code linked to debit, etc.). For checking and savings accounts, the registering institution must be the bank or financial institution that provides the accounts. The buyer signs an agreement allowing the system to authorize financial transactions on their behalf when they present their biometric-PIN.

Even after registration, a buyer is not actually able to perform operations using the system until a prior fraud buyer re-registration check is completed. This generally takes a few minutes, but during times of high load, it takes up to several hours. Only if the system finds no instance of prior fraud is the buyer's access activated.

In an alternate embodiment, relatively low security registrations are accomplished at places such as supermarkets, over the Internet, or at unattended kiosks. Registrations at such places must be subsequently confirmed by a telephone call to the registering buyer using a telephone number gathered from credit or bank account records, or by sending a letter to the registering buyer's mailing address (also gathered from bank or credit account records) requiring him to call back and confirm the registration. The ability to authorize transactions will only be enabled once registration is confirmed.

If a financial account number is registered without the participation of the issuing institution, the financial account owner must sign an agreement at the time of registration authorizing the release of funds whenever a transaction is received by the system that is properly authorized using his biometric and PIN. Of course, confirmation of identity is still required to validate the signature, either through a telephone contact or an in-person examination of the registrant's identity documents. This confirmation is required in order to prevent buyers from registering other people's financial account numbers under their own biometric and PIN.

If a buyer does manage to register another buyer's financial accounts and make use of them for a period of time, once detected, the buyer's ability to authorize transactions will be disabled, and the buyer will be added to the prior fraud database preventing the buyer from re-registering until the matter is cleared up.

1.4.4.5. Security

If a buyer is found to have defrauded the system, the DPC institutes a database-wide involuntary biometric database search for the buyer. Several of these are performed each night, so buyers who are particularly wanted by the system can thus be winnowed out of the database by using a time consuming process during conditions of light activity.

The employees performing the registration operation identify themselves using biometric-PIN only when initially activating the registration system. This is a convenience for the employee, but a possible security problem for the system, as unattended or "temporarily borrowed" BRTs could be the source for fraud. As a result, the registration application exits after a predetermined period of no activity.

1.4.5. Terminal: Customer Service

1.4.5.1. Purpose

The purpose of the customer service terminal (CST) is to provide internal DPC support personnel access to the various aspects of the system databases. Support people need to answer inquiries by buyers, issuers, institutions, and sellers that are having trouble with the system, as well as registering new sellers with the system Buyers may wish to change mailing information, or even their PIN.

1.4.5.2. Construction

The CST consists of:

a microcomputer a BIA/Int ethernet/token ring/FDDI network interface a database examination and modification application Each CST is connected to the system via a high speed local area network connection such as token ring, Ethernet, fiber (FDDI), etc. Each CST has the capability to query each of the databases, and display the results of these queries. However, the CST only displays fields and records based on the privilege of the terminal user. For instance, a standard customer service employee won't be able to see the encryption code for a given BIA's VDB record, though they can see who currently owns that BIA.

1.4.5.3. Identification

For the CST to allow access to the database, the user and the BIA must be identified by the system. In addition, the employee's privilege level must also be determined, so that the database can restrict access appropriately.

1.4.5.4. Operation

An employee using a CST starts a session by providing identification by entering their biometric-PIN. The BIA constructs an Identification Request message, and send it to the DPC for verification. Once the system verifies the employee, the CST application can operate normally, though limited by the employee's previously assigned DPC privilege level.

1.4.5.5. Security

For security purposes, the DPC will terminate a connection to the CST application after a predetermined idle time period.

It is important that the database application cannot be modified in any manner; either deliberately, or through an unintentional introduction of a virus. To that end, CSTs do not have any floppy drives or other removable media. Furthermore, read access to the database application executable is strictly limited to those with a need to know.

In order to protect the communications between the CST and the database from surreptitious modification or disclosure, the CST encrypts all traffic between the CST and the database. To do this, the CST generates a session key that is sent to the server during the login session with the system. This session key is used to encrypt and decrypt all communications with the DPC that occur during the period.

Even assuming secure communications and no modified database applications, the DPC makes certain that DPC data fields that are not accessible to the individual operating the CST are not sent to the CST's database application. Likewise, at no time do any CST personnel have access to or permission to modify buyer biometric information.

The DPC and the support center can be co-located, or because of the fairly tight security surrounding the CST itself, the support center can be split off on its own.

1.4.6. Terminal: Issuer Terminal

1.4.6.1. Purpose

The purpose of the issuer terminal is to allow employees at issuing banks to submit batch financial account modification operations to the DPC in a secure and identifiable manner.

1.4.6.2. Construction

The IT consists of:

a microcomputer a modem, X.25 network, or Internet connection to the system a BIA/Iss a network connection to the bank's internal network The Issuer Terminal uses an issuer BIA to authorize mass additions and deletions of financial account information.

1.4.6.3. Identification

In this operation, the bank must be identified, a properly-authorized bank employee must be identified, and all of the buyers whose financial accounts are being added or removed must also be identified.

The bank is responsible for identifying the buyers who wish to add their financial accounts at that bank to their financial account list. As in buyer registration, this is done by the bank using signature cards and personal information. The DPC identifies the bank by cross-checking the issuer code submitted by the IT with the issuer code registered in the VAD record of the BIA/Iss. A biometric-PIN is used to identify the bank employee actually submitting the batch.

1.4.6.4. Operation

In order to add a financial account, a buyer gives his biometric identification number to the bank (the identification number is given to the buyer during the initial buyer registration step) along with the financial accounts that are to be added. After the buyer is properly identified, this identification code and financial account list are forwarded to the IT for subsequent batch submission to the system.

Whenever deemed appropriate by the bank, an authorized employee at the bank instructs the IT to upload the batched financial account additions/deletions to the DPC. To do this, the authorized employee enters his biometric-PIN, the IT adds a session key, adds the bank's issuer code, and from that the BIA/Iss constructs an Issuer Batch message that the IT then forwards to the DPC. The IT encrypts the batch using the message code, and then sends that as well.

When the system receives the Issuer Batch, it validates that the BIA is a BIA/Iss, that the BIA/Iss is registered to the bank claimed by the issuer code, and that the employee identified in the biometric-PIN is allowed to submit batch requests to the DPC for that bank. If so, the DPC processes all the requests, keeping track of errors as required. Once done, the DPC returns the employee's private code, along with an encrypted batch containing any errors that occurred during processing.

1.4.6.5. Security

Securing this transaction is critical for the security of the system. A criminal intent on fraud need only find a way to add other people's financial accounts to his biometric identification code and can then commit fraud at will. Eventually the criminal is caught, and purged from the database, but only after other people's financial accounts are drained by the criminal.

Encryption guarantees that the transmission between bank and DPC cannot be intercepted, and thus financial account numbers are protected in transit.

Cross-checking the bank with the BIA/Iss means that both the IT and the BIA must be compromised to submit false add/delete messages to the DPC. Thus, the bank must ensure that the IT is physically secure, and that only authorized employees are allowed to access it.

Requiring an employee to submit the batch ensures that a responsible employee is "in the loop" to make sure that proper bank security measures have been followed in the construction and submission of the batch.

1.4.7. Terminal: Phone Point of Sale Terminal

1.4.7.1. Purpose

The purpose of the phone point of sale terminal (PPT) is to authorize credit or debit financial transactions from a buyer using a specially-equipped telephone to make a purchase from a seller, or pay for a telephone call.

1.4.7.2. Construction

The PPT consists of:

a BIA/catv a VoiceView-equipped rapid-connect digital modem a telephone (keypad, earpiece, microphone)

a microprocessor a DSP (digital signal processor)

a standard telephone line

The PPT accepts biometric identification using a BIA/Catv connected to and integrated with a cordless, cellular, or standard telephone.

1.4.7.3. Identification

In order for the DPC to authorize a transaction, both the buyer and the seller must be identified.

To identify a buyer, biometric-PIN identification is used.

To identify a phone-order seller, the seller and all his phone numbers that buyers will call are registered with the DPC. Thus when a buyer submits an authorization, he also submits the phone number he called, which is then cross-checked with the seller's listed phone numbers.

1.4.7.4. Operation

Buyers call sellers that are selling their wares through paper catalogs, newspapers, magazines, or other basic print media mechanisms. The PPT uses a special modem that shares the telephone voice line to exchange digital information with the seller.

Each time the buyer makes a phone call, the PPT keeps track of the phone number that was typed by the user, in case the buyer decides to make a purchase. A DSP is used to detect dialtone, ring, connection, and so on, in order to tell what the actual phone number entered was, as distinct from extensions, or the navigation of phone message systems, and so on.

Once a call is placed to a seller, the salesman for the seller digitally downloads all the relevant information to the PPT including product, price, and the seller identification code. Note that when in operation, the modem disconnects the speaker.

When the product information is downloaded, the PPT then prompts the buyer for the biometric-PIN, the account index code, and then asks the buyer to validate the purchase amount. Then the phone number and the seller identification code are added, and the message is encrypted. The rapid-connect modem is again engaged to send the authorization information to the seller.

When the seller receives the authorization information, the seller verifies that the price and product information are correct, and then forwards the transaction to the DPC using a secured communications channel using either the Internet or some other general-purpose network. The connection to the DPC is secured using Public Key Encryption and a secret key exchange.

Upon receiving and decrypting a phone authorization, the DPC checks the phone number against the seller identification code, validates the biometric-PIN, and then sends the transaction to the credit/debit network for authorization. If authorization succeeds, the DPC appends the buyer's address to the response message and sends the response to the seller.

The seller receives the response from the DPC, copies the mailing address, and forwards the message to the buyer again via a brief session with the rapid-connect modem. When the transmission to the IPT is complete, a chime sounds, the modem disconnects, and the buyer's private code (decrypted by the BIA) is displayed on the LCD screen. The seller's sales rep confirms that the buyer's mailing address is valid; if so, the call is terminated and the transaction is complete.

1.4.7.5. Security

One of the security concerns about phone transactions is the security of the phone system itself. Apart from the biometric identification, the central problem is making sure that the number the buyer called actually reaches the seller in question.

Note that the communications link between the PPT and the seller isn't secured, so a purchase authorization from a buyer to a seller could be intercepted. However, no financial benefit would result from this, so it is not deemed to be important.

The security of a PPT is relatively low by necessity of price, weight, and because of the problems inherent in splitting the responsibility of PIN entry and private code decryption and presentation.

1.4.8. Terminal: Cable-TV Point of Sale

1.4.8.1. Purpose

The purpose of the CATV point of sale terminal (CPT) is to authorize credit or debit financial transactions from a buyer in front of his television (or "TV") set to a seller who is presenting objects for sale on television.

1.4.8.2. Construction

The CPT consists of:

a BIA/catv a television remote control with integrated BIA/catv a Cable-TV digital signal decoder a Cable-TV remote control reader an on-screen display mechanism access to a Cable-TV broadband two-way communications channel The CPT accepts biometric identification using a BIA/catv that is integrated with the television's remote control device. The remote control communicates with a television top box that itself communicates with the broadband cable television network. The terminal consists of the television remote logic that communicates with the BIA, as well as the television top box that communicates over the cable broadband network.

1.4.8.3. Identification

In this transaction, the seller and the buyer must both be identified to execute the transaction.

The buyer is identified by the biometric-PIN.

The seller is identified by a seller credential, created by the CATV broadcaster at the time the product is shown on television. Each product broadcast has a seller-product credential consisting of a seller identification code, a time, a duration, and a price which is signed using Public Key Encryption and the CATV network broadcaster's private key. This seller-product credential can only be generated by the network broadcaster.

1.4.8.4. Operation

As a television advertisement, an infomercial, or a home shopping channel displays a product, the Cable television network also broadcasts simultaneous digital information that describes a short description, price, as well as the seller-product credential. This digital information is processed and temporarily stored by the CPT, ready to be accessed by the buyer when a decision to purchase is made.

To buy something that is currently being displayed, the buyer selects the on-screen display function of the special television Remote, which instructs the CPT to display text information on the screen regarding the currently viewed product.

The buyer is first prompted for the number of the items he wishes to buy through the on-screen display. Then he is prompted to enter his Biometric-PIN, and his account index code. Once he verifies that the final purchase price is okay, the product, price, seller identification code, seller-product credential, and channel number along with the Biometric-PIN are used to construct a Commercial Transaction message. The request is sent to the seller for authorization by way of the Cable-television broadband two-way communications channel.

Note that each seller that desires to sell products in this manner must have the ability to receive order information using the broadband Cable television network.

Upon receipt of the authorization request, the seller submits it to the DPC using a secured Internet connection or an X.25 connection.

If the DPC authorizes the transaction, it constructs an authorization response that includes the current mailing address of the buyer in addition to the authorization code, and the encrypted private code. Once the seller receives the authorization, he copies the authorization and the mailing address, and then forwards the authorization back to the CPT, who then displays the private code to the buyer, terminating the transaction.

1.4.8.5. Security

This architecture does not allow criminals to replay messages intercepted from the CableTV broadband, but they are able to read parts of them. If this is not desirable, then the messages may be encrypted using an optional CATV Center's public key, or other "link level" encryption between the CATV set-top box and the CATV local office.

To secure a connection between a seller and the DPC, the connection uses a session key changed daily that has been previously exchanged using a public key encryption key exchange system.

1.5.1. Introduction

The Data Processing Center (DPC) handles financial commercial transactions and buyer registration as its main responsibilities.

Each DPC site is made up of a number of computers and databases connected together over a LAN as illustrated in the DPC Overview FIG. #2. Multiple identical DPC sites ensure reliable service in the face of disaster or serious hardware failure at any single DPC site. Furthermore, each DPC site has electrical power backup and multiple redundancy in all of its critical hardware and database systems.

DPC components fall into three categories: hardware, software, and databases. Below is a short description, by category, of each component. More detailed descriptions appear in the following sections.

1.5.1.1. Hardware

FW
  Firewall Machine: the entry point of the DPC site.
GM
  Gateway Machine: the system coordinator and message processor.
DPCLAN
  DPC Local Area Network: connects the DPC sites

1.5.1.2. Databases

IBD
  Individual Biometric Database: identifies buyers from their biometric and PIN code.
PFD
  Prior Fraud Database: lists buyers who have defrauded the system and can check if a biometric matches any of these buyers.
VAD
  Valid Apparatus Database: stores information required to validate and decrypt BIA messages.
AOD
  Apparatus Owner Database: stores information about the owners of BIA devices.
ID
  Issuer Database: identifies issuing banks that participate with the system.
AID
  Authorized Individual Database: stores the list of people allowed to use personal or issuer BIA devices.
RSD
  Remote Seller Database: stores information necessary to process transactions with telephone and cable television sellers.

1.5.1.3. Software

MPM
  Message Processing Module: handles the processing of each message by coordinating with the other software modules and databases required to perform the message's task.
SNM
  Sequence Number Module: handles DUKPT sequence number processing.
MACM
  Message Authentication Code Module: handles MAC validation and generation.
MDM
  Message Decrypt Module: handles encrypting and decrypting of BIA requests and responses.
PGL
  PIN Group List: handles the lookup of PIN groups by PIN and the configuration of database elements that depend on the list of PIN groups.
IML
  IBD Machine List: handles the lookup of the main and backup database machines dedicated to holding IBD records for a given PIN group.

1.5.1.4. Terminology

When defining database schema, the following terminology is used for describing field types:

| | |
|---|---|
| int<X> | an integral type using <X> bytes of storage |
| char<X> | a character array of <X> bytes |
| text | a variable length character array |
| <type >[X] | a length <X> array of the specified type |
| time | a type used for storing time and date |
| biometric | a binary data type used for storing the biometric |

When describing database storage requirements, the term "expected" means the expected condition of a fully loaded system.

1.5.2. Protocol Description

Terminals accomplish their tasks by sending messages to a DPC site. The DPC site sends back a response packet containing the status on the success or failure of the operation.

Communication is via a logical or a physical connection-oriented message delivery mechanism such as X.25 connections, TCP/IP connections, or a telephone call to a modem bank. Each session holds the connection to the terminal open until the DPC sends its response back to the terminal.

The message contains a BIA message part and a terminal message part:

BIA message part
  protocol version number
  message type
  4-byte BIA Identification
  4-byte sequence number
  <message specific data>
  Message Authentication Code (MAC)
Terminal message part
  <terminal specific data>

The BIA message part is constructed by a BIA device. It includes one or two biometrics, a PIN, authorization amounts, and the contents of the general registers which are set by the terminal. Note: the MAC in the BIA message part only applies to the BIA part and not to the terminal part.

A terminal may place additional data for the message in the terminal message part. The BIA provides a message key to allow the terminal to secure the terminal part data. The BIA automatically includes the message key in the packet's encrypted biometric-PIN block when necessary. The terminal performs the message key encryption itself, however.

The response packet contains a standard header and two optional free-form message parts: one with a MAC and one without:

Standard Header
    protocol version number
    message type
    <message specific data>
    MAC
    Optional Free-form message part without MAC
    <additional message specific data>

The message part with a MAC is sent to the BIA so that it may validate that this part of the response has not been tampered with and to display the buyer's private code. The message part without a MAC is used for transmitting large amounts of data that are not sent to the BIA for MAC validation as the BIA to terminal connection may be of limited bandwidth.

1.5.3. Processing Packets

In an embodiment of the invention with multiple DPC sites, a terminal need only send its message to one of the DPC sites, typically the closest, because that site automatically handles updating the others by running distributed transactions as necessary.

When one of the DPC's Firewall Machines receives a packet, it forwards it to one of the GM Machines for the actual processing. Each GM has a Message Processing Module that handles the coordination between the DPC components required to process the message and sends the response back to the sender.

1.5.4. Validating and Decrypting Packets

All packets the DPC receives, with the exception of those not constructed by a BIA, contain a BIA hardware identification code (the BIA Identification of the packet), a sequence number, and a Message Authentication Code (MAC). The GM asks the MAC Module to validate the packet's MAC and then checks the sequence number with the Sequence Number Module. If both check out, the GM passes the packet to the Message Decrypt Module for decryption. If any one of the checks fail, the GM logs a warning, terminates processing for the packet, and returns an error message to the BIA device.

1.5.5. Response Packets

Each packet the DPC receives may contain an optional response key stored in the encrypted biometric-PIN block of the packet. Before the DPC replies to a message that includes a response key, it encrypts the response packet with the response key. It also generates a Message Authentication Code and appends it to the packet.

The only exception to encrypting response packets applies to error messages. Errors are never encrypted and never include confidential information. However, most response packets include a status or response code that can indicate whether the request succeeded or not. For example, when the DPC declines a credit authorization, it does not return an error packet, it returns a normal transaction response packet with a response code set to "failed".

1.5.6. DPC Procedures

The DPC has three procedures commonly used while processing messages.

1.5.6.1. Buyer Identification Procedure

For messages that require the DPC to identify a buyer, the DPC executes the following procedure using the personal authentication information in the message (the bid biometric and the PIN): using the PIN code, the DPC searches the IBD Machine List for the main and backup IBD machines responsible for handling identifications for the given PIN code. Next, the DPC sends the identification message to either the main or backup machines depending on which is the least loaded. The IBD machine responds with the IBD record for the buyer or a "buyer not found" error.

The IBD machine retrieves all the IBD records for the given PIN. Using a proprietary biometric hardware device, the IBD machine compares each record's primary registered biometric sample with the buyer's bid biometric sample arriving at a comparison score indicating the similarity of the two biometrics. If no biometric has a close enough comparison score, the comparisons are repeated using the registered secondary biometric samples. If none of the secondary biometric have a close enough comparison score, then the IBD machine returns an "buyer not found" error. Otherwise, the IBD machine returns the full IBD record of the buyer, from which such fields such as the private code, financial account numbers, and so on may be obtained.

The IBD machine maintains a circular queue of the most recently submitted bid biometric samples for each IBD record. If a bid biometric sample exactly matches a sample on the queue, the DPC can assume that the buyer's biometric sample may have been stolen. If this happens repeatedly, the DPC will suspend the buyer's ability to authorize transactions and generate a security violation message. When contact is made with the buyer, the DPC will allow the buyer to select a new PIN, thus resolving the issue.

1.5.6.2. Silent Alarm Procedure

For messages that include an account index code, the DPC handles the case where the buyer chooses his or her emergency account index code. The GM processing the message immediately logs a warning, and if the response packet has a response code and the IBD silent alarm procedure code instructs it to forward the silent alarm to the seller, sets the response code to "silent alarm".

Other behavior during a silent alarm is governed by the IBD record's silent alarm code field. This includes forwarding silent alarms to local authorities, rejecting transactions over a particular amount, or rejecting transactions altogether. The DPC also increments the silent alarm use count of the buyer's IBD record whenever the emergency account index code is used.

It is the responsibility of the owner of the BIA device that submitted the message to watch for an "silent alarm" response code and provide further action.

1.5.6.3 Security Factor Module

Before each message can be executed, the DPC performs a security factor assessment on the message to determine if the message has a high probability of having been fraudulently generated.

Each entry in the VAD has information on the number of recent messages submitted, the number of recent messages that have failed, the device security assessment, whether or not the device is attended along with the fraud detection skill of the attendant, and lastly the security problems associated with the physical location of the device itself (i.e. low or high crime area, etc.). The local time of day is also added into the equation. If the message is a commercial transaction, the dollar value of the transaction is also applied as a modifier. Other factors can be added as necessary. The result of the calculation is a number indicating the relative confidence that the transaction is legitimate.

Once the security factors assessment is done, transactions that are rated below a particular value are rejected as possible security problems, while transactions that are rated below a second and lower value are rejected as probable violations, the transaction is noted in the DPC security log.

Whenever a buyer identification fails, the VAD record for the device is updated appropriately. Too many failures, and the Security Factor Module will take the device out of service, refusing any further transactions from that device until a service representative places it back in service.

1.5.7. Protocol Messages

The following sections describe each protocol message/response and the actions the DPC takes to perform them.

The list of protocol packets are:

Buyer Identification
Commercial Transaction
Registration
Issuer Batch
List Accounts

1.5.7.1. Buyer Identification

Buyer Identification Message
BIA Part:
4-byte BIA Identification
4-byte sequence number
encrypted (DUKPT key) Biometric-PIN block:
 300-byte authorization biometric
 4–12 digit PIN
 112-bit response key
MAC
Terminal Part: (not used)
Buyer Identification Response
encrypted (response key):
 private code text
 buyer name
 biometric identification code
status code (ok, failed, etc.)
MAC The Buyer Identification message includes a biometric-PIN block which the DPC uses with the buyer identification procedure to identify the buyer. If the buyer is identified, then the DPC responds with the buyer's name, biometric identification, and private code. Otherwise, the DPC responds with an "unknown buyer" error.

1.5.7.2. Commercial Transaction

Commercial Transaction Message
BIA Part:
4-byte BIA Identification
4-byte sequence number
encrypted (DUKPT key) Biometric-PIN block:
 300-byte authorization biometric
 4–12 digit PIN
 112-bit response key
 [optional 112-bit message key]
account index code
price
seller identification code
transaction type
[optional free-format product information]
[optional seller identification channel (phone number, channel number+time, hostname)]
[optional send-address request]
MAC
Terminal Part: (not used)
Commercial Transaction Response
encrypted (response key):
 private code text
 authorization response
 authorization detail (authorization code, transaction identification, etc)
 [optional buyer address information]
status code (OK or fail, silent alarm)
MAC There are two basic commercial transaction subtypes: retail and remote.

There are two basic transaction types: debit and draft. Drafts return authorizations that are subsequently cashed by the seller. No money changes hands until the draft is cashed. Most current credit card transactions are done via draft. For instance, a deposit charge placed on a credit card by a car rental agency is done using a draft. In one embodiment, these steps are accomplished using a pair of ISO 8583 messages: an authorization message followed by a financial transaction message.

Debit transactions result in immediate transfer of money from the buyer's financial account to the seller's financial account. Note that debit transactions can occur on a number of different kinds of financial accounts, including checking accounts, savings accounts, money market accounts, credit accounts, and even phone calling-card accounts. If money changes hands immediately, the system considers the transaction type to be debit, regardless of the financial account type used as the source of funds, or which external computer system is used to move the money around.

The DPC identifies the buyer by the biometric-PIN block of the message. If the buyer cannot be identified, the DPC replies with an "unknown buyer" error.

At this point, the DPC executes the actual transaction.

For instance, if the transaction type is a draft, the DPC constructs a credit authorization draft request and transmits it to the appropriate external computer system (e.g. VISANet, MAPP, etc.). The external computer system is responsible, in this embodiment, for performing the resource determination to see if the buyer can pay. If the external computer system approves the transaction, the DPC returns an "OK" response code to the BIA device, while a disapproval results in a "failed" code. The contents of the response message from the external computer system (called an "authorization request response", see ISO 8583) are added to the response as well along with the buyer's private code.

In an alternate embodiment, the accounts and their balances are stored at the DPC, which performs resource determination, draft generation or credit/debit instead of sending the transaction to an external computer system.

When the DPC looks up the buyer's financial account using the account index code of the message, the chosen account index code may be the emergency account index code. If this happens, the DPC follows the silent alarm procedure, which may involve performing the transaction as usual, or performing the transaction with modified credit limits, as well as notification of authorities.

Remote authorization are generated by telephone, mail order, the Internet, or cable television sellers. The DPC handles remote authorizations the same way it does a retail authorization but with the following exceptions:

i) Remote authorizations include a remote seller identification code which the DPC checks against the Remote Seller Database to validate whether the packet's seller Identification matches the one stored in the database. Furthermore, the financial account credited is the remote seller's financial account, not the financial account of the BIA device's owner.

ii) Additionally, BIA devices that generate the remote authorizations tend to be personal BIA devices. The DPC checks the biometric Identification of the identified buyer against the Authorized Individual Database's list of buyers allowed to use the BIA device. If the buyer is not authorized to use the device, then the DPC denies the authorization request.

iii) Finally, the authorization packet may contain a "send-address" indicator. This indicator informs the DPC to include the buyer's address in the response packet and is usually used only for mail order purchases.

1.5.7.3. Registration

Registration Message
 BIA Part:
 4-byte BIA Identification
 4-byte sequence number
 encrypted (DUKPT key) Biometric-PIN block:
  1000-byte primary registration biometric
  1000-byte secondary registration biometric
  4–12 digit PIN
  112-bit response key
  112-bit message key
 MAC
 Terminal Part:
 encrypted (message key):
  name
  address
  zipcode
  private code
  financial account list (account index code, financial account #)
  emergency account index code, account index code
  silent alarm behavior
Registration Response
 encrypted(response key):
  private code text
  PIN
  biometric identification code
  list of DPC chosen PINs (if original choice of PIN is rejected)
 status code (OK, failed, etc)
 MAC Buyers register with the DPC via a Buyer Registration Terminal (BRT). The BRT sends the DPC a registration packet containing primary and secondary biometric and personal identification number, along with ancillary data such as the buyer's name, address, a list of financial accounts, the private code, and the emergency account index code. Optionally, the buyer may include a Social Security Number (or "SSN"). The buyer may choose his or her own PIN code or allow the system to choose it. In a modification step any previously entered data can be modified or deleted.

At any given moment, only one DPC site acts as the registration site, for implementation simplicity. Registration messages received by non-registration DPC sites are forwarded to the current registration site. The registration DPC site performs the entire registration check, assigning of IBD records to IBD machines, and the distributed transaction required to update all other DPC sites.

The registration DPC site selects the PIN code for registration messages that don't specify one, stores the IBD record on the main and backup IBD machines (as specified in the PIN Group List), and checks the PIN and biometric suitability of the registration packet before running the distributed transaction to update the other DPC sites.

The DPC runs a personal identification number and biometric sample duplication check step wherein the biometric and personal identification number gathered during the registration step is checked against all previously registered biometrics currently associated with the identical personal identification number. The DPC may reject the registration for the following reasons: the PIN code is too popular, or the biometrics are too similar to other biometrics stored under the chosen PIN. To aid the buyer in choosing an acceptable PIN, the DPC generates a short list of PIN codes for which the registration will be guaranteed that it reserves for a period of time. The BRT then prompts the buyer for a new PIN which may be chosen from the good PIN list.

1.5.7.4. Issuer Batch

Issuer Batch Message
 BIA Part:
 4-byte BIA Identification
 4-byte sequence number
 encrypted (DUKPT key) Biometric-PIN block:
  300-byte authorization biometric
  4–12 digit PIN
  112-bit response key
  112-bit message key
  issuer code
 MAC
 Terminal Part:
 encrypted (message key)
  add <biometric Id> <account index code> <financial account> [<silent alarm flag>]
  remove <biometric Id> <account index code> <financial account>
Issuer Batch Response
 encrypted (response key):
  private code text
 status code (OK, failed, etc.)
 MAC
 encrypted (message key) failed list:
  failed <command> <code>

The Issuer Batch message allows an issuing bank or other authority to perform routine maintenance on the Individual Biometric Database. The DPC logs a security violation warning if it receives any Issuer Batch messages from non-issuer BIA devices, and it also refuses to process the message.

The DPC identifies the employee submitting the batch message by following the buyer identification procedure. The DPC then checks that the employee is registered in the Authorized Individual Database to use the BIA device embedded in the sending Issuer Terminal.

The DPC also uses the issuer code in the message to look up the apparatus owner Identification in the Issuer Database and compare it against the apparatus owner Identification stored in the Valid Apparatus Database to ensure that the issuer code is not forged.

The DPC then executes the add and delete commands in the message-key encrypted batch list. The batch list is a newline separated list of commands. Valid commands are:
add <biometric Id> <account index code> <financial account> [<silent alarm flag>]

The add command adds the financial account to the financial account list at the specified account index code. The optional silent alarm flag indicates whether the particular account index code is treated as the buyer's emergency account index code. If the financial account currently stored in the financial account list does not belong to the issuer, the command fails. This feature prevents one bank from adding or removing financial accounts from other bank's customers without the buyer's knowledge or authorization.
remove <biometric Id> <account index code> <financial account>

The remove command clears the buyer's financial account stored at the specified account index code in the financial account list. If the financial account currently stored in the financial account list does not match the financial account the issuer is attempting to remove, the command fails.

For each command in the batch that failed to execute correctly, the GM logs a security violation warning and appends an entry to the failed list of the response. The failed entry includes the text for the command and the error code.

1.5.7.5. List Accounts

List Accounts Message
  BIA Part:
  4-byte BIA Identification
  4-byte sequence number
  encrypted (DUKPT key) Biometric-PIN block:
    300-byte authorization biometric
    4–12 digit PIN
    112-bit response key
  MAC
  Terminal Part: (not used)
List Accounts Response
  encrypted (response key):
    private code text
    list of (account name, account index code)
  status code (OK, failed, etc.)
  MAC The list accounts message allows buyers to determine which financial accounts match particular account index codes. This is useful when buyers forget which financial accounts and index codes are available.

The GM identifies the buyer by the packet's biometric-PIN and retrieves the appropriate information from the buyer's record. During registration, the emergency account index code will be given an innocuous-sounding name so that criminals cannot determine which account index code will trigger the emergency notification.

1.5.8. Customer Support and System Administration Messages

The DPC handles additional message types classified as internal messages. The DPC generally does not accept these messages from non-DPC systems. The messages are database vendor specific. However, the internal network uses DES-encrypted packets to provide additional security.

The Customer Service and System Administration tasks are implemented using the database vendor's query language and application development tools.

Customer Service tasks
  IBD: find, activate, deactivate, remove, correct records, change PINs.
  AID: add or remove authorized individuals.
  AOD: find, add, remove, correct records.
  VAD: find, activate, deactivate, remove, correct records.
  RSD: find, add, remove, correct records.
  PFD: add, remove, correct records.
System Administration tasks
  Run prior fraud checks.
  Modify the Valid Site List.
  Summarize log information (warnings, errors, etc.).
  Modify the PIN Group List.
  Performance monitoring.
  Run backups.
  Crash recovery procedures.
  Time synchronization for the DPC sites.
  Change the primary registration site.
  Change the secret DES encryption key.
  Generate a list of BIA hardware identification code, MAC encryption key, and DUKPT Base Key triples. Store on an encrypted floppy for the Key Loading Device.

1.5.9. Firewall Machine

1.5.9.1. Purpose

The FW Machines provide a first line of defense against network viruses and computer hackers. All communication links into or out of the DPC site first pass through a secure FW Machine.

1.5.9.2. Usage

The FW Machine, an Internet-localnet router, only handles messages destined for the GM Machines.

BIA-equipped terminals send packets to a single DPC site via modem, X.25, or other communication medium. The DPC relies on a third party to supply the modem banks required to handle the volume of calls and feed the data onto the DPC backbone.

For DPC to DPC communication, primarily for distributed transactions and sequence number updates, the FW Machines send out double-length DES encrypted packets. The DPC LAN component handles the encryption and decryption: the FWs do not have the ability to decrypt the packets.

1.5.9.3. Security

A properly configured network sniffer acts as an intruder detector as backup for the FW. If an anomalous message is detected, the intruding messages are recorded in their entirety, an operator is alerted, and the FW is physically shut down by the sniffer.

The FW disallows any transmissions from the internal network to the rest of the Internet.

1.5.9.4. Message Bandwidth

A commercial transaction message requires about 400 bytes and registration packets require about 2 KB. To handle 1000 commercial transactions per second and 1 registration packet per second, the FW Machines are able to process about 400 KB per second.

Each DPC site requires an aggregate bandwidth of nearly three T1 connections to the third party modem bank and the other DPC sites.

1.5.10. Gateway Machine

1.5.10.1. Purpose

The GM Machine (GM), through the FW Machines, link the outside world (BIA-equipped terminals and other DPCs) to the internal components of the DPC. The DPC has multiple GMs, typically two.

1.5.10.2. Usage

The GM supervises the processing of each BIA message, communicates with the various DPC components as necessary, and sends the encrypted results of the message back to the sender. The software performing this task is called the Message Processing Module.

The GM logs all messages it receives and any warnings from components it communicates with. For example, the GM logs any silent alarms, sequence number gaps, and invalid packets.

Processing a message may require the GM to inform GMs at all other DPCs of a change in the DPC databases. When this happens, the GM runs a distributed transaction to update the remote databases.

Distributed transactions fall into two categories: synchronous and asynchronous. Synchronous distributed transactions require the GM to wait for the distributed transaction to commit before continuing to process the packet. Asynchronous distributed transactions do not require the GM to wait for the commit, and allow it to finish processing the message regardless of whether the distributed transaction commits or not. Asynchronous distributed transactions are only used to update data for which database consistency is not an absolute requirement: sequence numbers and biometric checksum recordings may be performed asynchronously, whereas creating database records, such as Buyer Biometric records, may not.

When executing a synchronous distributed transaction, the requesting GM only considers the entire transaction successful if all sites can successfully commit the transaction locally. Otherwise, the GMs back out the changes locally and reject the request due to a transaction error.

The list of valid DPC sites is normally all of the sites. In the case of an extreme site failure, however, a system administrator may manually remove that site from the valid site list. The most likely cause of distributed transaction failures, however, are temporary network failures that are unrelated to any DPC equipment. Messages that require a synchronous distributed transaction cannot be performed until network connectivity is restored or the site is removed from the valid site list. Before a site can be added back to the valid site list, the system administrator brings the site's databases up to date with those of a currently active site.

1.5.10.3. Software Components

Each GM runs the following software components locally for performance reasons:
Message Processing Module
Message Authentication Code Module
Message Decrypt Module
Individual Biometric Database Machine List

1.5.10.4. Message Bandwidth

The message bandwidth required by the GMs is similar to that required by the FW Machines. A FDDI network interface provides 100 MBits per second and easily covers any bandwidth requirements.

1.5.11 DPC LAN

1.5.11.1 Purpose

The DPC Local Area Network (LAN) links the machines of the DPC sites together using a fiber optic token ring. The fiber optic token ring provides both high bandwidth and good physical security.

1.5.11.2 Security

The network interfaces used by the machines on the DPC LAN include encryption hardware to make tapping or intercepting packets useless without the encryption key. The encryption key is the same for all machines on the LAN and is stored in the encryption hardware.

A properly configured network sniffer acts as an intruder detector as backup for the FW. If an anomalous message is detected, the intruding messages are recorded in their entirety, an operator is alerted, and the FW is physically shut down by the sniffer.

1.5.12 Message Processing Module

1.5.12.1 Purpose

The Message Processing Module (MPM) handles the processing for a message. It communicates with other components of the DPC as necessary to perform its tasks. The presence of an MPM on a machine brands it as a GM.

1.5.12.2 Usage

The MPM maintains a message context for each message it is currently processing. The message context includes the information necessary to maintain the network connection to the terminal making the message, the BIA device information, the response key, and the response packet.

1.5.13. Message Authentication Code Module

1.5.13.1. Purpose

The Message Authentication Code Module's (MACM) tasks are to validate the Message Authentication Code on inbound packets and to add a Message Authentication Code to outbound packets.

1.5.13.2. Usage

The MACM maintains an in-memory hash table of 112-bit MAC encryption keys keyed by BIA hardware identification code. When the MACM receives a request from the GM to validate a packet's MAC, in first looks up the packet's hardware identification code in the hash table. If no entry exists, then the MACM replies to the GM with an "invalid hardware identification code" error.

Otherwise, the MACM performs a MAC check on the BIA message part of the packet using the 112-bit MAC encryption key. If the MAC check fails, then the MACM replies to the GM with an "invalid MAC" error. Otherwise, the MACM replies with a "valid MAC" message.

If the packet contains a seller identification code, the MACM also checks the seller identification code against the owner identification code in the hash table. If the codes don't match, then the MACM replies with an "invalid owner" error.

When the MACM receives a request from the GM to generate a MAC for a packet, it looks up the MAC encryption key using the packet's hardware identification code. With the MAC encryption key, the MACM generates a MAC and adds it to the packet. If the MACM cannot find the hardware identification code in its hash table, it replies with an invalid hardware identification code error instead.

1.5.13.3. Database Schema

The MACM hash table entry contains:

MACM Entry:
   hardwareId=int4
   ownerdId=int4
   macEncryptionKey=int16

The table is hashed by hardware identification code.

1.5.13.4. Database Size

Assuming 5 million BIA-equipped devices in service, the hash table requires about 120 MB of storage. For performance reasons, this hash table is cached completely in memory.

1.5.13.5. Dependencies

The MACM only contains records referencing active BIA hardware identification codes and active apparatus owners. Whenever an apparatus or apparatus owner is suspended or deleted from the system, the MACM removes any entries that reference the identification code. When an apparatus is activated, the MACM then adds an entry for it.

The MACM also caches the MAC encryption key from the Valid Apparatus Database. Since the system does not allow the encryption key of a BIA to be changed, the MACM does not need to worry about receiving encryption key updates.

1.5.14. Message Decrypt Module

1.5.14.1. Purpose

The Message Decrypt Module's (MDM) task is to reconstruct the DUKPT transaction key and with it decrypt the biometric-PIN block of the packet. It maintains a list of the DUKPT Base Keys that are required to generate the transaction key.

1.5.14.2. Usage

The MDM constructs the DUKPT transaction key using the packet's sequence number as the DUKPT transaction counter, the upper 22 bits of the BIA hardware identification code as the DUKPT tamper resistant security module (or "TRSM") Identification, and the low 10 bits of the BIA hardware identification code as the DUKPT Key Set Identification.

The DUKPT standard specifies how the transaction key is generated. The Key Set Identification is used to look up a Base Key from the Base Key List. The Base Key is used to transform the TRSM Identification into the initial key via a DES encrypt/decrypt/encrypt cycle. The transaction counter is then applied to the initial key as a series of DES encrypt/decrypt/encrypt cycles to generate the transaction key.

For additional security, two Base Key Lists are maintained, one for low security BIA devices and one for high security devices. The MDM chooses which Base Key List to use depending on the security level of the device.

1.5.14.3. Database Schema

The MDM Base Key List entry contains:

MDM Entry:
   baseKey=int16

The Base Key List is indexed by Key Set Identification.

1.5.14.4. Database Size

The MDM maintains an in-memory list of the DUKPT Base Keys. Each key requires 112-bits. The MDM maintains two sets of 1024 keys requiring 32 KB total.

1.5.14.5. Dependencies

The MDM has no direct dependencies on any other DPC component.

1.5.15. PIN Group List

1.5.15.1. Purpose

The PIN Group List (PGL), in conjunction with the Individual Biometric Database Machine List, defines the configuration of the IBD machines. The PGL stores a list of the PIN groups in the system which is used to simplify the management of the PINs. A PIN group is a set of consecutive PIN codes. A PGL exists on each GM Machine (GM).

1.5.15.2. Usage

The PGL, when given a PIN code, searches through its list of PIN groups for the group containing the PIN code. The PGL maintains the list of groups in order and uses a binary search to quickly find the correct group.

The initial configuration for the PGL is one giant PIN group containing all possible PINs. After a threshold number of PINs are assigned, the giant PIN group is split in two. Thereafter, this process is applied to all succeeding PIN groups.

When a PIN group splits, the PGL assigns a new main and backup IBD machine based on available storage on a first-come-first serve basis. The PGL coordinates with the IBD machines to first copy the affected records from the old main and backup machines to the new ones, update the IML record, and last remove the old main and backup copies. Splitting a PIN group is an involved task. The PGL batches split requests to be run when the DPC is lightly loaded, for instance, at night.

The system administrator may also change the main and backup IBD machines for a given PIN group if the machines' free storage falls below a level required for handling the expected amount of new registrations.

1.5.15.3. Database Schema

The schema for the PIN Group records are:

PINGroup:
   lowPin=int8
   highPin=int8
   used=int4

Each PIN group is identified by a unique identifier. For convenience the PIN group identification code is the lowPin code for the group, however the system does not otherwise rely upon this fact.

The PGL is keyed by the lowPin field.

1.5.15.4. Database Size

The PGL is expected to contain about 3000 groups (each PIN group contains about 1000 active PINs, but may span millions of actual PINs). The entire PGL requires about 72 KB of storage and is cached completely in memory.

1.5.15.5. Dependencies

When PIN groups are added, merged, or split up, the PGL is responsible for informing the IBD Machine List of the changes and for directing the movement of IBD records from one IBD machine to another.

1.5.16. Individual Biometric Database Machine List

1.5.16.1. Purpose

The IBD Machine List (IML), in conjunction with the PIN Group List, codifies the configuration of the IBD machines. The IML maps a PIN code to the main and backup IBD machines storing IBD records for the PIN. The IML is actually keyed by PIN Group (a set of consecutive PIN codes) rather than by buyer PINs because this greatly reduces the memory required to store the list. An IML exists on each GM Machine (GM).

1.5.16.2. Usage

When a GM processes a message that requires a biometric identification, the GM finds the IML record keyed by the biometric PIN group. The GM then knows the main and backup IBD machines to use for the biometric identification.

Most IBD records will be buyers, who will use the system to purchase products from sellers at points of sale. The rest of the records will be generally associated with people who perform administrative functions such as registration, or customer support.

1.5.16.3. Database Schema

The schema for the IML list entries are:
MachinePair:
  pinGroup=int8
  main=int2,
  backup=int2
The IML is keyed by pinGroup.

1.5.16.4. Database Size

The IML is expected to contain about 3000 entries (the number of PIN Groups). Each MachinePair record is 12 bytes requiring about 36 KB of storage and is cached completely in memory.

1.5.16.5. Dependencies

Any changes in the configuration of the IBD machines are reflected in the IML. In addition, the IML uses PIN groups for its keys so when the PIN Group List gets modified, the IML is also updated.

1.5.17. Sequence Number Module

1.5.17.1. Purpose

The Sequence Number Module's (SNM) primary function is to prevent replay attacks by validating packet sequence numbers. Its secondary task is to minimize the effects of a resubmission attack by informing other SNMs in remote DPC sites of sequence number updates and to periodically update the sequence numbers in the Valid Apparatus Database.

The SNM maintains an in-memory hash table of sequence numbers keyed by BIA hardware identification code codes to allow quick validation of packet sequence numbers.

1.5.17.2. Usage

When the SNM receives a validate request from the GM for a given hardware identification code and sequence number, it looks up the hardware identification code in the hash table. If no entry exists, then the SNM replies to the GM with an "invalid hardware identification code" error.

Otherwise, the SNM checks the given sequence number against the sequence number stored in the hash table entry. If the sequence number is less than or equal to the stored sequence number, the SNM replies with an "invalid sequence number" error. Otherwise, the SNM sets the sequence number in the hash table entry to the given sequence number and replies with a "valid sequence number" message.

From time to time, the SNM may observe a sequence number gap. A sequence number gap occurs when the SNM receives a sequence number that is more than one greater than the sequence number stored in the hash table entry. In other words, a sequence number was skipped. When the SNM discovers a sequence number gap, it replies with a "sequence number gap" message to the GM instead of a "valid sequence number" message. The GM treats the packet as valid, but it also logs a "sequence number gap" warning.

Sequence number gaps usually occur when network connectivity is lost: packets are dropped or can't be sent until the network is restored to working order. However, sequence number gaps occur for fraudulent reasons as well: malicious parties could intercept packets preventing them from arriving at the DPC or they could even attempt to counterfeit packets (with a large sequence number so that it isn't immediately rejected).

The SNM's secondary function is to inform other DPCs of the updated sequence numbers. Quickly updating sequence numbers at all DPC sites thwarts resubmission attacks wherein a malicious entity monitors packets destined for one DPC site and immediately sends a copy to a different DPC site in the hope of exploiting the transmission delay of sequence number updates from one DPC site to another resulting in both sites accepting the packet as valid, when only the first site should accept the packet.

The SNMs send update messages to each other whenever they receive a valid sequence number. If an SNM receives an update message for a sequence number that is less than or equal to the sequence number currently stored in its hash table, that SNM logs a sequence number resubmission warning. All resubmission attacks are detected in this manner.

A simpler way to thwart resubmission attacks completely, is to have only one SNM validate packets. Under this scheme, there is no update transmission delay window to exploit with a resubmission attack. Alternately, multiple SNMs can be active at the same time provided none of them handle sequence number validation for the same BIA-equipped device.

1.5.17.3. Sequence Number Maintenance

When the SNM boots up, it loads the sequence number hash table from the sequence numbers for active BIA stored in the VAD.

Once per day, the SNM downloads the current sequence numbers to the local Valid Apparatus Database (VAD).

The VAD is responsible for sending add-entry and remove-entry messages to the SNMs for any BIA-equipped devices that are activated or deactivated to keep the SNM hash table up-to-date.

1.5.17.4. Database Schema

The SNM hash table entry contains:
SNM Entry:
  hardwareId=int4
  sequenceNumber=int4
The hash table is keyed by hardwareId.

1.5.17.5. Database Size

Assuming about 5 million BIA-equipped devices in service requires the hash table to be about 40 MB.

1.5.17.6. Dependencies

The SNM depends on the Valid Apparatus Database. When an apparatus is suspended or removed from the database, the SNM removes the corresponding entry. When an apparatus is activated, the SNM creates an entry for it.

1.5.17.7. Message Bandwidth

The SNMs require a transmission bandwidth of about 8 KB per second to handle 1000 update sequence number messages per second. The update sequence number messages is buffered and sent out once per second to minimize the number of actual messages sent.

1.5.18. Apparatus Owner Database

1.5.18.1. Purpose

The Apparatus Owner Database (AOD) stores information on buyers or organizations that own one or more BIA-equipped devices. This information is used to double check that the BIA devices are used only by their rightful owners, to provide financial account information for financial credit and debit transactions, and to allow identification of all BIAs owned by a specific buyer or organization.

Most BIA devices will be owned by sellers, i.e. sellers engaged in selling to buyers wishing to buy products.

1.5.18.2. Usage

Each AOD record includes a financial account to credit or debit the owner when the DPC processes a financial transaction submitted by one of the owner's BIA-equipped devices. For instance, transactions submitted from BIA attached to a retail point of sale terminal involves credits to the owner's financial account.

1.5.18.3. Database Schema

The schema for the Apparatus Owner record is:
Apparatus Owner:
  ownerId=int4
  name=char50
  address=char50
  zipCode=char9
  financialAccount=char16
  status=int1
The status field is one of:
  0: suspended
  1: active
The Apparatus Owner Database is keyed by ownerId.

1.5.18.4. Database size

The AOD is expected to store about 2 million Apparatus Owner records. Each entry is 130 bytes requiring about 260 MB of storage. The AOD is stored as a hashed file keyed by owner identification code. A copy of the AOD is stored on each GM.

1.5.18.5. Dependencies

When entries are removed or suspended from the AOD, any Valid Apparatus Database records that reference those apparatus owners are marked as suspended. In addition, the MAC Module and the Sequence Number Module remove their entries for the suspended apparatuses.

1.5.19. Valid Apparatus Database

1.5.19.1. Purpose

The Valid Apparatus Database (VAD) is a collection of records representing all of the BIAs that have been manufactured to date. The VAD record contains the Message Authentication Code encryption key for each BIA, as well as an indication of whether a BIA is active, awaiting shipment, or marked as destroyed. In order for a message from a BIA to be decrypted, the BIA must exist and have an active record in the VAD.

1.5.19.2. Usage

When manufactured, each BIA has a unique public identification code. In addition, each BIA is injected with a unique MAC encryption key, and an initial DUKPT key, all of which are entered into the VAD record prior to BIA deployment.

When a BIA is first constructed, it is given a unique hardware identification code. When a BIA is placed in service, its hardware identification code is registered with the system. First, the owner or responsible party of the BIA is entered into the Apparatus Owner Database (AOD). Then, the VAD record is pointed to the AOD record, and the BIA is then set active. Messages from that BIA are accepted by the DPC.

When a BIA enters service, the installing agent performs an attendant security assessment, determining the relative attentiveness the organization pays towards fraud-fighting and the like. Likewise, the geography of the surrounding area is examined; high crime neighborhoods will merit a lower security value, for instance. These values are place in the VAD record for the device. These can change over time.

When a BIA is removed from service, it is marked as inactive, and the link to the AOD record is broken. No communications from that BIA are accepted.

Each BIA type and model has a device security assessment performed on it during its design and construction. This represents the basic ability of the device to resist attempts to monitor the BIA's internal functioning, the ability of the BIA to keep both past and current encryption keys stored on the BIA secret, and the BIA's ability to resist reprogramming by criminals.

The number of failed messages, recent messages, and the average number of messages performed by a given apparatus are recorded in the VAD record, to assist the security factors module in detecting fraudulent messages. Periodically, the recentReqs and the failedReqs fields are cleared.

1.5.19.3. Database Schema

The schema for the Valid Apparatus record is:
Valid Apparatus:
   hardwareId=int4
   macEncryptionKey=int16
   ownerId=int8
   mfgDate=time
   inServiceDate=time
   deviceSecurity=int2
   locationSecurity=int2
   attendentSkill=int2
   failedReqs=int2
   recentReqs=int2
   avgReqs=int2
   status=int1
   type=int1
   use=int1
Possible values for the status field are:
   0: suspended
   1: active
   2: destroyed
Possible values for the type field are (one for each type of terminal):
   0: BRT
   1: CPT
   2: CST
   3: IPT
   4: IT
   5: PPT
   6: RPT
Possible values for the use field are:
   0: retail
   1: personal
   2: issuer
   3: remote
The Valid Apparatus Database is keyed by hardware identification code.

1.5.19.4. Database Size

The VAD handles about 5 million retail, issuer, and remote Valid Apparatus entries. Each entry is 51 bytes requiring about 255 MB total. The VAD is stored as a hashed file keyed by hardware identification code. A copy of the VAD is stored on each GM.

The number of personal Valid Apparatus entries number in the range of 30 million requiring an additional 1.5 GB of storage.

1.5.19.5. Dependencies

When a VAD record changes status, the MAC Modules and Sequence Number Modules are informed of its change in status. For instance, when an apparatus becomes active, the MACP and SNM adds an entry for the newly active apparatus. When an apparatus becomes inactive, the MACP and SNM remove their entry for the apparatus.

1.5.20. Individual Biometric Database

1.5.20.1. Purpose

Individual Biometric Database (IBD) records store personal information on buyers for both identification as well as authentication. This information includes their primary and secondary biometrics, one or more PIN codes, a list of financial accounts, account index codes, account index names, private code, one or more emergency account index codes, address, and phone number. The buyer may optionally include this SSN. This information is necessary for identifying a buyer either by biometric or personal information, for accessing related information, or for providing an address or phone number to remote sellers for additional verification.

1.5.20.2. Usage

Buyers are added to the system during the buyer enrollment process at registered Buyer Registration Terminals located in retail banking establishments worldwide, or in local system offices. During enrollment, buyers select their personal identification numbers, and add financial accounts to their biometric and PIN combination.

Buyers may be removed from the database due to fraudulent activity reported by any issuing member. If this occurs, the buyer's record is moved from the IBD to the Prior Fraud Database (PFD) by an authorized internal systems representative. The biometric Ids for records in the PFD may not be used for records in the IBD.

The IBD exists on multiple machines, each of which is responsible for a subset of the IBD records with a copy of each record stored on two different machines, both for redundancy and for load-sharing. The IBD Machine List, stored on the GM, maintains which machines hold which PINs.

1.5.20.3. Database Schema

The schema for the Buyer Biometric record is:
BuyerBiometric:
   primaryBiometric=biometric
   secondaryBiometric=biometric
   biometricId=int4
   PIN=char10
   phoneNumber=char12
   lastName=char24
   firstName=char24
   middleInitial=char2
   SSN=char9
   privateCode=char40
   address=char50
   zipCode=char9
   publicKey=char64
   checksums=int4[10]
   accountIndexCodes=char30[10]
   accountIndexNames=char30[10]
   emergencyIndexCode=char1
   emergencyLink=char1
   privs=char10
   enroller=int8
   silentAlarmCount=int4
   silentAlarmBehavior=int2
   status=int1
The status field is one of:
   0: suspended
   1: active
   2: priorFraud The IBD is keyed by PIN.

The silent alarm behavior is a list of mutually non-exclusive options, including "notify authorities", "reject attended transaction", "reject unattended transaction", "$150 transaction limit", or "present false private code."

1.5.20.4. Database Indexes

Each IBD machine has additional indexes on the buyer's Social Security Number, biometric identification code, last name, first name, and phone number to facilitate access to the IBD database.

1.5.20.5. Database Size

Each IBD machine has 40 GB of secondary storage provided by one or more RAID devices.

Each IBD record is 2658 bytes (assuming the biometrics are 1K apiece) allowing up to 15 million records per machine. The IBD records are stored using a (perhaps clustered) secondary index on the PIN. The index is stored in memory and requires no more than 64 MB (a 64 MB index handles about 16 million entries). To store records for 300 million buyers, the DPC needs at least 40 IBD machines: 20 IBD machines for main storage and another 20 for backup. The number of IBD machines is easily scaled up or down depending on the number of registered buyers.

1.5.20.6. Dependencies

The IBD machines, PIN Group List, and the IBD Machine List remain up-to-date in terms of which PINs are on which machine. When a PIN group is reconfigured or main and backup machines for PIN groups are changed, the IBD machines update their databases and indexes appropriately.

1.5.21. Authorized Individual Database

1.5.21.1. Purpose

For each issuer or personal BIA-equipped device, the Authorized Individual Database (AID) maintains a list of buyers who are authorized, by the owner of the device, to use it.

The AID exists for two reasons. The first is that it provides restricted access to a terminal. For example, the Issuer Terminal can only be used by an authorized bank representative. The second reason for the AID is to prevent criminals from secretly replacing the BIA in a retail point of sale terminal with that of a personal BIA from a phone Terminal and thus routing all purchases to a remote seller financial account set up by the criminals.

1.5.21.2. Database Schema

The schema for the Authorized Individual record is:
Authorized Individual:
    hardwareId=int4
    biometricId=int4

The hardwareId refers to a record in the Valid Apparatus Database and the biometricId refers to a record in the Individual Biometric Database. Whenever the DPC needs to check whether an individual is authorized to use a personal or issuer BIA device, the DPC checks for the existence of an Authorized Individual record with the correct hardwareId and biometricId.

Personal BIA devices are identified by a use field set to 1 (personal) in the Valid Apparatus Database. Issuer BIA devices are identified by a use field set to 2 (issuer) in the Valid Apparatus Database.

1.5.21.3. Database Size

Assuming each issuer terminal has 10 individuals authorized to use it and an each personal device has two authorized individuals with 1,000,000 personal devices in the server, the AID stores about:

10 * 100,000+2 * 1,000,000=3,000,000 entries

The entire database requires about 24 MB of storage.

1.5.21.4. Dependencies

When Authorized Owner Database records or Valid Apparatus Database records are removed, all Authorized Individual records referencing them are removed.

1.5.22. Prior Fraud Database

1.5.22.1. Purpose

The Prior Fraud Database (PFD) is a collection of records representing buyers who have defrauded member issuers at some point in the past. This database allows the DPC to perform a re-registration check on every new registrant quickly, since only a small number of buyers will be designated as having defrauded member issuers. The PFD also runs background transactions during periods of low system activity to weed out buyers in the IBD who have matching records in the PFD.

The system does not automatically put buyers in the PFD, unless it detects that they are attempting to register again. Placing a buyer in the PFD is a sensitive policy matter which is outside the scope of this document.

1.5.22.2. Usage

Before a new IBD record is marked as active, the buyer's primary and secondary biometrics are checked against each and every biometric in the PFD using the same biometric comparison techniques as those used in the buyer identification procedure. If a match is found for the new IBD record, the IBD record's status is designated with a label of "prior fraud", and the GM logs a "registering buyer with prior fraud" warning.

It is assumed that the PFD will remain relatively small. The cost to run the PFD is expensive, as it is an involuntary biometric search, so it is important to add only those buyers to the PFD who have imposed a significant cost to the system.

1.5.22.3. Database Schema

The schema for the Prior Fraud record is:
Prior Fraud:
    primaryBiometric=biometric
    secondaryBiometric=biometric
    biometricId=int4
    PIN=char10
    phoneNumber=char12
    lastName=char24
    firstName char24
    middleInitial=char2
    SSN=char9
    privateCode=char40
    address=char50
    zipCode=char9
    publicKey=char64
    checksums=int4[10]

accountLinks=char30[10]
emergencyIndex=char1
emergencyLink=char1
privs=char10
enroller=int8
emergencyUseCount=int4
status=int1

The status field is one of:
0: suspended
1: active
2: prior fraud

The PFD is keyed by biometric identification code.

1.5.22.4. Database Size

The PFD record is the same as the IBD record. Fortunately, the DPC needs to store a lot less of them so only two database machines are required to store the entire database, of which one is the backup.

1.5.22.5. Dependencies

The PFD does not have any direct dependencies on any other DPC component.

1.5.23. Issuer Database

1.5.23.1. Purpose

The Issuer Database (ID) stores information on banks and other financial institutions that allow their financial accounts to be accessed through the system. For many financial accounts, such as bank financial accounts such as savings or checking accounts, the issuing institutions are the only entities that can add or remove their financial account numbers to a given buyer's IBD record.

1.5.23.2. Usage

The DPC uses the ID to validate messages from Issuer Terminals by searching the ID for a record containing the Issuer Terminal's issuer code. The owner Identification stored in the record must match up with the owner stored in the Valid Apparatus Database for the BIA stored in the Issuer Terminal.

The schema for the Issuer record is:
Issuer Record:
issuerCode=int6
ownerId=int4
name=char50
phoneNumber=char12
address=char50
zipCode=char9

The Issuer Database is keyed by issuerCode.

1.5.23.3. Database Size

The Issuer Database handles about 100,000 entries. Each entry is 127 bytes requiring less than 2 MB. A copy of the ID is stored on each GM.

1.5.23.4. Dependencies

The Issuer Database does not have any direct dependencies on any other DPC component.

1.5.26. Remote Seller Database

1.5.26.1. Purpose

The Remote Seller Database (RSD) stores information on sellers that provide goods or services over telephones, cable television networks, or the Internet. Each order sent by a buyer using a properly-equipped terminal is routed through the seller's order terminal to the system.

1.5.26.2. Usage

Once a buyer's remote commercial transaction is received and the MAC validated by the DPC, the seller identification code is compared against the seller identification code in the RSD. The seller identification code, be it phone number, seller-product credential, or Internet address, exists in the RSD record under the correct seller identification code or the DPC terminates the message and returns an invalid seller identification code error to the sending BIA terminal device.

1.5.26.3. Database Schema

The schema for the Remote Seller record is:
Remote Seller:
sellerId=int4
sellerCode=char16
sellerType=int1
publicKey=int16

The Remote Seller sellerType is one of:
0: telephone
1: CATV
2: Internet

The sellerId and sellerCode are both primary keys. No two RSD records have the same sellerId and sellerCode combination.

1.5.26.4. Database Size

Assuming about 100,000 remote sellers, the RSD requires about 24 bytes per record for a total of about 2.4 MB storage required.

1.5.26.5. Dependencies

The RSD does not have any direct dependencies on any other DPC components.

1.5.27. System Performance

The key performance number is how many financial authorization transactions the DPC handles per second. The tasks required to process a transaction along with an estimate of the time cost to complete them follows:

In GM:
1. MACM checks the MAC (local)
2. SNM checks the sequence number (network message)
3. MDM decrypts the biometric-PIN block (local)
4. Find IBD machine (local)
5. Send identify message to the IBD machine (network message)

In IBD machine:
6. Retrieve all IBD records for the PIN (x seeks and x reads, where x is the number of pages required to store the biometric records).
7. For each record, compare against its primary biometric (y/2 ms where y is the number of records retrieved).
8. If no reasonable match, repeat step 9 but compare against the secondary biometric (z * y/2 ms, where y is the number of records retrieved and z is the probability no match is found).
9. Update the best matching IBD record's checksum queue and check for possible replay attacks (1 seek, 1 read, and 1 write).

10. Return the best matching IBD record or an error if the match is not close enough (network message).

In GM:

11. Authorize message with an external processor (network message)
12. GM encrypts and MACs the response (local).
13. Sends response packet back (network message).

Transaction Per Second Estimates:

$$x*(s+r)+y/2*(1+z)+s+r+w+5* \quad n=(x+1)*(s+r)+y/2*(1+z)+w+5*n$$

[assume x is 20, y is 30, z is 5%; s=10 ms, r=0 ms, w=0 ms, n=0 ms]
=21 * 10 ms+15 * 1.05 ms
=226 ms
=4.4 TPS

[assume x is 10, y is 15, z is 5%; s=10 ms, r=0 ms, w=0 ms, n=0 ms]
=11 * 10 ms+7.5 * 1.05 ms
=118 ms
=8.4 TPS

[assume x is 1, y is 1, z is 5%; s=10 ms, r=0 ms, w=0 ms, n=0 ms]
=2 * 10 ms+½* 1.05 ms
=21 ms
=47 TPS The backup IBD machine also processes messages doubling effective TPS.

| Buyers/PIN | TPS |
|---|---|
| Worst case (with 2 machines in use): | |
| 30 | 8 |
| 15 | 16 |
| 1 | 94 |
| Average case (with 20 machines in use): | |
| 30 | 88 |
| 15 | 168 |
| 1 | 940 |
| Best case (with 40 machines in use): | |
| 30 | 176 |
| 15 | 336 |
| 1 | 1880 |

The above is just an example of one configuration of the system as it could be implemented in a commercially viable manner. However, it is anticipated that this invention can be configured in many other ways which could incorporate the use of faster computers, more computers, and other such changes.

1.6. Terminal Protocol Flowchart

The following set of protocol flows describe interactions between specific terminals, the DPC, the attached BIA, and other parties such as the credit/debit processor, and so on.

1.6.1. Retail Point of Sale Terminal

In this case, an RPT communicates with a retail BIA and the DPC to authorize a transaction. The transaction amount is 452.33, the buyer's financial account is 4024-2256-5521-1212 seller identification code is 123456, and the buyer's private code is "I am fully persuaded of it."

RPT→BIA Set Language <English>
BIA→RPT OK
RPT→BIA Get Biometric <20>
BIA/LCD: <Please place finger on lighted panel>
Buyer places finger on scanner
BIA→RPT OK
RPT→BIA Get Pin <40>
BIA/LCD: <Please enter your PIN, then press <enter>>
Buyer enters PIN, then <enter>
BIA→RPT OK
RPT→BIA Get Account Index Code <40>
BIA/LCD: <Now enter your account index code, then press <enter>>
Buyer enters code, then <enter>
BIA→RPT OK
RPT→BIA Validate Amount <452.33> <40>
BIA/LCD: <Amount 452.33 OK?>
Buyer enters OK
BIA→RPT OK
RPT→BIA Assign Register <1> <123456>
BIA→RPT OK
RPT→Form Message <Commercial Transaction Message>
BIA→RPT <Commercial Transaction Message>
BIA→RPT OK
BIA/LCD: <I'm talking to DPC Central>
RPT→DPC <Commercial Transaction Message>
DPC: validate biometric, retrieve financial account number→4024-2256-5521-1212
DPC→VISA <authorize 4024-2256-5521-1212 452.33 123456>
VISA→DPC <OK 4024-2256-5521-1212 452.33 123456 autho-code>DPC: get private code
DPC→RPT <Transaction Response Message>
RPT→BIA Show Response <Transaction Response Message> <8>
BIA/LCD: <Transaction ok: I am fully persuaded of it>
BIA→RPT <OK <autho-code>>RPT: prints receipt with autho-code on it

1.6.2. Internet Point of Sale Terminal

In this case, an IPT communicates with a standard BIA and the DPC to authorize a transaction. The transaction amount is 452.33, the buyer's financial account is 4024-2256-5521-1212, the Internet seller is located at seller.com, his seller identification code is 123456, and the buyer's private code is "I am fully persuaded of it."

IPT→seller.com <send me seller identification code if resources available>seller.com→IPT <OK 123456 seller.com-public-key>
IPT generates session key, encrypted with seller.com-public-key
IPT→seller.com <session key>
All subsequent communications with seller are encrypted with session key.
seller.com→IPT <price and product information>
IPT/Screen: displays price and product information
Buyer: selects item "fruitcake, price 45.33"
IPT→BIA Set Language <English>
BIA→IPT OK
IPT→BIA Get Biometric <20>
BIA/LCD: <Please place finger on lighted panel>
Buyer places finger on scanner
BIA→IPT OK
IPT→BIA Get Pin <40>
BIA/LCD: <Please enter your PIN, then press <enter>>

Buyer enters PIN, then <enter>
BIA→IPT OK
IPT→BIA Get Account Index Code <40>
    BIA/LCD: <Now enter your account index code, then press <enter>>
    Buyer enters code, then <enter>
BIA→IPT OK
IPT→BIA Validate Amount <45.33> <40>
    BIA/LCD: <Amount 45.33 OK?>
    Buyer enters OK
BIA→IPT OK
IPT→BIA Assign Register <1> <123456>
BIA→IPT OK
IPT→BIA Assign Register <2> <seller.com>
BIA→IPT OK
IPT→BIA Assign Register <3> <fruitcake>
BIA→IPT OK
IPT→BIA Form Message <remote transaction>
BIA→IPT <Commercial Transaction Message>
BIA→IPT OK
    BIA/LCD: <I'm talking to DPC Central>
IPT→seller.com <Commercial Transaction Message>
seller.com→secure-connect to DPC using DPC public key
seller.com→DPC <Commercial Transaction Message>
    DPC: validate biometric, retrieve financial account number→4024-2256-5521-1212
    DPC: validate Internet seller.com with code 123456
DPC→VISA <authorize 4024-2256-5521-1212 45.33 123456>
VISA→DPC <OK 4024-2256-5521-1212 45.33 123456 autho-code>
DPC: get private code
DPC→seller.com <Commercial Transaction Response Message>
    seller.com stores autho code
seller.com→IPT <Commercial Transaction Response Message>
IPT→BIA Show Response <Transaction Response Message> <8>
    BIA/LCD: <Transaction ok: I am fully persuaded of it>
BIA→IPT <Transaction OK>

1.6.3. Buyer Registration Terminal

In this case, a BRT communicates with a registration BIA and the DPC to register a buyer with the system.

BRT→BIA Set Language <English>
BIA→BRT OK
BRT→BIA Get Biometric <20> <primary>
    BIA/LCD: <Please place PRIMARY finger on lighted panel>
    Buyer places primary finger on scanner
BIA→BRT OK
BRT→BIA Get Biometric <20> <secondary>
    BIA/LCD: <Please place SECONDARY finger on lighted panel>
    Buyer places secondary finger on scanner
BIA→BRT OK
BRT→BIA Get Pin <40>
    BIA/LCD: <Please enter your PIN, then press <enter>>
    Buyer enters 123456, then <enter>
BIA→BRT OK
BRT→BIA Get Message Key
BIA→BRT <OK <message key>>
BIA→<Registration Message>
    BRT/Screen: <Name: >
    Representative enters <Fred G. Shultz>
    BRT/Screen: <Address: >
    Representative enters <1234 North Main>
    BRT/Screen: <Zipcode: >
    Representative enters <94042>
    BRT/Screen: <Private code: >
    Representative queries buyer, then enters <I am fully persuaded of it.>
    BRT/Screen: <Financial account list: >
    Representative enters <2, 1001-2001-1020-2011> (credit card)
    Representative enters <3, 1001-1002-0039-2212> (checking account)
    BRT/Screen: <Emergency account index code: >
    Representative enters <1, 2>(emergency, credit card)
BRT→Form Message <registration>
BIA→BRT <Registration Message>
BIA→BRT OK
    BIA/LCD: <I'm talking to DPC Central>
    BRT appends message-key-encrypted personal information to request
BRT→DPC Registration Message> <encrypted personal information>
    DPC: verify PIN 123456
DPC→BRT <Registration Response Message>
BRT→BIA Show Response <Registration Response Message> <8>
    BIA/LCD: <Registration ok: I am fully persuaded of it, 123456>
BIA→BRT <OK>

1.6.4. Customer Service Terminal

In this case, a CST communicates with a standard BIA and the DPC to verify the identity and the credentials of a buyer.

CST→BIA Set Language <English>
BIA→CST OK
CST→BIA Get Biometric <20>
    BIA/LCD: <Please place finger on lighted panel>
    Buyer places finger on scanner
BIA→CST OK
CST→BIA Get Pin <40>
    BIA/LCD: <Please enter your PIN, then press <enter>>
    Buyer enters PIN, then <enter>
BIA→CST OK
CST→BIA Get Message Key
BIA→CST <OK <message key>>
CST→Form Message <Buyer Identification Message>
BIA→CST <Buyer Identification Message>
BIA→CST OK
    BIA/LCD: <I'm talking to DPC Central>
CST→DPC <Buyer Identification Message>
    DPC: get private code, buyer's priv
DPC→CST <Buyer Identity Response>
CST→BIA Show Response <Buyer Identification Response> <8>
    BIA/LCD: <Identity ok: I am fully persuaded of it>
BIA→CST <OK <buyer-name priv>>

CST: check priv to see if sufficient for CST use

1.6.5. Issuer Terminal

In this case, an IT communicates with a standard BIA and the DPC to authorize and send a batch of account addition and deletion messages to the DPC. The buyer's private code is "I am fully persuaded of it", and the bank code is 1200.

IT→BIA Set Language <English>
BIA→IT OK
IT→BIA Get Biometric <20>
  BIA/LCD: <Please place finger on lighted panel>
  Buyer places finger on scanner
BIA→IT OK
IT→BIA Get Pin <40>
  BIA/LCD: <Please enter your PIN, then press <enter>>
  Buyer enters PIN, then <enter>
BIA→IT OK
IT→BIA Assign Register <1> <1200>
BIA→IT OK
IT→BIA Get Message Key
BIA→IT <message key>
BIA→IT OK
IT→BIA Form Message <Issuer Batch message>
BIA→IT <Issuer Batch message>
BIA→IT OK
  BIA/LCD: <I'm talking to DPC Central>
IT→DPC <Issuer Batch message> <message-key-encrypted issuer batch>
  DPC: validate biometric, validate bank code 1200 vs. BIA identification
  DPC: get private code
  DPC: decrypt message using message key, execute issuer batch
DPC→IT <Issuer Batch Response>
IT→BIA Show Response <Issuer Batch Response> <8>
  BIA/LCD: <Batch ok: I am fully persuaded of it>
BIA→IT <OK>

1.6.6. Phone Point of Sale Terminal

In this case, a PPT communicates with an integrated phone BIA and the telephone seller to download information and purchase items securely using the telephone. The buyer's PIN is 1234, the account index code is 1, the seller's phone number is 1 800 542-2231, seller identification code 123456, and the actual financial account number is 4024-2256-5521-1212.

Note that the telephone strips the area code (1-800) from the telephone number before handing it to the system.
Buyer dials phone 18005422231

PPT→connect seller 18005422231
PPT→BIA Assign Register 1 <5422231>
  Sales rep answers. Buyer selects item "fruitcake". Sales rep downloads info.
seller→PPT <123456 fruitcake 43.54>
PPT→BIA Get Biometric <20>
  Phone/LCD: <Please place finger on lighted panel>
  Buyer places finger on scanner
BIA→PPT OK
  Phone/LCD: <Please enter your PIN, then press #>
  Buyer enters 1234 on keypad, then # or * (enter)
PPT→BIA Set Pin <1234>
BIA→PPT OK
  Phone/LCD: <Now enter your account index code>
  Buyer enters 1, then <enter>
RPT→BIA Set Account index code <1>
BIA→PPT OK
RPT→BIA Assign Register <2> <123456>
BIA→PPT OK
  Phone/LCD: <Press # if amount 45.54 is ok>
  Buyer enters # (yes)
PPT→BIA Set Amount <43.54>
BIA→PPT OK
PPT→Form Message <Commercial Transaction message>
BIA→PPT <Remote Transaction Request>
BIA→PPT OK
  Phone/LCD: <I'm talking to DPC Central>
PPT→seller <Commercial Transaction Message>
seller→DPC secure-connect to DPC using DPC-public-key
seller→DPC <Commercial Transaction Message>
  DPC: validate biometric, retrieve financial account number→4024-2256-5521-1212
  DPC: validate seller 5422231 has code 123456
DPC→VISA <authorize 4024-2256-5521-1212 43.54 123456>
VISA→DPC <OK 4024-2256-5521-1212 43.54 123456 autho-code>
  DPC: get private code
DPC→seller <Commercial Transaction Response Message>
  seller examines response code
seller→PPT <Commercial Transaction Response Message>
PPT→BIA Decrypt Message <Commercial Transaction Response Message>
BIA→PPT <OK <I am fully persuaded of it> <autho-code>>
  25 Phone/LCD: <chime>Transaction ok: I am fully persuaded of it

1.6.7. Cable-TV Point of sale Terminal

In this case, a CPT communicates with an integrated cable-tv BIA and the Cable television seller to download information and purchase items securely using the cable television broadband network. The buyer's PIN is 1234, the account index code is 1, the channel is 5, the seller identification code 123456, and the actual financial account number is 4024-2256-5521-1212.

Buyer turns the television to channel 5.
Seller→CPT <fruitcake 43.54 123456>(broadcast)
  Buyer hits "buy" on TV Remote
  CPT/TV: <Buying fruitcake for $43.54>
CPT→BIA Get Biometric <20>
  CPT/TV: <Please place finger on lighted panel>
  Buyer places finger on scanner
BIA→CPT OK
  CPT/TV: <Please enter your PIN, then press <enter>>
  Buyer enters 1234 on keypad, then "buy"
CPT→BIA Set Pin <1234>
BIA→CPT OK
  CPT/TV: <Now enter your account index code>
  Buyer enters 1, then <enter>

RPT→BIA Set Account index code <1>
BIA→CPT OK
RPT→BIA Assign Register <1> <channel 5, 15:30:20 PST>
BIA→RPT OK
CPT→BIA Assign Register <2> <123456>
BIA→CPT OK
  CPT/TV: <Press "buy" if amount 45.54 is ok>
  Buyer enters "buy"
CPT→BIA Set Amount <43.54>
BIA→CPT OK
CPT→Form Message <Commercial Transaction message>
BIA→CPT <Commercial Transaction message>
BIA→CPT OK
  CPT/TV: <I'm talking to DPC Central>
CPT→CTV Center <Commercial Transaction Message>
CTV Center seller <Commercial Transaction Message>
seller→DPC secure-connect to DPC using DPC-public-key
  seller DPC <Commercial Transaction Message>
  DPC: validate biometric, retrieve financial account number→4024-2256-5521-1212
  DPC: validate seller channel 5, current show has code 123456
DPC→VISA <authorize 4024-2256-5521-1212 43.54 123456>
VISA→DPC <OK 4024-2256-5521-1212 43.54 123456 autho-code>
  DPC: get private code, mailing address
DPC→seller <Transaction Response Message>
  seller examines response code, records mailing address
seller→CTV Center <Transaction Response Message>
CTV Center→CPT <Transaction Response Message>
CPT→BIA Decrypt Message <Transaction Response Message>
BIA→CPT <OK <I am fully persuaded of it> <autho-code>>
  CPT/TV: <chime>Transaction ok: I am fully persuaded of it From the foregoing, it will be appreciated how the objects and features of the invention are met. First, the invention provides a computer identification system that eliminates the need for a user to possess and present a physical object, such as a token, in order to authorize a transaction.

Second, the invention provides a computer identification system that is capable of verifying a user's identity, as opposed to verifying possession of proprietary objects and information.

Third, the invention verifies the user's identity based upon one or more unique characteristics physically personal to the user.

Fourth, the invention provides an identification system that is practical, convenient, and easy use.

Fifth, the invention provides a system of secured access to a computer system that is highly resistant to fraudulent transaction authorization attempts by non-authorized users.

Sixth, the invention provides a computer identification system that enables a user to notify authorities that a particular access request is being coerced by a third party without giving notice to the third party of the notification.

Although the invention has been described with respect to a particular tokenless identification system and method for its use, it will be appreciated that various modifications of the apparatus and method are possible without departing from the invention, which is defined by the claims set forth below.

5. Glossary

ACCOUNT INDEX CODE:
  A digit or an alpha-numeric sequence that corresponds to a particular financial account AID:
  Authorized Individual Database: contains the list of individuals authorized to use personal and issuer BIA devices.

AOD:
  Apparatus Owner Database: central repository containing the geographic and contact information on the owner of each BIA.

ASCII:
  American Standard Code for Information Interchange

SELLER:
  A person or entity that proposes transactions to buyers, generally for the purpose of selling goods and services buyers.

BIA:
  Biometric input apparatus; collects biometric identity information, encodes and encrypts it, and makes it available for authorizations. Comes in different hardware models and software versions.

Biometric:
  A measurement taken by the system of some aspect of a buyer's physical person.

Biometric ID:
  An identifier used by the system to uniquely identify an individual's biometric record (IRID —Individual Record ID)

BIO-PIN GROUP:
  a collection of algorithmically dissimilar biometric samples linked to the same personal identification number BRT:
  Buyer Registration Terminal; located at retail banking outlets, BRTs combine buyer registration information with a buyer-selected PIN and selected personal information to register buyers with the system.

CBC:
  Cipher Block Chaining: an encryption mode for the DES.

CCD:
  Charged-Coupled Device

COMMERCIAL TRANSACTION:
  A Commercial Transaction involves a seller proposing a transaction to a buyer. If the buyer approves, he appends his biometric and PIN to the transaction, and sends it to the DPC for authorization and execution.

COMMANDS:
  A program or subroutine residing in the DPC that performs a specific task, activated by a request message sent from a BIA-equipped terminal.

CPT:
  Cable-TV Point-of-Sale Terminal: combines an onscreen display simulcast digital signal informing TV-top cable box of product information with product video, and a BIA controller remote which performs the biometric-pin validation using the CATV communications network. Order/autho/mailing-address/item-id forwarded to seller. Results of authorization are displayed on the TV.

CST:
: Customer Service Terminals; provide system customer service personnel with varying degrees of access (based on access privilege) the ability to retrieve and modify information on buyers in order to help people with account problems.

CUSTOMER:
: An individual who can authorize transactions at a point of sale using nothing more than a biometric and a PIN.

DATA SEALING STEP:
: The conversion of plain text to cipher text (known as "encryption") in combination with the encrypted checksumming of a message that allows information to remain in plain text while at the same time providing a means for detecting any subsequent modification of the message.

DES:
: Data Encryption Standard: a standard for the cryptographic protection of digital data. See standard ANSI X3.92-1981

DPC:
: A data processing center, also known as the computer system, which represents the place and the entity where the hardware, software, and personnel are located that support a multigigabyte biometric identity database. A DPC processes electronic messages, most of which involve performing biometric identity checks as a precursor to performing a financial transaction.

DSP:
: Digital Signal Processor: a class of integrated circuits that specialize in the mathematical operations required by the signal processing applications.

DUKPT:
: Derived Unique Key Per Transaction: See standard ANSI/ABA X9.24-1992

EMERGENCY ACCOUNT INDEX CODE:
: the alpha-numeric digit or sequence selected by a buyer which, when accessed, will result in a transaction being labelled by the system as an emergency transaction, potentially causing the display of false screens and/or the notification of authorities that the buyer has been coerced into performing a transmission or transaction.

FAR (False Accept Rate):
: the statistical likelihood that one buyer's biometric will be incorrectly identified as the biometric of another buyer.

FALSE SCREENS:
: Displays of information which has been intentionally pre-determined to be subtly inaccurate such that a coercing party will not illegally obtain accurate data about a buyer's financial accounts, all the while remaining unaware of the alteration of the information.

FDDI:
: Fiber Digital Device Interface: a networking device that utilizes a fiber optic token ring.

FS:
: Field Separator

FW:
: Firewall Machine: the Internet-local net router that regulates traffic into and out of the DPC.

GM:
: Gateway Machine: the main processing computers in the DPC; runs most of the software.

IBD:
: Individual Biometric Database: central repository for biometric, financial account, and other personal information. Queries against the biometric database are used to verify identity for commercial transactions and transmissions.

ID:
: Issuer Database: central repository containing the institutions that are allowed to add and delete financial account numbers with the system.

IML:
: IBD Machine List: a software module in the DPC determines which IBD machines are responsible for which PIN codes.

INTERNET SELLER:
: A party selling services or goods to buyers by means of the Internet electronic network IPT:
: Internet Point-of-Sale Terminal: retrieves items and seller identification code from the Internet, gathers BIA biometric-PIN for validation, sends using Internet, autho/order/PO # forwarded to seller who in turn forwards to DPC. DPC response forwarded by seller to IPT using Internet as well, which displays results on screen.

ISSUER:
: a financial account issuer for financial assests to be registered with the DPC.

ISSUER BATCH:
: A collection of "add" and "delete" instructions complete with biometric IDs, financial accounts, and account index codes verified and submitted by an issuer to the DPC.

IT:
: Issuer Terminals; provides a batch connection to the system for issuers to add and remove (their own) financial account numbers from specific buyer's IBD records.

LCD:
: Liquid Crystal Display: a technology used for displaying text.

MAC:
: Message Authentication Code: an encrypted checksum algorithm, the MAC provides assurance that the contents of a message have not been altered subsequent to the MAC calculation. See standard ANSI X9.9-1986

MACM:
: Message Authentication Code Module: a software module in the DPC that handles MAC validation and generation for inbound and outbound packets.

MDM:
: Message Decrypt Module: a software module in the DPC that encrypts and decrypts packets from or destined to a BIA device.

MPM:
: Message Processing Module: a software module in the DPC that performs the processing of request packets.

PFD:
: Prior Fraud Database: central repository for IBD records which have had prior fraud associated with them. During registration, every new applicant's biometrics are checked to see if a re-registration is occurring against all PFD records with the intent of reducing recidivism.

PGL:
: PIN Group List: a software module in the DPC that is responsible for maintaining the configuration of the IBD machines.

PIN:
　　Personal identification number; a password formed from either numbers, symbols, or alphabetic characters that only the rightful account owner is supposed to know.
PPT:
　　Phone Point of Sale Terminal; allows sellers to collect transaction authorizationsover a BIA-equipped telephone. Resulting authorization is displayed on phone LCD, or "spoken", along with the buyer's private code.
RAM:
　　Random Access Memory
RF:
　　Radio Frequency: generally refers to radio frequency energy emitted during the normal operation of electrical devices.
REGISTERS:
　　Memory reserved for a specific purpose, data set aside on chips and stored operands to instructions
REQUESTS:
　　Electronic instructions from the BIA to DPC instructing the DPC to identify the buyer and thereby process the buyer's command in the event the identification is successful
RSD:
　　Remote Seller Database: contains all seller identification codes for seller telephone and Cable TV order shops; indexed by seller ID. Contains per-seller system encryption codes as well.
SNM:
　　Sequence Number Module: a software module in the DPC that handles the DUKPT sequence number processing for inbound request packets. Sequence number processing protects against replayattacks.
Terminal:
　　A device that uses the BIA to collect biometric samples and form request messages that are subsequently sent to the DPC for authorization and execution. Terminals almost always append ancillary information to request messages, identifying counterparties and the like.
Token:
　　An inanimate object conferring a capability.
TRANSACTION:
　　An electronic financial exchange.
VAD:
　　Valid Apparatus Database: central repository in which each BIA (with associated unique encryption codes) is identified, along with the owner of the BIA.

What is claimed is:

1. A method for tokenless authorization of commercial transactions between a buyer and a seller using a computer system, the method comprising the steps of:

a. a buyer registration step, wherein the buyer registers with the computer system a PIN, at least one registration biometric sample, and at least one buyer financial account;

b. a seller registration step, wherein the seller registers with the computer system at least one seller financial account and a seller identification code;

c. a proposal step, wherein the seller offers a proposed commercial transaction to the buyer, the proposed commercial transaction comprising a seller identification code and price information;

d. an acceptance step, wherein the buyer signals acceptance of the seller's proposed commercial transaction by adding to the proposed commercial transaction the buyer's personal authentication information comprising a PIN and at least one bid biometric sample wherein the bid biometric sample is obtained by the system from the buyer's person, to form a commercial transaction message;

e. a transmission step, wherein the commercial transaction message is forwarded to the computer system;

f. a buyer identification step, wherein the computer system compares the personal authentication information in the commercial transaction message with registration biometric samples for producing either a successful or failed identification of the buyer;

g. a payment step, wherein upon determination of sufficient resources, a financial account of the buyer is debited and a financial account of the seller is credited, wherein a commercial transaction is conducted without the buyer having to use any portable man made memory devices such as smart cards or swipe cards; and h. a presentation step, wherein any combination of the results of steps a) through g) are presented to the buyer or seller.

2. The method of claim 1 wherein the buyer identification step is accomplished preferably in less than about 2 seconds, whereby the entire commercial transaction is completed within a commercially acceptable timeframe.

3. The method of claim 1 further comprising a computer system authentication step wherein a private code, distinct from the PIN and not used to gain access to the computer system, is gathered from the buyer during the buyer registration step and presented to only the buyer during the presentation step, whereby the buyer is assured that the authentic computer system was used to process the commercial transaction.

4. The method of claim 1 wherein the buyer registers an emergency PIN during the registration step which, if entered by the buyer during the acceptance step in place of the PIN, triggers a silent alarm.

5. The method of claim 1 wherein the price information comprises any combination of the following: a list of goods and services, a seller name, a date and time, a location, and an invoice number.

6. The method of claim 1 wherein the acceptance step further comprises the buyer entering an amount that is the sum of a cash back value to the proposed transaction amount.

7. The method of claim 1 wherein the seller identification code is identical to the seller financial account.

8. The method of claim 1 wherein all communications with the computer system are encrypted.

9. The method of claim 1 wherein the biometric sample is a fingerprint.

10. The method of claim 1 wherein the biometric sample is retinal image.

11. The method of claim 1 wherein the biometric sample is a voice print.

12. The method of claim 1 further comprising a biometric theft resolution step, wherein the PIN of the buyer is changed whenever the buyer's biometric sample is determined to have been stolen.

13. The method of claim 1 further comprising a seller identification step, wherein the seller is identified by the computer system.

14. The method of claim 1 wherein the buyer is remote from the seller and communicates with the seller using a computer network.

15. The method of claim 14 wherein the computer network is any one of the group comprising the Internet, a private intranet, a telephone network, or a cable TV network.

16. The method of claim 1 further comprising a buyer re-registration check step, wherein the buyer's registration biometric samples are compared against previously designated biometric samples of certain buyers wherein if a match occurs, the computer system is alerted to the fact that the buyer has re-registered, whereby buyers who perpetrate fraud on the system can be automatically identified from their biometrics alone if and when they re-register.

17. The method of claim 16 wherein the biometrics are collected from a specific finger, such as the index finger, whereby the system can more easily detect re-registrations of previously designated biometric samples of certain buyers by limiting the number of different finger combinations the buyer can use to register without being detected.

18. The method of claim 1 further comprising a security determination step, wherein an evaluation is made using a set of security factors to determine the overall likelihood of fraud for a particular transaction.

19. The method of claim 18 wherein the security factors are selected from the group of a biometric-PIN input device security assessment, relative skill of attendant (at an attended location) to detect fraud, physical location and related neighborhood crime information, time at which the authorization takes place, number of recently failed authorization attempts originating from that device, number of recent authorizations issuing from that device related to the historical number of transactions from that device.

20. The method of claim 1 further comprising a buyer's resource determination step, wherein after successful identification of the buyer, a determination is made if the buyer has sufficient resources to pay for the transaction.

21. The method of claim 20 wherein during the buyer registration step, the buyer registers at least one buyer financial account and assigns an account index code to each buyer financial account, and during the acceptance step the buyer adds the account index code to the commercial transaction message, wherein the account index code further comprises one or more alphanumeric characters.

22. The method of claim 21 wherein during the buyer registration step, the buyer registers an emergency account index code, which when added to the commercial transaction message during the acceptance step, triggers a silent alarm.

23. The method of claim 22 wherein during the registration step, the buyer specifies any combination of actions taken upon the triggering of the silent alarm comprising artificial financial resource limits, presentation of a false private code, rejection of the transaction, or the sending of the silent alarm to the seller.

24. The method of claim 21 wherein during the buyer's resource determination step, the computer system uses the account index code that was added to the commercial transaction message to select the corresponding buyer financial account.

25. The method of claim 24 wherein the registration step further comprises assigning an account index name to an account index code.

26. The method of claim 25 further comprising an account name display step, wherein a list of accounts with their account index names can be retrieved and displayed to the buyer after a successful identification, wherein no transaction needs to take place if it is desired that the account index names be retrieved.

27. The method of claim 20 wherein during both the resource determination step and the payment step the computer system communicates with one or more external computer systems in order to perform any combination of the following steps: the resource determination, debiting the buyer's financial account, and crediting the seller's financial account.

28. The method of claim 20 wherein during the payment step, a credit authorization draft is created detailing an agreement to pay the seller from the buyer's financial account up to an amount specified during the proposal step, whereby transactions can be conducted when the exact amount to be transferred is not known at the time of authorization or when a deposit is required but the account may not ever be debited.

29. The method of claim 28 wherein during both the resource determination step and the payment step the computer system communicates with one or more external computer systems in order to perform any combination of the following steps: the resource determination or the construction of the credit authorization draft.

30. The method of claim 29 wherein one of the external computer systems comprises VISANet or MAPP.

31. A method for tokenless authorization of commercial transactions between a buyer and a seller using a computer system, wherein the buyer may select one of many registered financial accounts from which to make payment, said method comprising the steps of:

a. a buyer registration step, wherein the buyer registers with the computer system a PIN, at least one registration biometric sample, and at least one buyer financial account, wherein each buyer financial account is assigned an account index code;

b. a seller step, wherein the seller registers with the computer system at least one seller registration financial account and a seller identification code;

c. a proposal step, wherein the seller offers a proposed commercial transaction to the buyer, the proposed commercial transaction comprising a seller identification code and price information;

d. an acceptance step, wherein the buyer signals acceptance of the seller's proposed commercial transaction by adding to the proposed commercial transaction an account index code and the buyer's personal authentication information comprising a PIN and at least one bid biometric sample wherein the bid biometric sample is obtained by the system from the buyer's person, forming a commercial transaction message;

e. a transmission step, wherein the commercial transaction message is forwarded to the computer system;

f. a buyer identification steps wherein the computer system compares the personal authentication information in the commercial transaction message with registered biometric samples for producing either a successful or failed identification of the buyer;

g. an account selection step, wherein the computer system obtains a buyer financial account using the account index code from the commercial transaction message;

h. a payment step, wherein upon determination of sufficient resources, the buyer financial account is debited and a financial account of the seller is credited, wherein a commercial transaction is conducted without the buyer having to use any portable man made memory devices such as smart cards or swipe cards; and i. a presentation step, wherein any combination of the results of steps a) through h) are presented to the buyer or seller, wherein a commercial transaction is conducted from one of many possible buyer accounts.

32. A method for tokenless authorization of commercial transactions between a buyer and a seller using a computer system, wherein the buyer may select one of many registered financial accounts from which to make payment, with a provision for sending a silent alarm during coerced transactions, the method comprising the steps of:

a. a buyer registration step, wherein the buyer registers with the computer system a PIN, at least one registration biometric sample, at least one buyer financial account, wherein each buyer financial account is assigned an account index code, and at least one emergency account index code;

b. a seller registration step, wherein the seller registers with the computer system at least one seller financial account and a seller identification code;

c. a proposal step, wherein the seller offers a proposed commercial transaction to the buyer, the proposed commercial transaction comprising a seller identification code and price information;

d. an acceptance step, wherein the buyer signals acceptance of the seller's proposed commercial transaction by adding to the proposed commercial transaction an account index code and the buyer's personal authentication information comprising a PIN and at least one bid biometric sample wherein the bid biometric sample is obtained by the system from the buyer's person, forming a commercial transaction message;

e. a transmission step, wherein the commercial transaction message is forwarded to the computer system;

f. a buyer identification step, wherein the computer system compares the personal authentication information in the commercial transaction message with registered biometric samples for producing either a successful or failed identification of the buyer;

g. an account selection step, wherein the computer system obtains a buyer financial account using the account index code from the commercial transaction message, and if the account index code is the same as the emergency account index code, a silent alarm is sent;

h. a payment step, wherein upon determination of sufficient resources, the buyer financial account is debited and a financial account of the seller is credited, wherein a commercial transaction is conducted without the buyer having to use any portable man made memory devices such as smart cards or swipe cards; and i. a presentation step, wherein any combination of the results of steps a) through h) are presented to the buyer or seller, wherein a commercial transaction is conducted from one of many possible buyer accounts, with the buyer able to signal a silent alarm during any coerced transaction.

33. A method for tokenless authorization of commercial transactions between a buyer and a seller using a computer system, the method comprising the steps of:

a. a buyer registration step, wherein the buyer registers with the computer system a PIN, at least one registration biometric sample, and at least one buyer financial account;

b. a seller registration step, wherein the seller registers with the computer system at least one seller financial account and a seller identification code;

c. a proposal step, wherein the seller offers a proposed commercial transaction to the buyer, the proposed commercial transaction comprising a seller identification code and price information;

d. an acceptance step, wherein the buyer signals acceptance of the seller's proposed commercial transaction by adding to the proposed commercial transaction the buyer's personal authentication information comprising a PIN and at least one bid biometric sample wherein the bid biometric sample is obtained by the system from the buyer's person, forming a commercial transaction message;

e. a transmission step, wherein the commercial transaction message is forwarded to the computer system;

f. a buyer identification step, wherein the computer system compares the personal authentication information in the commercial transaction message with registered biometric samples for producing either a successful or failed identification of the buyer;

g. a payment step, wherein upon determination of sufficient resources, a financial account of the buyer is debited and a financial account of the seller is credited, wherein a commercial transaction is conducted without the buyer having to use any portable man made memory devices such as smart cards or swipe cards;

h. a presentation step, wherein any combination of the results of steps a) through g) are presented to the buyer or seller; and i. a biometric theft resolution step, wherein the PIN of the buyer is changed whenever the buyer's biometric record is determined to have been stolen.

34. A tokenless authorization system for commercial transactions between a buyer and a seller using a computer, comprising:

a. means for buyer registration, wherein the buyer registers with the computer system a PIN, at least one registration biometric sample, and at least one buyer financial account;

b. means for seller registration, wherein the seller registers with the computer system at least one seller financial account and a seller identification code;

c. means for making an electronic proposal, wherein the seller offers an electronic proposed commercial transaction to the buyer, the proposed commercial transaction comprising a seller identification code and price information;

d. means for acceptance of the electronic proposal by the buyer, wherein the buyer signals acceptance of the seller's proposed commercial transaction by adding to the proposed commercial transaction the buyer's personal authentication information comprising a PIN and at least one bid biometric sample wherein the bid biometric sample is obtained by the system from the buyer's person, the seller's electronic proposal and the buyer's authentication information forming a commercial transaction message;

e. means for transmission, wherein the commercial transaction message is forwarded to the computer system;

f. means for buyer identification, wherein the computer system compares the personal authentication information in the commercial transaction message with registration biometric samples for producing either a successful or failed identification of the buyer;

g. means for electronic payment, wherein upon determination of sufficient resources, a financial account of the buyer is debited and a financial account of the seller is credited, wherein a commercial transaction is conducted without the buyer having to use any portable man made memory devices such as smart cards or swipe cards; and h. means for status presentation, wherein any combination of the results of steps a) through g) are presented to the buyer or seller.

35. The device of claim 34 further comprising means for identification of the buyer wherein the buyer identification is accomplished preferably in less than about 2 seconds, whereby the entire commercial transaction is completed within a commercially acceptable timeframe.

36. The device of claim 34 further comprising means for computer system authentication wherein a private code, distinct from the PIN and not used to gain access to the computer system, is gathered from the buyer during buyer registration and presented to only the buyer during status presentation, whereby the buyer is assured that the authentic computer system was used to process the commercial transaction.

37. The device of claim 34 further comprising means for the buyer to register an emergency PIN during the buyer registration which, if entered by the buyer during buyer acceptance in place of the PIN, triggers a silent alarm.

38. The device of claim 34 wherein the price information comprises any combination of the following: a list of goods and services, a seller name, a date and time, a location, and an invoice number.

39. The device of claim 34 further comprising means for the buyer to enter an amount that is the sum of a cash back value to the proposed transaction amount during buyer acceptance.

40. The device of claim 39 wherein the seller identification code is identical to the seller financial account.

41. The device of claim 34 wherein all communications with the computer system are encrypted.

42. The device of claim 34 wherein the biometric sample is a fingerprint.

43. The device of claim 34 wherein the biometric sample is retinal image.

44. The device of claim 34 wherein the biometric sample is a voice print.

45. The device of claim 34 further comprising means for biometric theft resolution, wherein the PIN of the buyer is changed whenever the buyer's biometric sample is determined to have been stolen.

46. The device of claim 34 further comprising a means for seller identification.

47. The device of claim 34 wherein the buyer is remote from the seller and communicates with the seller using a computer network.

48. The device of claim 47 wherein the computer network is any one of the group comprising the Internet, a private intranet, a telephone network, or a cable TV network.

49. The device of claim 34 further comprising means for buyer re-registration check, wherein the buyer's registration biometric samples are compared against previously designated biometric samples of certain buyers wherein if a match occurs, the computer system is alerted to the fact that the buyer has re-registered, whereby buyers who perpetrate fraud on the system can be automatically identified from their biometrics alone if and when they re-register.

50. The device of claim 49 wherein the biometrics are collected from a specific finger, such as the index finger, whereby the system can more easily detect re-registrations of previously designated biometric samples of certain buyers by limiting the number of different finger combinations the buyer can use to register without being detected.

51. The device of claim 34 further comprising means for security determination, wherein an evaluation is made using a set of security factors to determine the overall likelihood of fraud for a particular transaction.

52. The device of claim 51 wherein the security factors are selected from the group of a biometric-PIN input device security assessment, relative skill of attendant (at an attended location) to detect fraud, physical location and related neighborhood crime information, time at which the authorization takes place, number of recently failed authorization attempts originating from that device, number of recent authorizations issuing from that device related to the historical number of transactions from that device.

53. The device of claim 34 further comprising the means for buyer's resource determination, wherein after successful identification of the buyer, a determination is made if the buyer has sufficient resources to pay for the transaction.

54. The device of claim 53 further comprising means for communication with one or more external computer systems in order to perform any combination of the following: resource determination, debiting the buyer's financial account, and crediting the seller's financial account during both resource determination and electronic payment.

55. The device of claim 53 further comprising means for creation of a credit authorization draft during the electronic payment detailing an agreement to pay the seller from the buyer's financial account up to an amount specified during the electronic proposal, whereby transactions can be conducted when the exact amount to be transferred is not known at the time of authorization or when a deposit is required but the account may not ever be debited.

56. The device of claim 55 further comprising means for communication with one or more external computer systems in order to perform any combination of the following: resource determination or construction of the credit authorization draft.

57. The device of claim 56 wherein one of the external computer systems comprises VISANet or MAPP.

58. The device of claim 53 wherein means for buyer registration further comprises means for registering at least one buyer financial account, the buyer assigning an account index code to each buyer financial account, and at the time of buyer acceptance, the buyer adds the account index code to the commercial transaction message, wherein the account index code further comprises one or more alphanumeric characters.

59. The device of claim 58 further comprising means for registration of an emergency account index code, wherein the buyer registers an emergency account index code, which when added to the commercial transaction message during the buyer acceptance, triggers a silent alarm.

60. The device of claim 59 further comprising means for the buyer to specify any combination of actions taken upon the triggering of the silent alarm comprising artificial financial resource limits, presentation of a false private code, rejection of the transaction, or the sending of the silent alarm to the seller during buyer registration.

61. The device of claim 58 wherein means for buyer's resource determination further comprises means for selecting the corresponding buyer financial account through the account index code that was added to the commercial transaction message.

62. The device of claim 61 wherein further comprising means for assigning an account index name to an account index code.

63. The device of claim 62 further comprising means for account name display, wherein a list of accounts with their account index names can be retrieved and displayed to the buyer after a successful identification, wherein no transaction needs to take place if it is desired that the account index names be retrieved.

64. A tokenless authorization system for commercial transactions between a buyer and a seller using a computer system, wherein the buyer may select one of many registered financial accounts from which to make payment, the system comprising:
- a. means for buyer registration, wherein the buyer registers with the computer system a PIN, at least one registration biometric sample, and at least one buyer financial account, and each buyer financial account is assigned an account index code;
- b. means for seller registration, wherein the seller registers with the computer system at least one seller financial account and a seller identification code;
- c. means for making an electronic proposal, wherein the seller offers an electronic proposed commercial transaction to the buyer, the proposed commercial transaction comprising a seller identification code and price information;
- d. means for acceptance of the electronic proposal by the buyer, wherein the buyer signals acceptance of the seller's proposed commercial transaction by adding to the proposed commercial transaction an account index code and the buyer's personal authentication information comprising a PIN and at least one bid biometric sample wherein the bid biometric sample is obtained by the system from the buyer's person, the seller's electronic proposal and the buyer's authentication information forming a commercial transaction message;
- e. means for transmission, wherein the commercial transaction message is forwarded to the computer system;
- f. means for buyer identification, wherein the computer system compares the personal authentication information in the commercial transaction message with registration biometric samples for producing either a successful or failed identification of the buyer;
- g. means for account selection, wherein the computer system obtains a buyer financial account using the account index code from the commercial transaction message;
- h. means for electronic payment, wherein upon determination of sufficient resources, a financial account of the buyer is debited and a financial account of the seller is credited, wherein a commercial transaction is conducted without the buyer having to use any portable man made memory devices such as smart cards or swipe cards; and
- i. means for status presentation, wherein any combination of the results of steps a) through g) are presented to the buyer or seller.

65. A tokenless authorization system for commercial transactions between a buyer and a seller using a computer system, wherein the buyer may select one of many registered financial accounts from which to make payment, with a provision for sending a silent alarm during coerced transactions, the system comprising:
- a. means for buyer registration, wherein the buyer registers with the computer system a PIN, at least one registration biometric sample, and at least one buyer financial account, and each buyer financial account is assigned an account index code, and at least one emergency account index code;
- b. means for seller registration, wherein the seller registers with the computer system at least one seller financial account and a seller identification code;
- c. means for making an electronic proposal, wherein the seller offers an electronic proposed commercial transaction to the buyer, the proposed commercial transaction comprising a seller identification code and price information;
- d. means for acceptance of the electronic proposal by the buyer, wherein the buyer signals acceptance of the seller's proposed commercial transaction by adding to the proposed commercial transaction an account index code and the buyer's personal authentication information comprising a PIN and at least one bid biometric sample wherein the bid biometric sample is obtained by the system from the buyer's person, the seller's electronic proposal and the buyer's authentication information forming a commercial transaction message;
- e. means for transmission, wherein the commercial transaction message is forwarded to the computer system;
- f. means for buyer identification, wherein the computer system compares the personal authentication information in the commercial transaction message with registration biometric samples for producing either a successful or failed identification of the buyer;
- g. means for account selection, wherein the computer system obtains a buyer financial account using the account index code from the commercial transaction message, and if the account index code is the same as the emergency account index code, a silent alarm is sent;
- h. means for electronic payment, wherein upon determination of sufficient resources, a financial account of the buyer is debited and a financial account of the seller is credited wherein a commercial transaction is conducted without the buyer having to use any portable man made memory devices such as smart cards or swipe cards; and
- i. means for status presentation, wherein any combination of the results of steps a) through g) are presented to the buyer or seller, whereby a commercial transaction is conducted from one of many possible buyer accounts.

66. A tokenless authorization system for commercial transactions between a buyer and a seller using a computer, comprising:
- a. means for buyer registration, wherein the buyer registers with the computer system a PIN, at least one registration biometric sample, and at least one buyer financial account;
- b. means for seller registration, wherein the seller registers with the computer system at least one seller financial account and a seller identification code;
- c. means for making an electronic proposal, wherein the seller offers an electronic proposed commercial transaction to the buyer, the proposed commercial transaction comprising a seller identification code and price information,
- d. means for acceptance of the electronic proposal by the buyer, wherein the buyer signals acceptance of the seller's proposed commercial transaction by adding to the proposed commercial transaction the buyer's personal authentication information comprising a PIN and at least one bid biometric sample wherein the bid biometric sample is obtained by the system from the buyer's person, the seller's electronic proposal and the buyer's authentication information forming a commercial transaction message;
- e. means for transmission, wherein the commercial transaction message is forwarded to the computer system;
- f. means for buyer identification, wherein the computer system compares the personal authentication information in the commercial transaction message with registration biometric samples for producing either a successful or failed identification of the buyer;

g. means for electronic payment, wherein upon determination of sufficient resources, a financial account of the buyer is debited and a financial account of the seller is credited, wherein a commercial transaction is conducted without the buyer having to use any portable man made memory devices such as smart cards or swipe cards;

h. means for status presentation, wherein any combination of the results of steps a) through g) are presented to the buyer or seller; and i. means for biometric theft resolution, wherein the PIN of the buyer is changed whenever the buyer's biometric record is determined to have been stolen, and any theft of biometric information can be made useless immediately upon detection.

* * * * *